US008659543B2

(12) United States Patent
Yamazaki et al.

(10) Patent No.: US 8,659,543 B2
(45) Date of Patent: Feb. 25, 2014

(54) DRIVING METHOD, CONTROL DEVICE, DISPLAY DEVICE, AND ELECTRONIC APPARATUS

(75) Inventors: Katsunori Yamazaki, Matsumoto (JP); Tokuro Ozawa, Suwa (JP)

(73) Assignee: Seiko Epson Corporation (JP)

( * ) Notice: Subject to any disclaimer, the term of this patent is extended or adjusted under 35 U.S.C. 154(b) by 141 days.

(21) Appl. No.: 13/425,967

(22) Filed: Mar. 21, 2012

(65) Prior Publication Data

US 2012/0242642 A1 Sep. 27, 2012

(30) Foreign Application Priority Data

Mar. 22, 2011 (JP) ................................ 2011-062599

(51) Int. Cl.
*G02F 1/167* (2006.01)

(52) U.S. Cl.
USPC ............................ 345/107; 345/212; 345/204

(58) Field of Classification Search
None
See application file for complete search history.

(56) References Cited

U.S. PATENT DOCUMENTS

| | | | | |
|---|---|---|---|---|
| 2005/0068279 | A1 | 3/2005 | Hirota et al. | |
| 2008/0309674 | A1 | 12/2008 | Barrus et al. | |
| 2009/0256798 | A1 * | 10/2009 | Low et al. .................... | 345/107 |
| 2010/0079436 | A1 * | 4/2010 | Komatsu et al. .............. | 345/211 |

FOREIGN PATENT DOCUMENTS

| | | |
|---|---|---|
| JP | 2000-035775 | 2/2000 |
| JP | 2008-176330 | 7/2008 |
| JP | 2009-251615 | 10/2009 |
| JP | 2010-520490 | 6/2010 |

* cited by examiner

*Primary Examiner* — Kent Chang
*Assistant Examiner* — Sujit Shah
(74) *Attorney, Agent, or Firm* — Harness, Dickey & Pierce, P.L.C.

(57) ABSTRACT

A driving method of an electro-optic device includes determining which condition is satisfied among a plurality of conditions including a first condition where a plurality of pixels include only a first pixels of which an optical state is changed from a second optical state to a first optical state and a third pixels of which the optical state is not changed, a second condition where the plurality of pixels include only a second pixels of which the optical state is changed from the first optical state to the second optical state and the third pixels, and a third condition where the plurality of pixels include both the first pixels and the second pixels, based on data stored in a memory storing the data indicating the optical state of the plurality of pixels.

32 Claims, 22 Drawing Sheets

FIG. 15

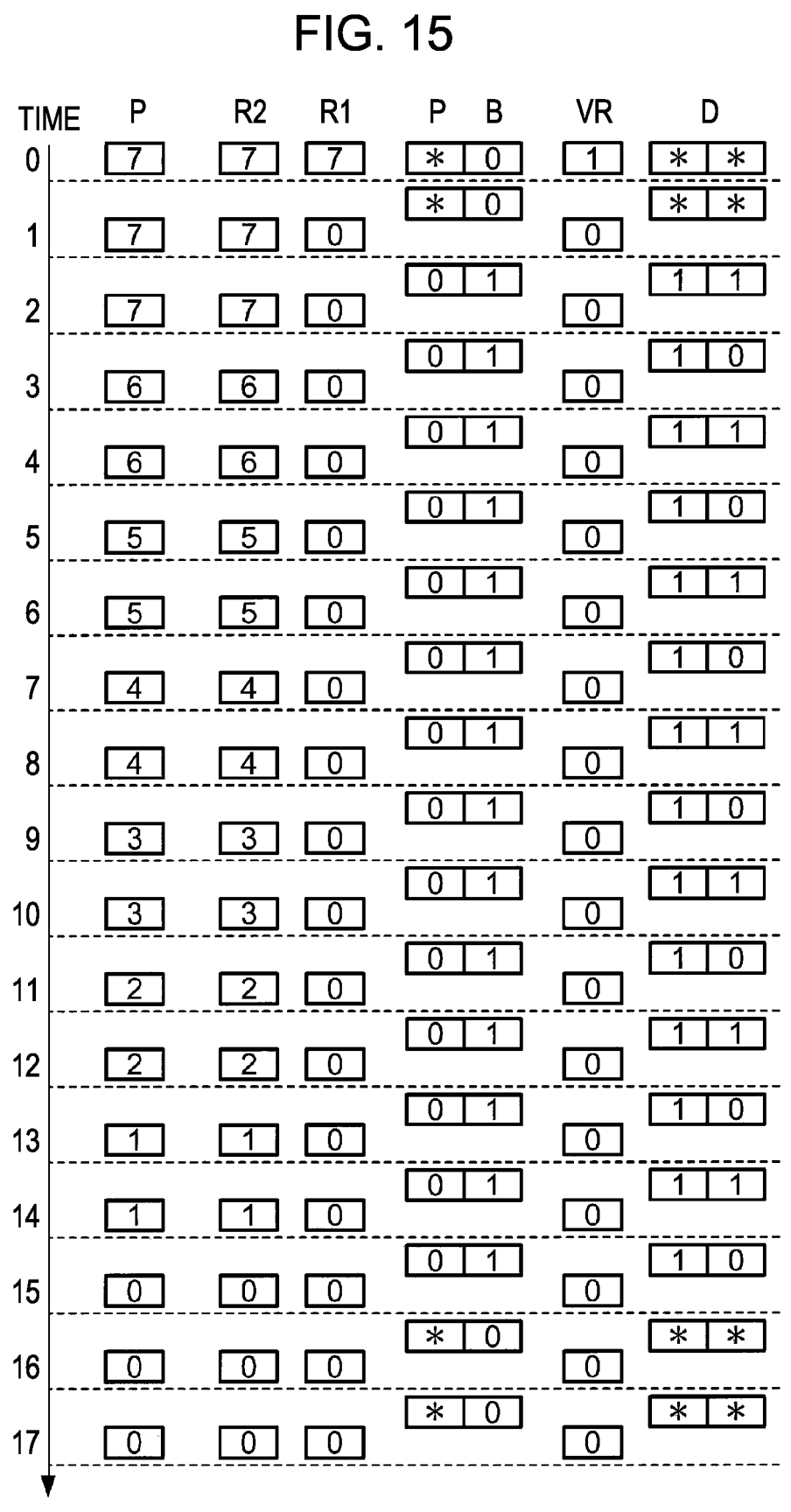

| TIME | P | R2 | R1 | P | B | VR | D | D |
|---|---|---|---|---|---|---|---|---|
| 0 | 7 | 7 | 7 | * | 0 | 1 | * | * |
| 1 | 7 | 7 | 0 | * | 0 | 0 | * | * |
| 2 | 7 | 7 | 0 | 0 | 1 | 0 | 1 | 1 |
| 3 | 6 | 6 | 0 | 0 | 1 | 0 | 1 | 0 |
| 4 | 6 | 6 | 0 | 0 | 1 | 0 | 1 | 1 |
| 5 | 5 | 5 | 0 | 0 | 1 | 0 | 1 | 0 |
| 6 | 5 | 5 | 0 | 0 | 1 | 0 | 1 | 1 |
| 7 | 4 | 4 | 0 | 0 | 1 | 0 | 1 | 0 |
| 8 | 4 | 4 | 0 | 0 | 1 | 0 | 1 | 1 |
| 9 | 3 | 3 | 0 | 0 | 1 | 0 | 1 | 0 |
| 10 | 3 | 3 | 0 | 0 | 1 | 0 | 1 | 1 |
| 11 | 2 | 2 | 0 | 0 | 1 | 0 | 1 | 0 |
| 12 | 2 | 2 | 0 | 0 | 1 | 0 | 1 | 1 |
| 13 | 1 | 1 | 0 | 0 | 1 | 0 | 1 | 0 |
| 14 | 1 | 1 | 0 | 0 | 1 | 0 | 1 | 1 |
| 15 | 0 | 0 | 0 | 0 | 1 | 0 | 1 | 0 |
| 16 | 0 | 0 | 0 | * | 0 | 0 | * | * |
| 17 | 0 | 0 | 0 | * | 0 | 0 | * | * |

DRIVING METHOD, CONTROL DEVICE, DISPLAY DEVICE, AND ELECTRONIC APPARATUS

The entire disclosure of Japanese Patent Application No. 2011-062599, filed Mar. 22, 2011 is expressly incorporated by reference herein.

BACKGROUND

1. Technical Field

The present invention relates to a technique for driving an electro-optic device with a memory property.

2. Related Art

There is an electro-optic device having a so-called memory property so as to retain display even when energy is not continuously supplied by application of a voltage. JPA-2000-35775 discloses a configuration (hereinafter, a pixel with this configuration is referred to as a “1T1C-type pixel”) in which one pixel includes one transistor and one capacitive element. JP-A-2008-176330 discloses a configuration (hereinafter, a pixel with this configuration is referred to as a “2T1C-type pixel”) in which one pixel includes two transistors and one capacitive element. The 1T1C-type pixel can simultaneously execute rewriting from black to white and from white to black when the scanning lines of a pixel group connected to a common scanning line are selected. On the other hand, the 2T1C-type pixel can execute only one of rewriting from black to white and rewriting from white to black when the scanning lines of a pixel group connected to a common scanning line are selected.

JP-T-2010-520490 discloses a technique for updating an image of an electronic paper. The electronic paper includes an image memory for an image desired to be displayed and a state memory indicating a current display state. JP-T-2010-520490 discloses the technique for updating a pixel state irrespective of the current state of the other pixel using the image memory and the state memory.

In general, the number of writes is larger in the 2T1C-type pixel than in the 1T1C-type pixel. Therefore, it is considered that it is difficult to rewrite pixels at a high speed. Even the technique disclosed in JP-T-2010-520490 may not control the rewriting of the pixels in accordance with the state of the other pixels.

SUMMARY

An advantage of some aspects of the invention is to provide a technique for rewriting 2T1C-type pixels at a high speed in accordance with the state of the other pixels.

According to an aspect of the invention, there is provided a control method of an electro-optic device including a plurality of pixels which include a pixel electrode disposed at intersections between a plurality of scanning lines and a plurality of signal lines, an electro-optic element which enters a first optical state from a second optical state for a first time by accumulatively applying a first voltage via the pixel electrode during a first plurality of periods and enters the second optical state from the first optical state for a second time by accumulatively applying a second voltage during a second plurality of periods, a memory circuit which is disposed in each of the plurality of pixels, includes a first input terminal connected to a first scanning line among the plurality of scanning lines, a second input terminal connected to a first signal line among the plurality of signal lines, and a first output terminal, and holds a third voltage applied to the first signal line when the first scanning line is selected, a switching circuit which is disposed in each of the plurality of pixels, includes a control input terminal connected to the first output terminal, a third input terminal connected to a power voltage line, and a second output terminal connected to the pixel electrode, and controlling a conduction state between the third input terminal and the second output terminal in accordance with a signal supplied to the control input terminal, and a scanning line driving circuit which supplies a selection signal for selecting one of the plurality of scanning lines. The control method includes: determining which condition is satisfied among a plurality of conditions including a first condition where the plurality of pixels include only a first kind of pixels of which the optical state is changed from the second optical state to the first optical state and a third kind of pixels of which the optical state is not changed, a second condition where the plurality of pixels include only a second kind of pixels of which the optical state is changed from the first optical state to the second optical state and the third kind of pixels, and a third condition where the plurality of pixels include the first kind of pixels and the second kind of pixels together, based on first data stored in a memory register storing the first data indicating the optical state of the plurality of pixels; applying a fourth voltage for allowing the switching circuit to enter an ON state to the first signal line corresponding to the first kind of pixels, applying a fifth voltage for allowing the switching circuit to enter an OFF state to a third signal line corresponding to the third kind of pixels, and applying the first voltage to the power voltage line, after determining that the plurality of pixels satisfy the first condition during one of the first and second pluralities of periods; applying the fourth voltage for allowing the switching circuit to enter the ON state to a second signal line corresponding to the second kind of pixels, applying the fifth voltage for allowing the switching circuit to enter the OFF state to the third signal line corresponding to the third kind of pixels, and applying the second voltage to the power voltage line, when determining that the plurality of pixels satisfy the second condition during one of the first and second pluralities of periods; and alternately repeating, at a predetermined frequency, a first period for applying the fourth voltage for allowing the switching circuit to enter the ON state to the first signal line corresponding to the first kind of pixels, applying the fifth voltage for allowing the switching circuit to enter the OFF state to the third signal line corresponding to the third kind of pixels, and applying the first voltage to the power voltage line and a second period for applying the fourth voltage for allowing the switching circuit to enter the ON state to the second signal line corresponding to the second kind of pixels, applying the fifth voltage for allowing the switching circuit to enter the OFF state to the third signal line corresponding to the third kind of pixels, and applying the second voltage to the power voltage line, when determining that the plurality of pixels satisfy the third condition during one of the first and second pluralities of periods. According to this driving method, the electro-optic device can be driven at higher speed compared to a case where no driving is performed in accordance with the different states of the pixels.

In the driving method of the electro-optic device according to the aspect of the invention, the plurality of conditions may further include a fourth condition where the plurality of pixels include only the first kind of pixels and the third kind of pixels during one of the first and second pluralities of periods and the plurality of scanning lines include a second scanning line corresponding to only the pixels for which the application of the first voltage newly starts and the pixels other than the pixels for which the application of the first voltage ends. The driving method may further include applying the first voltage to the power voltage line without selecting the second scanning line during one of the first and second pluralities of periods, when determining that the plurality of pixels satisfy the fourth condition.

According to the driving method, it is possible to reduce power consumption compared to a case where the first scanning line is selected during all the periods.

In the driving method of the electro-optic device according to the aspect of the invention, the plurality of conditions may further include a fifth condition where the plurality of pixels include only the second kind of pixels and the third kind of pixels during one of the first and second pluralities of periods and the plurality of scanning lines include a third scanning line corresponding to only the pixels for which the application of the second voltage newly starts and the pixels other than the pixels for which the application of the second voltage ends. The driving method may further include applying the second voltage to the power voltage line without selecting the third scanning line during one of the first and second pluralities of periods, when determining that the plurality of pixels satisfy the fifth condition.

According to the driving method, it is possible to reduce power consumption compared to a case where the second scanning line is selected during all the periods.

In the driving method of the electro-optic device according to the aspect of the invention, the plurality of conditions may further include a sixth condition where the plurality of pixels include only the third kind of pixels during one of the first and second pluralities of periods and the plurality of scanning lines include a fourth scanning line corresponding to only the pixels other than the pixels for which an accumulation time of the application of one of the first voltage and the second voltage during one of the first and second pluralities of periods becomes one of the first time and the second time. The driving method may further include applying one of the first voltage and the second voltage to the power voltage line without selecting the fourth scanning line during one of the first and second pluralities of periods, when determining that the plurality of pixels satisfy the sixth condition.

According to the driving method, it is possible to reduce power consumption compared to a case where the third scanning line is selected during all the periods.

In the driving method of the electro-optic device according to the aspect of the invention, the plurality of conditions may include a seventh condition where the plurality of scanning lines include a fifth scanning line corresponding to only a fourth kind of pixels for which an accumulation time of the application of one of the first voltage and the second voltage during one of the first and second pluralities of periods becomes one of the first time and the second time. When it is determined that the plurality of pixels satisfy the seventh condition, the driving method further comprises applying the fourth voltage for allowing the switching circuit to enter the ON state to a fourth signal line corresponding to the fourth kind of pixels when selecting the fifth scanning line during one of the first and second pluralities of periods and applying a sixth voltage for stopping the change in the optical state of the electro-optic element during at least a part of one of the first and second pluralities of periods to the power voltage line.

According to the driving method, the change in the optical state can be stopped more reliably in the fourth kind of pixels.

In the driving method of the electro-optic device according to the aspect of the invention, when it is determined that the plurality of pixels satisfy the seventh condition, the fourth voltage for allowing the switching circuit to enter the ON state may be applied to the third and fourth signal lines when the fifth scanning line is selected during one of the first and second pluralities of periods.

According to the driving method, the change in the optical state can be stopped more reliably not only in the fourth kind of pixels but also in the third kind of pixels.

In the driving method of the electro-optic device according to the aspect of the invention, when it is determined that the plurality of pixels satisfy the seventh condition, the fourth voltage for allowing the switching circuit to enter the ON state may be applied to all the plurality of signal lines when the fifth scanning line is selected during one of the first and second pluralities of periods.

According to the driving method, the change in the optical state can be stopped more reliably in all the pixels.

In the driving method of the electro-optic device according to the aspect of the invention, the plurality of conditions may include an eighth condition where all the plurality of pixels are the third kind of pixels. When it is determined that the plurality of pixels satisfy the eighth condition, the driving method may further include one of: selecting one to all of the scanning lines in sequence among the plurality of scanning lines, applying the fourth voltage for allowing the switching circuit to enter the ON state to all the plurality of signal lines, and applying a sixth voltage for stopping the change in the optical state of the electro-optic element to the power voltage line; selecting one to all of the scanning lines in sequence among the plurality of scanning lines, applying the fourth voltage for allowing the switching circuit to enter the ON state to all the plurality of signal lines, and stopping the application of the first and second voltages to the power voltage line; selecting one to all of the scanning lines in sequence among the plurality of scanning lines, applying the fifth voltage for allowing the switching circuit to enter the OFF state to all the plurality of signal lines, and applying the sixth voltage for stopping the change in the optical state of the electro-optic element to the power voltage line; selecting one to all of the scanning lines in sequence among the plurality of scanning lines, applying the fifth voltage for allowing the switching circuit to enter the OFF state to all the signal lines, and stopping the application of the first and second voltages to the power voltage line; and stopping selecting one to all of the scanning lines.

According to the driving method, it is possible to reduce power consumption compared to the case where the above-mentioned configuration is not provided.

The driving method of the electro-optic device according to the aspect of the invention may further include measuring an accumulation time in which the switching circuit is in the ON state in regard to the pixels in which the switching circuit is in the ON state among the plurality of pixels. The condition which the plurality of pixels satisfy may be determined among the plurality of conditions by the use of the measured accumulation time.

According to the driving method, even when the driving method is changed depending on the states of the pixels, the optical state of the pixels can be changed more accurately compared to the case where the above-mentioned configuration is not provided.

The driving method of the electro-optic device according to the aspect of the invention may further include writing second data indicating a target time of voltage application in a first storage region in regard to each of the plurality of pixels; writing third data indicating the measured accumulation time in a second storage region in regard to each of the plurality of pixels; determining whether the first data stored in the memory register corresponds to the second data stored in the first storage region in regard to each of the plurality of pixels; and writing fourth data corresponding to the first data stored in the memory register as the target time in the first storage region in regard to the pixel for which it is determined that the first data stored in the memory register does not correspond to the second data stored in the first storage region. The condition which the plurality of pixels satisfy may be determined among the plurality of conditions by the use of a comparison result between the third data stored in the second storage region and the second data stored in the first storage region.

According to the driving method, the condition can be determined more easily compared to the case where the above-mentioned configuration is not provided.

The driving method of the electro-optic device according to the aspect of the invention may further include writing a first flag indicating whether a seventh voltage is applied in a third storage region in regard to each of the plurality of pixels based on the comparison result between the third data stored in the second storage region and the second data stored in the first storage region; and writing a second flag indicating whether the first voltage is applied or the second voltage is applied in a fourth storage region in regard to each of the plurality of pixels based on the comparison result. The condition which the plurality of pixels satisfy may be determined among the plurality of conditions by the use of the first and second flags stored in the third and fourth storage regions respectively.

According to the driving method, the condition can be determined more easily compared to the case where the above-mentioned configuration is not provided.

In the driving method of the electro-optic device according to the aspect of the invention, when the third data stored in the second storage region does not correspond to the second data stored in the first storage region in regard to the pixel for which it is determined that the first data stored in the memory register does not correspond to the second data stored in the first storage region, the fifth data corresponding to the first data stored in the memory register may be written as the target time in the first storage region having waited until the third data stored in the second storage region corresponds to the second data stored in the first storage region.

According to the driving method, display unevenness can be prevented compared to a configuration in which no waiting is performed until the third data stored in the second storage region corresponds to the second data stored in the first storage region.

In the driving method of the electro-optic device according to the aspect of the invention, the plurality of scanning lines may be divided into a plurality of blocks. The power voltage line may include a plurality of power voltage lines so as to have one-to-one correspondence to the plurality of blocks. One of the first and second voltages applied to the plurality of power voltage lines may be switched for each block.

According to the driving method, driving can be further optimized compared to a case where a single power voltage line is used.

In the driving method of the electro-optic device according to the aspect of the invention, the electro-optic device may include a power line driving circuit switching the one of the first and second voltages applied to the plurality of power voltage lines for each block. The one of the first and second voltages applied to the plurality of power voltage lines may be switched for each block by controlling the power line driving circuit.

According to the driving method, driving can be performed more easily compared to the case where no power line driving circuit is provided.

In the driving method of the electro-optic device according to the aspect of the invention, the plurality of pixels may be disposed in a matrix form in a first direction in which the scanning lines extend and a second direction in which the plurality of signal lines extend. The plurality of power voltage lines may include first and second power voltage lines. The first power voltage line may be connected alternately to two pixel groups arranged in the first direction. The second power voltage line may be connected alternately to two pixel groups which are different from the pixels connected to the first power voltage line and are arranged in the first direction. Different voltages of the first and second voltages may be applied to the first and second power voltage lines, respectively.

According to the driving method, the pixels can be prevented from flickering compared to a configuration in which the power voltage line is not connected alternately to two pixel groups.

In the driving method of the electro-optic device according to the aspect of the invention, the plurality of pixels may be disposed in a matrix form in a first direction in which the plurality of scanning lines extend and in a second direction in which the plurality of signal lines extend. Among the plurality of pixels, two pixels adjacent to each other in the first direction may be connected to two different scanning lines, respectively. The power voltage line may include first and second power voltage lines. The first power voltage line may be connected to a first pixel group arranged in the first direction. The second power voltage line may be connected to a second pixel group which is arranged in the first direction and is different from the first pixel group connected to the first power voltage line. Different voltages of the first and second voltages may be applied to the first and second power voltage lines, respectively.

According to the driving method, the pixels can be prevented from flickering compared to a configuration in which the scanning line is not connected alternately to two pixel groups.

According to another aspect of the invention, there is provided a control device including: an output unit outputting a signal to an electro-optic device including a plurality of pixels which include a pixel electrode disposed at intersections between a plurality of scanning lines and a plurality of signal lines, an electro-optic element which enters a first optical state from a second optical state for a first time by accumulatively applying a first voltage via the pixel electrode during a first plurality of periods and enters the second optical state from the first optical state for a second time by accumulatively applying a second voltage during a second plurality of periods, a memory circuit which is disposed in each of the plurality of pixels, includes a first input terminal connected to a first scanning line among the plurality of scanning lines, a second input terminal connected to a first signal line among the plurality of signal lines, and a first output terminal, and holds a third voltage applied to the first signal line when the first scanning line is selected, a switching circuit which is disposed in each of the plurality of pixels, includes a control input terminal connected to the first output terminal, a third input terminal connected to a power voltage line, and a second output terminal connected to the pixel electrode, and controlling a conduction state between the third input terminal and the second output terminal in accordance with a signal supplied to the control input terminal, and a scanning line driving circuit which supplies a selection signal for selecting one of the plurality of scanning lines; a determination unit determining which condition is satisfied among a plurality of conditions including a first condition where the plurality of pixels include only a first kind of pixels of which the optical state is changed from the second optical state to the first optical state and a third kind of pixels of which the optical state is not changed, a second condition where the plurality of pixels include only a second kind of pixels of which the optical state is changed from the first optical state to the second optical state and the third kind of pixels, and a third condition where the plurality of pixels include the first kind of pixels and the second kind of pixels together, based on first data stored in a memory register storing the first data indicating the optical state of the plurality of pixels; and a control unit controlling the output unit such that the output unit outputs the signal for controlling the electro-optic device in accordance with a determination result of the determination unit. When it is determined that the plurality of pixels satisfy the first condition during one of the first and second pluralities of periods, the control unit controls the output unit such that the output unit outputs a signal used for applying a voltage for allowing the switching circuit to enter an ON state to a first signal line corresponding to the first kind of pixels among the plurality of signal lines, applying a voltage for allowing the switching circuit to enter an OFF state to a third signal line corresponding to the third kind of pixels, and applying the first voltage to the power voltage line. When it is determined that the plurality of pixels satisfy the second condition during one of the first and second pluralities of periods, the control unit controls the output unit such that the output unit outputs a signal used for applying the voltage for allowing the switching circuit to enter the ON state to a second signal line corresponding to the second kind of pixels among the plurality of signal lines, applying the voltage for allowing the switching circuit to enter the OFF state to a third signal line corresponding to the third kind of pixels, and applying the second voltage to the power voltage line. When it is determined that the plurality of pixels satisfy the third condition during one of the first and second pluralities of periods, the control unit controls the output unit such that the output unit outputs the signal used for applying a fourth voltage for allowing the switching circuit to enter the ON state to the first signal line corresponding to the first kind of pixels, applying a fifth voltage for allowing the switching circuit to enter the OFF state to the third signal line corresponding to the third kind of pixels and applying the first voltage to the power line. When it is determined that the plurality of pixels satisfy the second condition during one of the first and second pluralities of periods, the control unit controls the output unit such that the output unit outputs the signal used for applying the fourth voltage for allowing the switching circuit to enter the ON state to a second signal line corresponding to the second kind of pixels, applying the fifth voltage for allowing the switching circuit to enter the OFF state to the third signal line corresponding to the third kind of pixels, and applying the second voltage to the power voltage line. When it is determined that the plurality of pixels satisfy the third condition during one of the first and second pluralities of periods, the control unit controls the output unit such that the output unit outputs the signal used to alternately repeating, at a predetermined frequency, a first period for applying the fourth voltage for allowing the switching circuit to enter the ON state to the first signal line corresponding to the first kind of pixels, applying the fifth voltage for allowing the switching circuit to enter the OFF state to the third signal line corresponding to the third kind of pixels, and applying the first voltage to the power voltage line and a second period for applying the fourth voltage for allowing the switching circuit to enter the ON state to the second signal line corresponding to the second kind of pixels, applying the fifth voltage for allowing the switching circuit to enter the OFF state to the third signal line corresponding to the third kind of pixels, and applying the second voltage to the power voltage line.

According to the control device, the electro-optic device can be driven at higher speed compared to a case where no driving is performed in accordance with the different states of the pixels.

In the control device according to the aspect of the invention, the plurality of conditions may further include a fourth condition where the plurality of pixels include only the first kind of pixels and the third kind of pixels during one of the first and second pluralities of periods and the plurality of scanning lines may include a second scanning line corresponding to only the pixels for which the application of the first voltage newly starts and the pixels other than the pixels for which the application of the first voltage ends. When it is determined that the plurality of pixels satisfy the fourth condition, the control unit may control the output unit such that the output units outputs the signal used for applying the first voltage to the power voltage line without selecting the second scanning line during one of the first and second pluralities of periods.

According to the control device, it is possible to reduce power consumption compared to a case where the first scanning line is selected during all the periods.

In the control device according to the aspect of the invention, the plurality of conditions may further include a fifth condition where the plurality of pixels include only the second kind of pixels and the third kind of pixels during one of the first and second pluralities of periods and the plurality of scanning lines may include a third scanning line corresponding to only the pixels for which the application of the second voltage newly starts and the pixels other than the pixels for which the application of the second voltage ends. When it is determined that the plurality of pixels satisfy the fifth condition, the control unit may control the output unit such that the output units outputs the signal used for applying the second voltage to the power voltage line without selecting the third scanning line during one of the first and second pluralities of periods.

According to the control device, it is possible to reduce power consumption compared to a case where the second scanning line is selected during all the periods.

In the control device according to the aspect of the invention, the plurality of conditions may further include a sixth condition where the plurality of pixels include only the third kind of pixels during one of the first and second pluralities of periods and the plurality of scanning lines may include a fourth scanning line corresponding to only the pixels other than the pixels for which an accumulation time of the application of one of the first voltage and the second voltage during one of the first and second pluralities of periods becomes one of the first time and the second time. When it is determined that the plurality of pixels satisfy the sixth condition, the control unit may control the output unit such that the output units outputs the signal used for applying one of the first voltage and the second voltage to the power voltage line without selecting the fourth scanning line during one of the first and second pluralities of periods.

According to the control device, it is possible to reduce power consumption compared to a case where the third scanning line is selected during all the periods.

In the control device according to the aspect of the invention, the plurality of conditions may include a seventh condition where the plurality of scanning lines include a fifth scanning line corresponding to only a fourth kind of pixels for which an accumulation time of the application of one of the first voltage and the second voltage during one of the first and second pluralities of periods becomes one of the first time and the second time. When it is determined that the plurality of pixels satisfy the seventh condition, the control unit may control the output unit such that the output units outputs the signal used for applying the fourth voltage for allowing the switching circuit to enter the ON state to a fourth signal line corresponding to the fourth kind of pixels when the fifth scanning line is selected during one of the first and second pluralities of periods and applying a sixth voltage for stopping the change in the optical state of the electro-optic element during at least a part of one of the first and second pluralities of periods to the power voltage line.

According to the control device, the change in the optical state can be stopped more reliably in the fourth kind of pixels.

In the control device according to the aspect of the invention, when it is determined that the plurality of pixels satisfy the seventh condition, the control unit may control the output unit such that the output units outputs the signal used for applying the fourth voltage for allowing the switching circuit to enter the ON state to the third and fourth signal lines when the fifth scanning line is selected during one of the first and second pluralities of periods.

According to the control device, the change in the optical state can be stopped more reliably in not only the fourth kind of pixels but also the third kind of pixels.

In the control device according to the aspect of the invention, when it is determined that the plurality of pixels satisfy the seventh condition, the control unit may control the output unit such that the output units outputs the signal used for applying the fourth voltage for allowing the switching circuit to enter the ON state to all the plurality of signal lines when the fifth scanning line is selected during one of the first and second pluralities of periods.

According to the control device, the change in the optical state can be stopped more reliably in all the pixels.

In the control device according to the aspect of the invention, the plurality of conditions may include an eighth condition where all the plurality of pixels is the third kind of pixels. When it is determined that the plurality of pixels satisfy the eighth condition, the control unit may control the output unit such that the output unit outputs the signal used for one of the followings: selecting one to all of the scanning lines in sequence among the plurality of scanning lines, applying the fourth voltage for allowing the switching circuit to enter the ON state to all the plurality of signal lines, and applying a sixth voltage for stopping the change in the optical state of the electro-optic element to the power voltage line; selecting one to all of the scanning lines in sequence among the plurality of scanning lines, applying the fourth voltage for allowing the switching circuit to enter the ON state to all the plurality of signal lines, and stopping the application of the first and second voltages to the power voltage line; selecting one to all of the scanning lines in sequence among the plurality of scanning lines, applying the fifth voltage for allowing the switching circuit to enter the OFF state to all the plurality of signal lines, and applying the sixth voltage for stopping the change in the optical state of the electro-optic element to the power voltage line; selecting one to all of the scanning lines in sequence among the plurality of scanning lines, applying the fifth voltage for allowing the switching circuit to enter the OFF state to all the signal lines, and stopping the application of the first and second voltages to the power voltage line; and stopping selecting one to all of the scanning lines.

According to the control device, power consumption can be reduced compared to a case where the above-mentioned configuration is not provided.

In the control device according to the aspect of the invention, the control unit may measure an accumulation time in which the switching circuit is in the ON state in regard to the pixels in which the switching circuit is in the ON state among the plurality of pixels. The determination unit may determine the condition which the plurality of pixels satisfy among the plurality of conditions by the use of the measured accumulation time.

According to the control device, even when the driving method is changed depending on the states of the pixels, the optical state of the pixels can be changed more accurately compared to the case where the above-mentioned configuration is not provided.

The control device according to the aspect of the invention may further include a first storage region storing second data indicating a target time of voltage application in regard to each of the plurality of pixels; and a second storage region storing third data indicating the measured accumulation time in regard to each of the plurality of pixels. The control unit may determine whether the first data stored in the memory register corresponds to the second data stored in the first storage region in regard to each of the plurality of pixels. The control unit may write fourth data corresponding to the first data stored in the memory register as the target time in the first storage region in regard to the pixel for which it is determined that the first data stored in the memory register does not correspond to the second data stored in the first storage region. The determination unit may determine the condition which the plurality of pixels satisfy among the plurality of conditions by the use of a comparison result between the third data stored in the second storage region and the second data stored in the first storage region.

According to the control device, the condition can be determined more easily compared to the case where the above-mentioned configuration is not provided.

In the control device according to the aspect of the invention, the control device may further include a third storage region storing a first flag indicating whether a seventh voltage is applied to each of the plurality of pixels; and a fourth storage region storing a second flag indicating whether the first voltage is applied or the second voltage is applied to each of the plurality of pixels. The control unit may write the first flag indicating whether the seventh voltage is applied in the third storage region in regard to each of the plurality of pixels based on the comparison result between the third data stored in the second storage region and the second data stored in the first storage region. The control unit may write the second flag indicating whether the first voltage is applied or the second voltage is applied in the fourth storage region in regard to each of the plurality of pixels based on the comparison result. The determination unit may determine the condition which the plurality of pixels satisfy among the plurality of conditions by the use of the first and second flags stored in the third and fourth storage regions, respectively.

According to the control device, the condition can be determined more easily compared to the case where the above-mentioned configuration is not provided.

In the control device according to the aspect of the invention, when the third data stored in the second storage region does not correspond to the second data stored in the first storage region in regard to the pixel for which it is determined that the first data stored in the memory register does not correspond to the second data stored in the first storage region, the control unit may write, as the target time, fifth data corresponding to the first data stored in the memory register in the first storage region having waited until the third data stored in the second storage region corresponds to the second data stored in the first storage region.

According to the control device, display unevenness can be prevented compared to a configuration in which no waiting is performed until the third data stored in the second storage region corresponds to the second data stored in the first storage region.

In the control device according to the aspect of the invention, the plurality of scanning lines may be divided into a plurality of blocks. The power voltage line may include a plurality of power voltage lines so as to have one-to-one correspondence to the plurality of blocks. The control unit may control the output unit such that the output unit outputs the signal used for switching one of the first and second voltages applied to the plurality of power voltage lines for each block.

According to the control device, driving can be further optimized compared to a case where a single power voltage line is used.

In the control device according to the aspect of the invention, the electro-optic device may include a power line driving circuit switching the one of the first and second voltages applied to the plurality of power voltage lines for each block. The control unit may control the output unit such that the output unit outputs the signal used for controlling the power line driving circuit.

According to the control device, driving can be performed more easily compared to a case where no power line driving circuit is provided.

According to still another aspect of the invention, there is provided a display device including: the control device described above; and an electro-optic device driven in accordance with the signal output from the control device.

In the display device, the electro-optic device can be driven at higher speed compared to a case where no driving is performed in accordance with the different states of the pixels.

According to still another aspect of the invention, there is provided an electronic apparatus including the above-described display device.

In the electronic apparatus, the electro-optic device can be driven at higher speed compared to a case where no driving is performed in accordance with the different states of the pixels.

BRIEF DESCRIPTION OF THE DRAWINGS

The invention will be described with reference to the accompanying drawings, wherein like numbers reference like elements.

FIG. 15 is a diagram illustrating an example of an operation when a third driving pattern is applied.

DESCRIPTION OF EXEMPLARY EMBODIMENTS

1. Configuration

Figure 1:
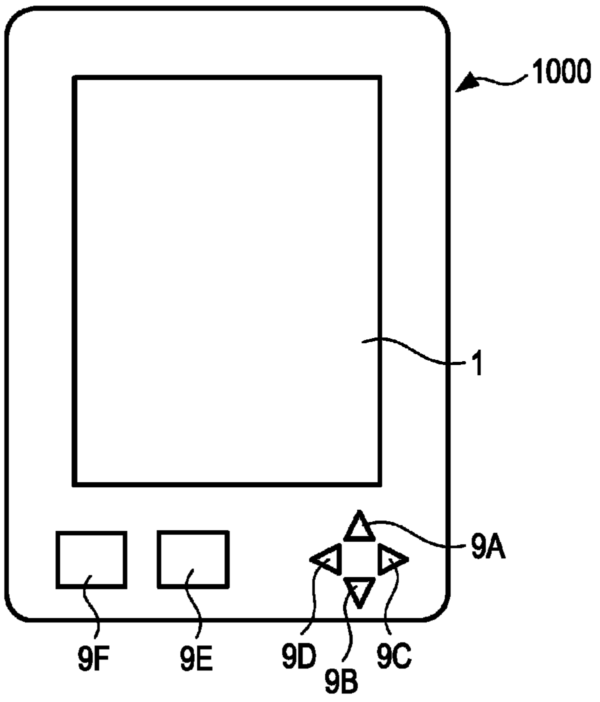
FIG. 1 is a diagram illustrating an outer appearance of an electronic apparatus according to an embodiment.

FIG. 1 is a diagram illustrating the outer appearance of an electronic apparatus 1000 according to an embodiment. The electronic apparatus 1000 is a display apparatus which displays an image. For example, the electronic apparatus 1000 browses an electronic book (which is an example of a document), that is, a so-called electronic book reader. The electronic book is configured with data which includes a plurality of pages. The electronic apparatus 1000 displays the electronic book in a given unit (for example, each page) on a display unit 1. A single page to be displayed among the plurality of pages included in the electronic book is referred to as a “selection page.” The selection page is changed when a user operates buttons 9A to 9F. The user can turn the pages (send the pages or return the pages) of the electronic book by operating the buttons 9A to 9F.

Figure 2:
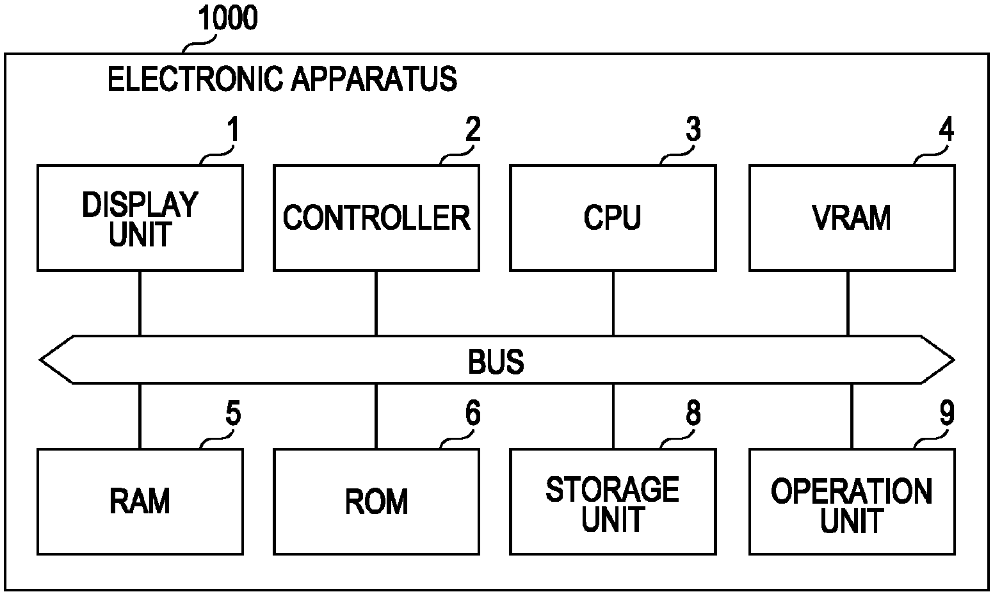
FIG. 2 is a block diagram illustrating a hardware configuration of an electronic apparatus.

FIG. 2 is a block diagram illustrating a hardware configuration of the electronic apparatus 1000. The electronic apparatus 1000 includes the display unit 1, a controller 2 (which is an example of a control device), a CPU (Central Processing Unit) 3, a VRAM (Video Random Access Memory) 4, a RAM (Random Access Memory) 5, a ROM (Read Only Memory) 6, a storage unit 8, an operation unit 9, and a bus BUS. The display unit 1 has a display panel which includes display elements displaying an image. For example, the display element includes s display element using electrophoretic particles as a memorable display element retaining display even when no energy is supplied by application of a voltage. The display unit 1 enables the display elements to display an image with a plurality of monochrome gray scales (in this example, two monochrome gray scales). The controller 2 controls the display unit 1. The CPU 3 is a processing device (processor) which controls each unit of the electronic apparatus 1000. The CPU 3 executes a program stored in the ROM 6 or the storage unit 8 by using the RAM 5 as a work area. The VRAM 4 is a memory which stores image data indicating the image displayed on the display unit 1. The RAM 5 is a memory which stores data. The storage unit 8 is a non-volatile memory which stores data (book data) of an electronic book. The storage unit 8 can store the data of a plurality of electronic books. The operation unit 9 is an input device which inputs an instruction from a user. For example, the operation unit 9 includes a touch screen, a key pad, or buttons. The buttons 9A to 9F shown in FIG. 1 are specific examples of the operation unit 9. The bus BUS is a transmission path through which data or signals are transmitted between the constituent elements.

Figure 3:
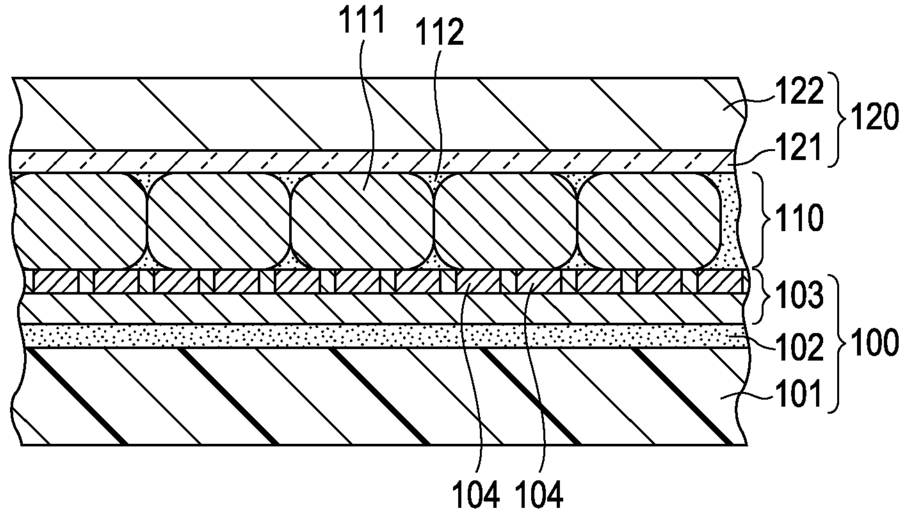
FIG. 3 is a schematic diagram illustrating a cross-sectional configuration of a display unit.

FIG. 3 is a schematic diagram illustrating a cross-sectional configuration of the display unit 1. The display unit 1 includes a first substrate 100, an electrophoretic layer 110, and a second substrate 120. The first substrate 100 and the second substrate 120 interpose the electrophoretic layer 110.

The first substrate 100 includes a substrate 101, an adhesive layer 102, and a circuit layer 103. The substrate 101 is made of a material, such as polycarbonate, having an insulation property and a flexible property. The substrate 101 may be made of a resin material other than polycarbonate as long as the resin material has a lightweight property, a flexible property, and an insulation property. As another example, the substrate 101 may be made of glass having no flexible property. The adhesive layer 102 is a layer which adheres the substrate 101 and the circuit layer 103 to each other. The circuit layer 103 is a layer which includes a circuit driving the electrophoretic layer 110. The circuit layer 103 includes pixel electrodes 104.

The electrophoretic layer 110 includes microcapsules 111 and binders 112. The microcapsules 111 are fixed by the binders 112. The binder 112 is made of a material which has excellent affinity with the microcapsule 111, excellent adhesiveness with an electrode, and an insulation property. The microcapsule 111 is a capsule which has a dispersion medium and electrophoretic particles therein. The microcapsule 111 is made of a material, such as a gum arabic gelatin-based compound or a urethane-based compound, having a flexible property. Further, an adhesive layer made of an adhesive material may be disposed between the microcapsules 111 and the pixel electrodes 104.

Examples of the dispersion medium include water, alcoholic solvent (such as methanol, ethanol, isopropanol, butanol, octanol, and methyl cellosolve), esters (such as ethyl acetate and butyl acetate), ketones (such as acetone, methylethyl ketone, and methyl isobutyl ketone), aliphatic hydrocarbons (such as pentane, hexane, and octane), alicyclic hydrocarbons (such as cyclohexane and methyl cyclohexane), aromatic hydrocarbons (such as benzene, toluene, and benzenes having a long-chain alkyl group (such as xylene, hexyl benzene, heptyl benzene, octyl benzene, nonyl benzene, decyl benzene, undecyl benzene, dodecyl benzene, tridecyl benzene, and tetradecyl benzene)), halogenated hydrocarbon (such as methylene chloride, chloroform, carbon tetrachloride, and 1,2-dichloroethane), carboxylate salt.

Other examples of the dispersion medium include other oil substances. These materials may be used as a mixture. Further, for example, surfactant may be mixed in the dispersion medium.

The electrophoretic particles are particles (polymer or colloid) having a property of the particles being moved in the dispersion medium by an electric field. In this embodiment, white electrophoretic particles and black electrophoretic particles are stored in the microcapsules 111. The black electrophoretic particles are particles including black pigments such as aniline black or carbon black and are charged positively in this embodiment. The white electrophoretic particles are particles including white pigments such as titanium dioxide or aluminum oxide and are charged negatively in this embodiment.

The second substrate 120 includes a film 121 and a common electrode 122. The film 121 seals and protects the electrophoretic layer 110. The film 121 is made of a material, such as polyethylene terephthalate, having a transparent insulation property. The common electrode 122 is made of a material, such as an indium tin oxide (ITO), having a transparent conductive property.

Figure 4:
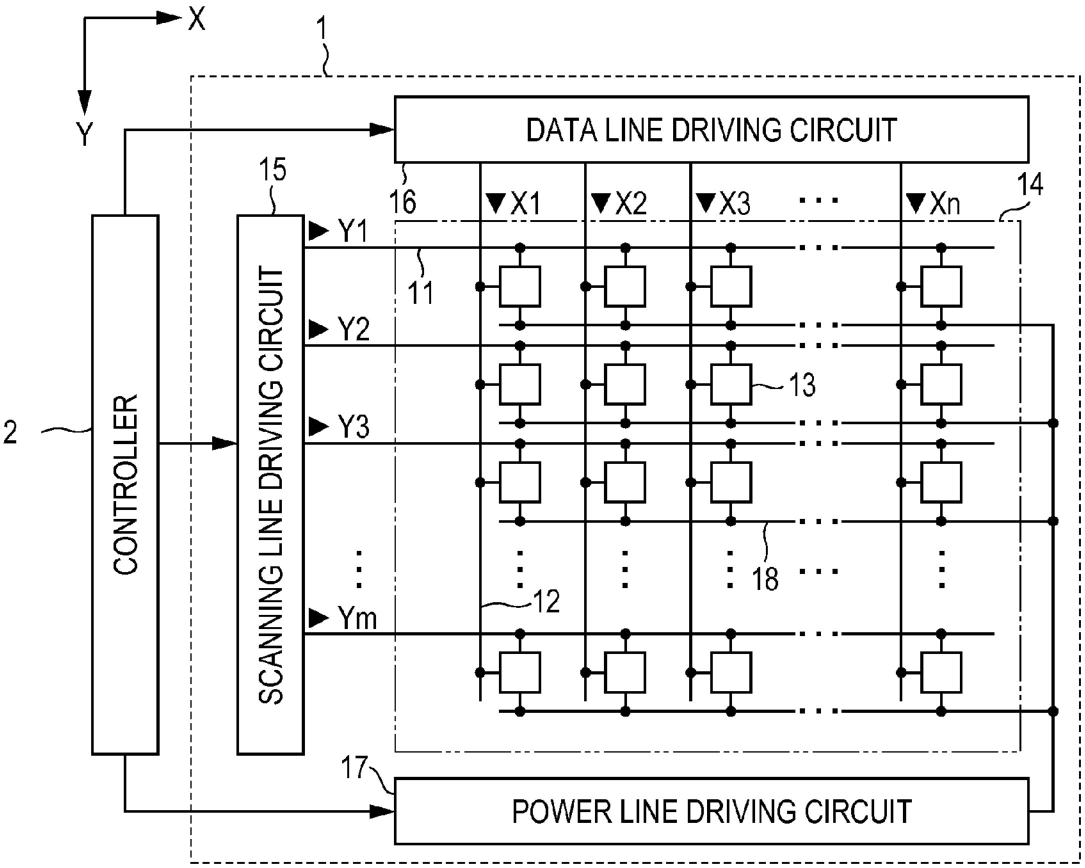
FIG. 4 is a diagram illustrating a circuit configuration of a display unit.

FIG. 4 is a diagram illustrating the circuit configuration of the display unit 1. The display unit 1 includes m scanning lines 11, n data lines (sampling signal lines) 12, m×n pixels 13, a scanning line driving circuit 15, a data line driving circuit 16, a power line driving circuit 17, and a power line 18. A display region 14 includes the m×n pixels 13. Hereinafter, a pixel in an i-th row and a j-th column is referred to as a pixel 13 (i, j). The same is applied to an element inside the pixel 13. The scanning line driving circuit 15, the data line driving circuit 16, and the power line driving circuit 17 are controlled by the controller 2. The scanning lines 11 are arranged in a row direction (x direction) and transmit scanning signals. The scanning signal is a signal for exclusively selecting a single scanning line 11 in sequence among the m scanning lines 11. The data lines 12 (which are exemplary signal lines) are arranged in a column direction (y direction) and transmit data signals. The data signal is a signal in accordance with the gray scale of each pixel. The power line 18 is a wiring through which a voltage applied to the pixel electrodes 104 is supplied. The scanning lines 11, the data lines 12, and the power line 18 are insulated from each other. The pixels 13 are arranged at the intersections between the scanning lines 11 and the data lines 12 and exhibit the gray scales in accordance with the data signals. In particular, the scanning line 11 in an i-th row among the plurality of scanning lines 11 is referred to an i-th row scanning line 11. The same is applied to the data lines 12. In this example, the power line 18 is common to all of the pixels 13.

Figure 5:
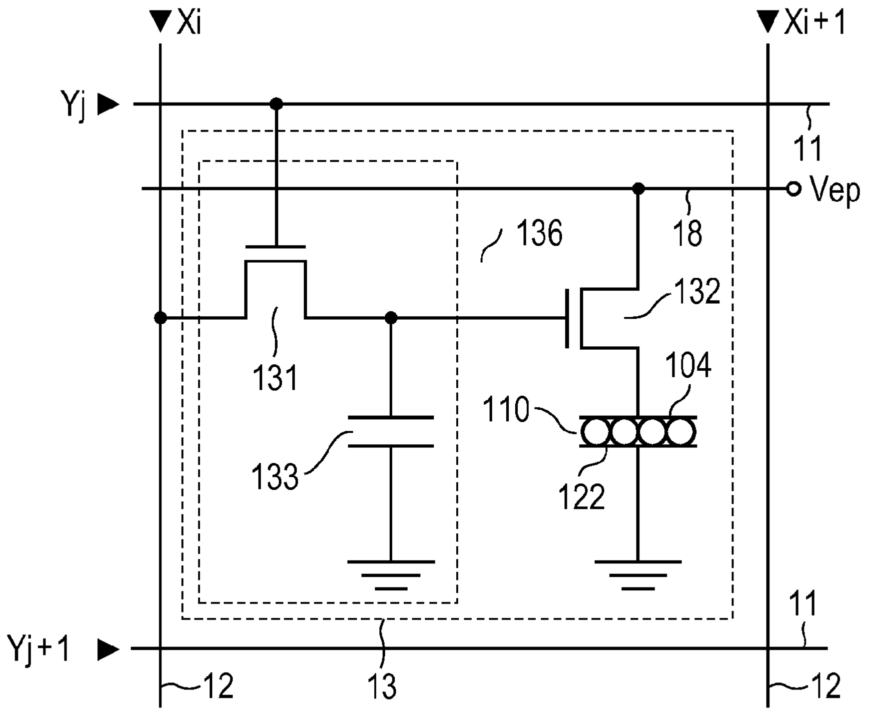
FIG. 5 is a diagram illustrating an equivalent circuit of a 2T1C-type pixel.

FIG. 5 is a diagram illustrating the equivalent circuit (pixel circuit) of a pixel 13 (i, j). For example, the pixel 13 is a so-called 2T1C-type pixel including two transistors and one capacitive element. The pixel 13 includes transistors 131 and 132, and a capacitive element 133, and a pixel electrode 104. The transistors 131 and 132 are an example of a switching element. In this example, the transistors 131 and 132 are n channel-type TFTs (Thin Film Transistor). The gate and source of the transistor 131 are connected to the i-th row scanning line 11 and the j-th column data line 12, respectively. The drain of the transistor 131 is connected to the gate of the transistor 132. The drain of the transistor 131 is connected to one end of the capacitive element 133. The other end of the capacitive element 133 is grounded. The source and drain of the transistor 132 are connected to the power line 18 and the pixel electrode 104, respectively. The electrophoretic layer 110 is interposed between the pixel electrodes 104 and the common electrode 122. The common electrode 122 is grounded. The transistor 131 and the capacitive element 133 form a memory circuit 136. The memory circuit 136 includes a first input terminal (the gate of the transistor 131) connected to the scanning line 11, a second input terminal (the source of the transistor 131) connected to the data line 12, and a first output terminal (the drain of the transistor 131). The memory circuit 136 enables the capacitive element 133 to hold the voltage applied to the data line 12 when the corresponding scanning line 11 is selected. Before the operation of the 2T1C-type pixel is described, the operation of a so-called 1T1C including one transistor and one capacitive element will be described.

Figure 6:
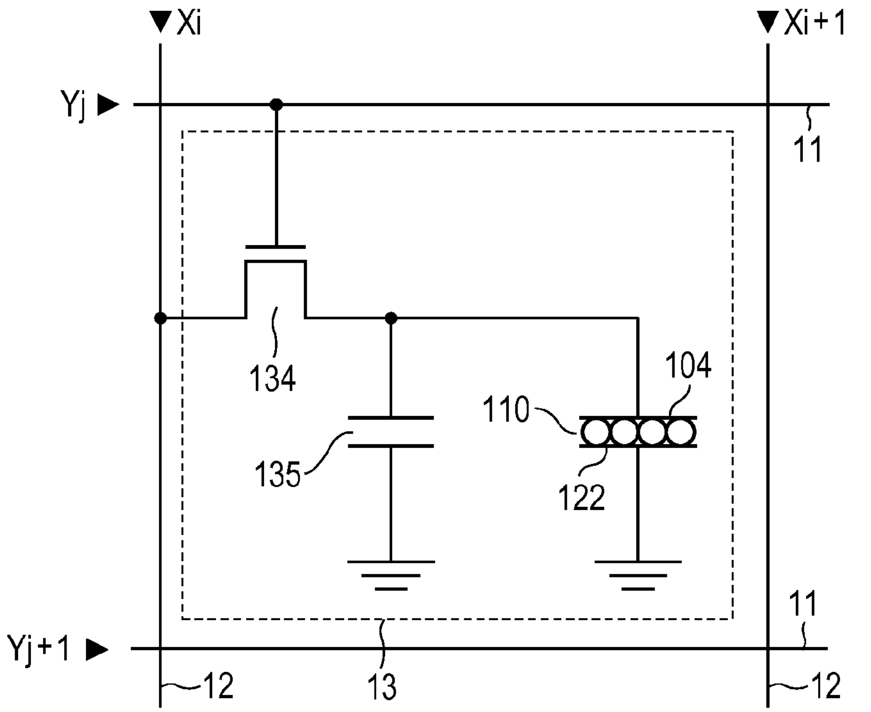
FIG. 6 is a diagram illustrating an equivalent circuit of a 1T1C-type pixel.

FIG. 6 is a diagram illustrating the equivalent circuit of the 1T1C-type pixel. For example, the pixel 13 includes a transistor 134, a capacitive element 135, and the pixel electrode 104. A gate, a source, a the drain of the transistor 134 are connected to the i-th row scanning line 11, the j-th column data line 12, and the pixel electrode 104, respectively. Further, one end of the capacitive element 135 is connected to the drain (that, the pixel electrode 104) of the transistor 134. The other end of the capacitive element 135 is grounded. The electrophoretic layer 110 is interposed between the pixel electrodes 104 and the common electrode 122. The common electrode 122 is grounded.

The 1T1C-type pixel is driven as follows. The scanning line driving circuit 15 supplies the scanning lines 11 with a scanning signal for exclusively selecting a single scanning line 11 in sequence among the plurality of scanning lines 11. The data line driving circuit 16 applies a data voltage Vd corresponding to a gray scale value of the pixels in the selected scanning line 11 to the data line 12. The scanning signal applies a voltage VH with an H (high level) to the selected scanning line 11 and applies a voltage VL with an L (Low) level to the non-selected scanning lines 11. The voltage VH is higher than a threshold voltage for allowing the transistor 131 to enter an ON state. The voltage VL is lower than the threshold voltage for allowing the transistor 131 to enter the ON state. Hereinafter, applying the voltage VH to the i-th row scanning line 11 is referred to as "selecting the i-th row scanning line 11." Further, applying the voltage VL to the i-th row scanning line 11 is referred to as "not selecting the i-th row scanning line 11." Furthermore, applying the voltage VH to the i-th row scanning line 11 and then applying the voltage VL to the i-th row scanning line 11 is referred to as "ending the selection of the i-th row scanning line 11." A signal indicating the voltage VH is referred to as a "selection signal" and a signal indicating the voltage VL is referred to as a "non-selection signal." When the selection signal is input to the gate of the transistor 134, the transistor 134 enters the ON state. When the plurality of scanning lines 11 continues to be scanned, a period in which a given scanning line 11 is selected and the given scanning line 11 is then selected again is referred to a "frame."

When the transistor 134 enters the ON state, the data voltage Vd applied to the data line 12 is applied to the pixel electrodes 104. The capacitive element 135 is charged with the voltage applied to the data line 12. When selection signal is changed into the non-selection signal after a given time elapses, the transistor 134 enters an OFF state. When the transistor 134 enters the OFF state, the data line 12 and the pixel electrodes 104 are insulated from each other. However, the energy (charge) accumulated in the capacitive element 135 enables the charged particles to move, and thus the optical state of the electrophoretic layer 110 is changed. The capacitive element 135 emits the energy with the change in the optical state. That is, the energy accumulated in the capacitive element 135 gradually decreases.

Herein, the "optical state" of the pixel 13 refers to the brightness (lightness), saturation, or color of the pixel 13. Hereinafter, the reflectance changed with the movement of the charged particles in an electrophoretic element will be described as an example of the optical state of the pixel 13. The display unit 1 displays two monochrome gray scales by a change in the reflectance.

The data voltage Vd is applied to the electrophoretic layer 110. For example, when Vd=Vb (>0), a positive voltage is applied to the electrophoretic layer 110 by using the common electrode 122 as a reference. Alternatively, when Vd=Vw (<0), a negative voltage is applied to the electrophoretic layer 110 by using the common electrode 122 as a reference. That is, the pixels to which the positive voltage is applied and the pixels to which the negative voltage is applied can coexist in a given frame.

Figure 7A:
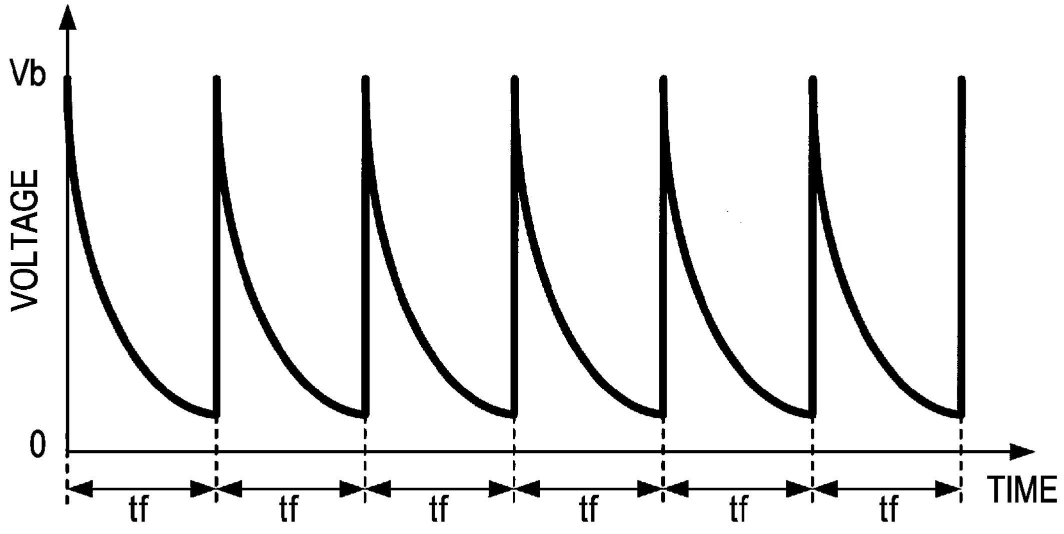
FIGS. 7A and 7B are diagrams illustrating waveforms of voltages applied to pixels.

FIG. 7A is a schematic diagram illustrating an waveform of a voltage applied to the 1T1C-type pixel 13. The selection signal is input to a single pixel 13 during about 1/m of one frame period tf. At this time, in a case where the data voltage Vd satisfies a relation of "Vd=Vb," the voltage Vb is applied when the transistor 134 enters the ON state, and thus the transistor 134 enters the OFF state. Thereafter, the voltage gradually decreases, that is, attenuates with the discharge of the capacitive element 135. The time constant of the decrease in the voltage depends on the capacitance value of the capacitive element 135. In order to supply a large energy by the electrophoretic layer 110, it is desirable to increase the size of the capacitive element 135. In many cases, the energy sufficient to change the optical state of the electrophoretic layer 110 into a desired state is rarely accumulated in the capacitive element 135 by the application of the data voltage in a single frame. Accordingly, a problem may arise in that the capacitive element 135 has to be repeatedly charged by the application of the data voltage in a plurality of continuous frames. At this time, the data voltage is changed in accordance with the gray scale value of each pixel 13. Accordingly, there is a possibility that the voltage applied to the data line 12 is changed whenever the selected scanning line 11 is changed. Since the data line 12 has a parasitic capacitance, a problem may arise in that power is consumed when the voltage is changed.

Referring back to FIG. 5, the operation of the 2T1C-type pixel will be described. In the driving of the 2T1C-type pixels, a frame (hereinafter, referred to as a "black frame") for changing the gray scale from white (which is an example of a second optical state) to black (which is an example of a first optical state) and a frame (hereinafter, referred to as a "white frame") for changing the gray scale from black to white are distinguished from each other. The scanning line driving circuit 15 supplies the scanning line 11 with a scanning signal for exclusively selecting one scanning line 11 in sequence among the plurality of scanning lines 11. The data line driving circuit 16 applies a sampling signal S corresponding to the gray scale of the pixels 13 in the selected scanning line 11 to the data line 12. The sampling signal S is a signal for applying the voltage VH to the pixel 13 (which is an example of a first pixel and is referred to as a "black-written pixel" below) of which the gray scale is changed from the white to the black and applying the voltage VL to the pixel 13 (which is an example of a second pixel and is referred to as a "white-written pixel" below) of which the gray scale is changed from white to black and the pixel 13 (which is a third pixel) of which the gray scale is not changed. In the white frame, the sampling signal S is a signal which has the voltage VH in the case of the white-written pixel and has the voltage VL in the case of the black-written pixel and the pixel 13 of which the gray scale is not changed. For example, in the black-written pixel of the black frame, the transistor 131 enters the ON state and the voltage VH is input to the gate of the transistor 132. At this time, the charge corresponding to the voltage VH is accumulated in the capacitive element 133. The selection signal is changed into the non-selection signal after the elapse of a given time, and then the transistor 131 enters the OFF state. When the transistor 131 enters the OFF state, the data line 12 and the gate of the transistor 132 are insulated from each other, but the voltage VH continues to be applied to the gate of the transistor 132 by the charge accumulated in the capacitive element 133. When the signal of the voltage VH is input, the transistor 132 enters the ON state. That is, the transistor 132 of the white-written pixel continues to be in the ON state between the black frames. At this time, when a voltage Vb is applied to the power line 18, the voltage Vb is applied to the pixel electrodes 104.

Figure 7B:
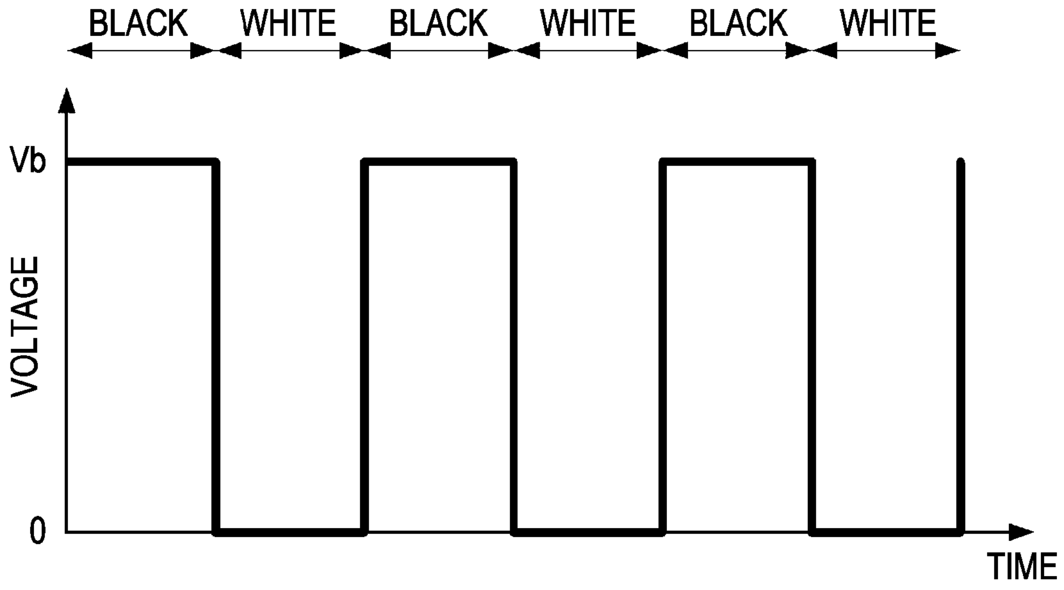

FIG. 7B is a schematic diagram illustrating a waveform of a voltage applied to the 2T1C-type pixel 13. The selection signal is input to a single pixel 13 during about 1/m of one frame period tf. Since the voltage VH is retained by the capacitive element 133, the transistors 132 continue to be in the ON state even after the scanning signal becomes the non-selection signal. At this time, when a voltage Vep of the power line 18 satisfies a relation of "Vep=Vb", the voltage Vb continues to be applied to the pixels 13 between the black frames. FIG. 7B shows an example in which each black frame and each white frame are alternately repeated. In the white frame, when the transistor 131 of the black-written pixel enters the ON state, the voltage VL is input to the input of the transistor 132 and thus the transistor 132 enters the OFF state. In the white frame, the optical state of the black-written pixel is not changed even when the voltage Vep of the power line 18 satisfies the relationship of "Vep=Vw." Unlike the 1T1C-type pixel, the voltage applied to the pixel 13 does not attenuate in the 2T1C-type pixel. Since the optical state of the electrophoretic layer 110 is changed by the electric energy supplied from the power line 18, the transistor 132 may be switched to the OFF state after a sufficient time elapses to become a desired state. In principle, the pixel 13 can be made to enter a desired optical state by rewriting the black frame once and rewriting the white frame once, that is, rewriting the black frame and the white frame twice in total. Accordingly, compared to the 1T1C-type pixel, it is possible to reduce the number of switches of the voltage in the data line 12. Thus, the power consumption can be reduced.

Since the electric energy continues to be supplied from the power line 18 in the 2T1C-type pixels, an optical response of the electrophoretic layer 110 is faster compared to the 1T1C-type pixels. The voltage for retaining the transistor 132 in the ON state suffices for the capacitive element 133. The size of the capacitive element 133 can be made to reduced compared to the size of the capacitive element 135 of the 1T1C-type pixel. In some cases, the parasitic capacitance of the gate of the transistor 132 can be used for the capacitive element 133.

Although the 2T1C-type pixel has the above-mentioned features, it is generally considered that the 1T1C-type pixel is capable of executing fast rewriting in that the black-written pixel and the white-written pixel may not coexist in a single frame. Thus, according to the study by the inventors, it can be understood that the variation in the reflectance of the electrophoretic layer 110 mainly depends on time integration of the applied voltage. In terms of this configuration, it may not be said that the 2T1C-type pixel is slow in the rewriting as it can be understood the comparison between the waveforms shown in FIGS. 7A and 7B.

Hereinafter, a case will be described as an example in which the time integration corresponding to two frames of the applied voltage for the 1T1C-type pixel is the same as the time integration corresponding to one frame of the applied voltage for the 2T1C-type pixel and the gray scale of the pixel is changed from the white to the black or from the black to the white by the applied voltage for the 2T1C-type pixel in seven frames (seven times) in order to facilitate the description. In this example, the optical response made by the applied voltage for the 1T1C-type pixel in two frames is the same as the optical response made by the applied voltage for the 2T1C-type pixel in one frame. For example, when the pixels of which the gray scale is changed from the white to the black and the pixels of which the gray scale is changed from the black to the white coexist, the time to rewrite the pixels is fourteen frames which is the same for both the 1T1C-type pixel and the 2T1C-type pixel.

In this embodiment, the display unit 1 is driven using one driving pattern selected among a plurality of driving patterns in accordance with the pixel state of the 2T1C-type pixels under the above-described setting. Specifically, patterns (a) to (c) described below are used.

(a) The black frame continues seven times when the m×n pixels 13 include only the black-written pixels and the pixels of which the gray scale is not changed.

(b) The white frame continues seven times when the m×n pixels 13 include only the white-written pixels and the pixels of which the gray scale is not changed.

(c) The black frame and the white frame are alternately repeated fourteen times in total when the m×n pixels 13 include both the black-written pixels and the white-written pixels.

According to this driving method, the rewriting speed is the same as that of the 1T1C-type pixel in the case of the pattern (c), whereas the rewriting speed is the double of that of the 1T1C-type pixel in the case of the patterns (a) and (b). Accordingly, in a general viewpoint, the rewriting can be executed faster compared to the 1T1C-type pixel according to this driving method.

Figure 8:
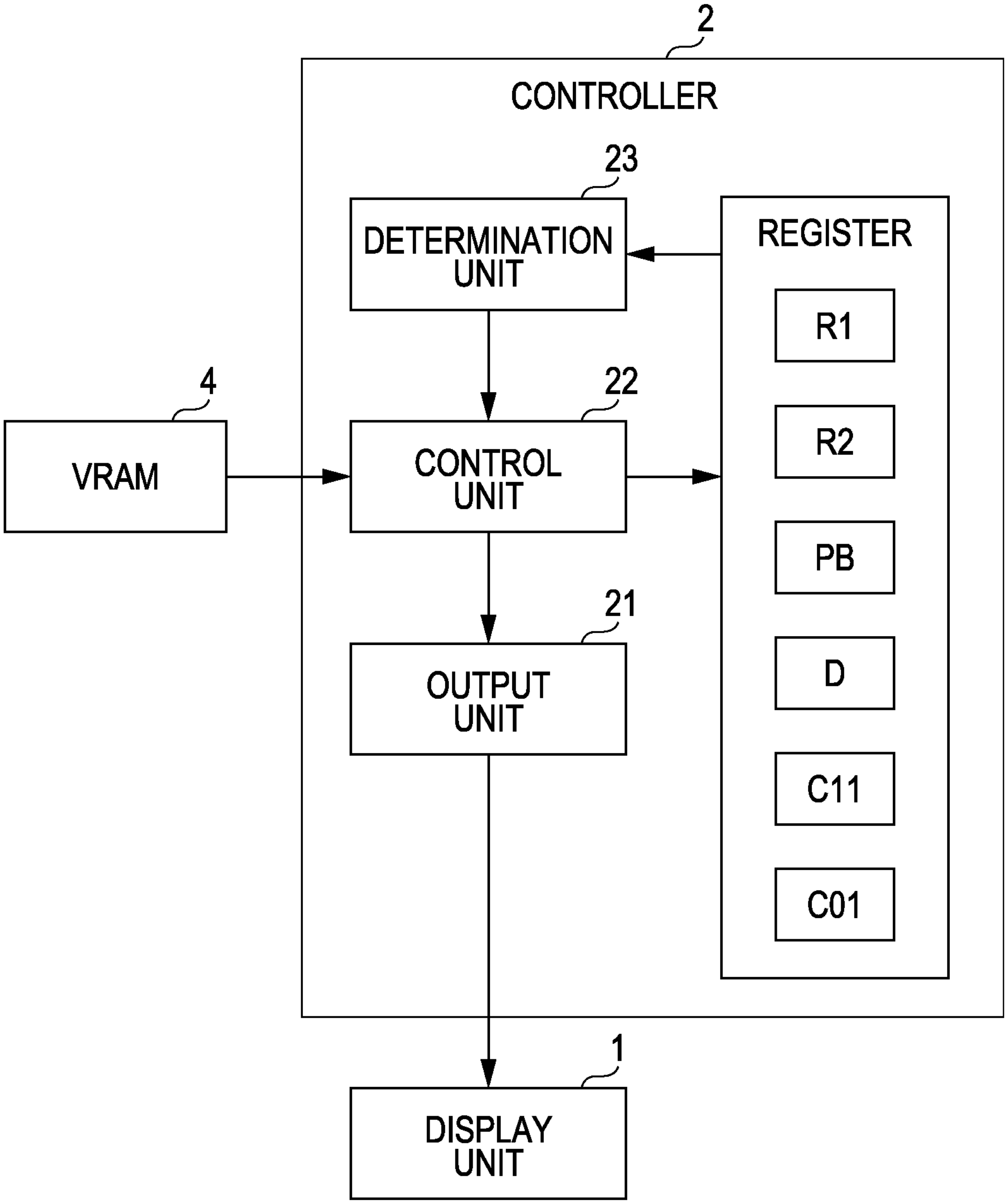
FIG. 8 is a block diagram illustrating a functional configuration of a controller.

FIG. 8 is a block diagram illustrating a functional configuration of the controller 2. The controller 2 includes an output unit 21, a determination unit 23, a control unit 22, a register R1, a register R2, a register PB, a register D, a register C11, and a register C01. The output unit 21 outputs, to the display unit 1, a signal for controlling the scanning line driving circuit 15, the data line driving circuit 16, and the power line driving circuit 17. The controller 22 rewrites values of the register R1, the register R2, the register PB, the register D, the register C11, and the register C01 based on data stored in the VRAM 4. The determination unit 23 determines which driving condition is satisfied among a plurality of driving conditions by an image stored in the VRAM 4 by the use of the data stored in the register R1, the register R2, the register PB, the register D, the register C11, and the register C01. The control unit 22 controls the output unit 21 such that the output unit 21 outputs a signal of a pattern in accordance with a determination result of the determination unit 23. The register R1 is a storage region for storing a target value (target time R1) of an application time of a voltage for making a gray scale corresponding to an image stored in the VRAM 4. The register R2 is a storage region for storing an accumulation value (accumulation time R2) of the application time of the voltage. In this example, the time of the applied voltage in about one frame is constant. Accordingly, the number of frames in which the voltage is applied is used as the target time R1 and the accumulation time R2. The register PB is a storage region for storing a flag B and a flag P. The register R1, the register R2, and the register PB have m×n storage regions corresponding to the m×n pixels 13. That is, the register R1, the register R2, and the register PB and all the pixels 13 have a one-to-one correspondence relationship. The flag B (Busy) is a flag which indicates the presence or absence of the application of a voltage. For example, when B=0, the flag B indicates that no voltage is applied to the pixels. When B=1, the flag B indicates that a voltage is applied to the pixels. The flag B is set to 1 when R1≠R2, whereas the flag B is set to 0 when R1=R2. The flag P (polarity) is a flag which indicate the polarity of a voltage applied to the pixels. For example, a negative voltage is applied when P=0, whereas a positive voltage is applied when P=1. The flag P is set to 1 when R1>R2, whereas the flag P is set to 0 when R<R2. When R1=R2, the flag P is not defined. The register C11 stores a counter C11 indicating the number of pixels 13 in which PB=11. The register C01 stores a counter C01 indicating the number of pixels 13 in which PB=01.

A plurality of driving conditions include three conditions defined with the relationship with the register PB.

(1) First Driving Condition

At least one pixel in which B=1 is present and a relationship of P=1 is satisfied for all the pixels in which B=1 (which corresponds to the above-described pattern (a)).

(2) Second Driving Condition

At least one pixel in which B=1 is present and a relationship of P=0 is satisfied for all the pixels in which B=1 (which corresponds to the pattern (b)).

(3) Third Driving Condition

At least one pixel in which B=1 is present and the pixels in which B=1 include both the pixels in which P=0 and the pixels in which P=1 (which corresponds to the pattern (c)).

The register D is a storage region for storing a flag D. The flag D is a 2-bit flag which indicates the driving pattern to be applied. Since the flag D is common to all the pixels, one flag D is provided. For example, when the first driving condition is satisfied, the first driving pattern is applied. When the second driving condition is satisfied, the second driving pattern is applied. When the third driving condition is satisfied, the third driving pattern is applied. When the first driving pattern is applied, D=01 is set. When the second driving pattern is applied, D=00 is set. When the third driving pattern is applied, D=1×is set. In the black frame, X=1 is set. In the white frame, X=0 is set. That is, the lower bit of the flag D represents the polarity of the applied voltage.

In summary, the controller 2 includes the register R1 (which is an example of a first storage region) storing data indicating the target time R1 of the applied voltage for the pixels 13, the register R2 (which is an example of a second storage region) storing data indicating the accumulation time R2 for the pixels 13, and the register PB (which is an example of a third storage region and a fourth storage region) storing the flag B indicating whether the voltage is applied to each of the pixels 13 and the flag P indicating whether the voltage Vb (which is an example of a first voltage) or a voltage Vw (which is an example of a second voltage) is applied. The control unit 22 determines whether the data stored in the VRAM 4 corresponds to the data stored in the register R1 for each of the pixels 13. The control unit 22 writes the data corresponding to the data stored in the VRAM 4 as the target time R1 in the register R1 in regard to the pixel 13 for which the control unit 22 determines that the data stored in the VRAM 4 does not correspond to the data stored in the register R1. The control unit 22 measures the accumulation time R2 in which the transistor 132 is in the ON state for the pixel of which the transistor 132 is in the ON state among the pixels 13 of m rows by n columns. The control unit 22 writes the flag B in the register PB in regard to each pixel 13 based on the comparison results which are the data stored in the register R2 and the data stored in the register R1. The control unit 22 writes the flag P, which indicates whether the voltage Vb or the voltage Vw is applied, in the register PB by the use of the comparison results in regard to each pixel 13. The determination unit 23 determines which driving condition is satisfied among the plurality of driving conditions by the pixels 13 of m rows by n columns by the use of the flag B and the flag P stored in the register PB.

2. Operation

Figure 9:
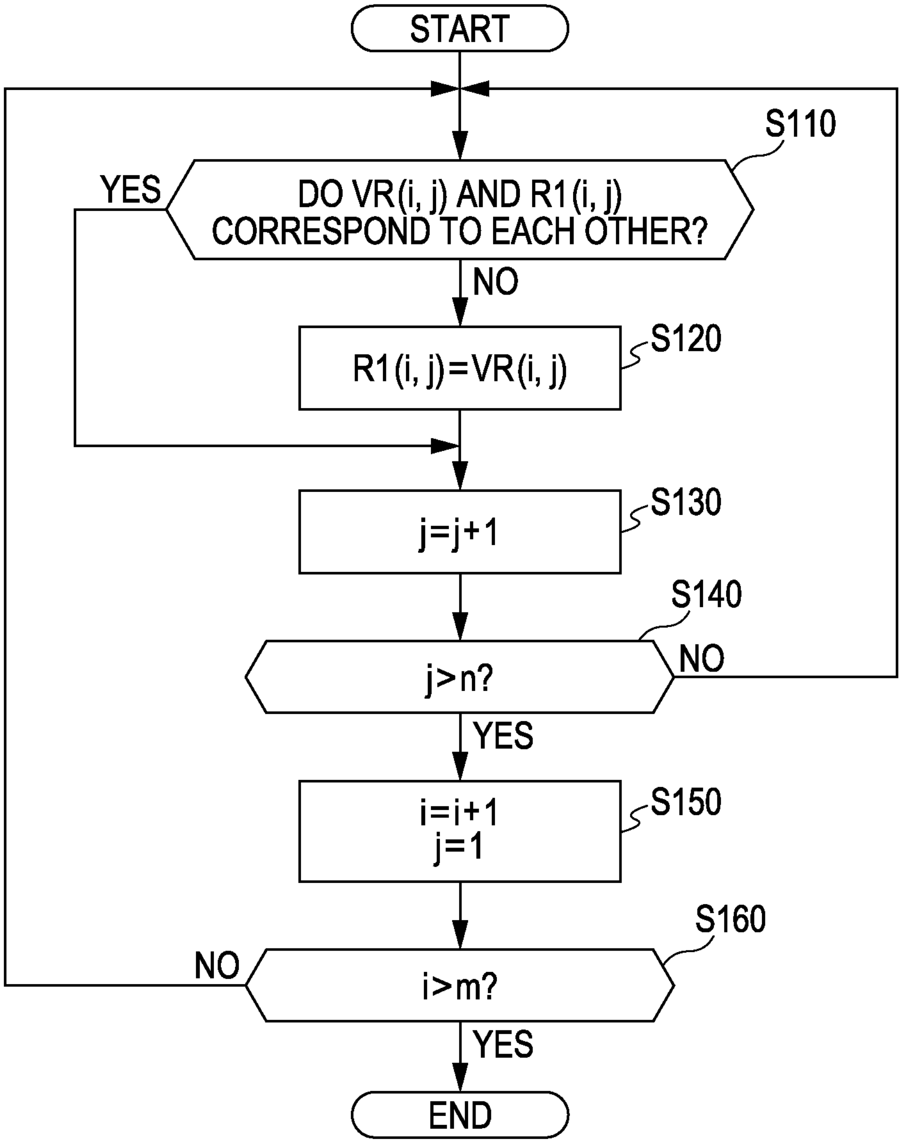
FIG. 9 is a flowchart illustrating a comparison process between data and a target time.

FIG. 9 is a flowchart illustrating a comparison process between data VR and the target time R1 in the controller 2. The CPU 3 rewrites the data stored in the VRAM 4 at a timing independently from the operation of the controller 2 in accordance with an OS (Operating System) or an application program. When the CPU 3 rewrites the data stored in the VRAM 4, the CPU 3 outputs a rewriting notification indicating that the rewriting in the VRAM 4 is executed to the controller 2. The flow shown in FIG. 9 starts, for example, when the controller 2 receives the rewriting notification. Before the start of the flow shown in FIG. 9, the control unit 22 initializes values stored in the register R1, the register R2, the register PB, and the register D to zero when power is input to the electronic apparatus 1000. Further, the controller 22 initializes variables i and j to "i=j=1." The variables i and j are variables for designating the row and column of the pixel 13.

In step S110, the control unit 22 determines whether the data VR (i, j) and the target time R1 (i, j) correspond to each other. The data VR (i, j) indicates the gray scale value of the pixel 13 in an i-th row and a j-th column among the data stored in the VRAM 4. For example, the data VR (i, j) is binary data. "VR (i, j)=0" indicates white and "VR (i, j)=1" indicates black. The target time R1 (i, j) indicates a target time of the pixel 13 (i, j) among the data stored in the register R1. For example, the target time R1 (i, j) is binary data. A relationship of "R1 (i, j)=7" is satisfied for the pixel 13 with the black gray scale. A relationship of "R1(*i*, j)=0" is satisfied for the pixel 13 with the white gray scale. That is, when VR (i, j)=0, the data VR (i, j) and the target time R1 (i, j) correspond to each other in the case of "R1 (i, j)=0", whereas the data VR (i, j) and the target time R1 (i, j) do not correspond to each other in the case of "R1 (i, j)=7." Likewise, when VR (i, j)=1, the data VR (i, j) and the target time R1 (i, j) correspond to each other in the case of "R1 (i, j)=7", whereas the data VR (i, j) and the target time R1 (i, j) do not correspond to each other in the case of "R1 (i, j)=0." When it is determined that the data VR (i, j) and the target time R1 (i, j) correspond to each other (YES in step S110), the control unit 22 allows the process to step S130. On the other hand, when it is determined that the data VR (i, j) and the target time R1 (i, j) do not correspond to each other (NO in step S110), the control unit 22 allows the process to step S120.

In step S120, the control unit 22 accesses the register R1 and rewrites a value of the target time R1 (i, j) to a value corresponding to the data VR (i, j). For example, when VR (i, j)=0, the control unit 22 can rewrite the value to "R1 (i, j)=0." When VR (i, j)=1, the control unit 22 can rewrite the value to "R1 (i, j)=7."

In step S130, the control unit 22 updates the value of the variable j by a relationship of "j=j+1." In step S140, the control unit 22 determines whether j>n, that is, the process is completed for all the pixels 13 in the i-th row. When the control unit 22 determines that the process is not completed on all the pixels 13 in the i-th row (NO in step S140), the control unit 22 allows the process to proceed to step S110. On the other hand, when the control unit 22 determines that the process is completed on all the pixels 13 in the i-th row (YES in step S140), the control unit 22 allows the process to proceed to step S150. In step 150, the control unit 22 updates the value of the variable i by a relationship of "i=i+1." Further, the control unit 22 sets the value of the variable j to "j=1." In step S160, the control unit 22 determines whether i>m, that is, the process is completed on all the pixels 13 in an m-th row and an n-th column. When the control unit 22 determines that the process is not completed on all the pixels 13 (NO in step S160), the control unit 22 allows the process to proceed to step S110. On the other hand, when the control unit 22 determines that the process is completed on all the pixels 13 (YES in step S160), the control unit 22 ends the flow shown in FIG. 9.

Figure 10:
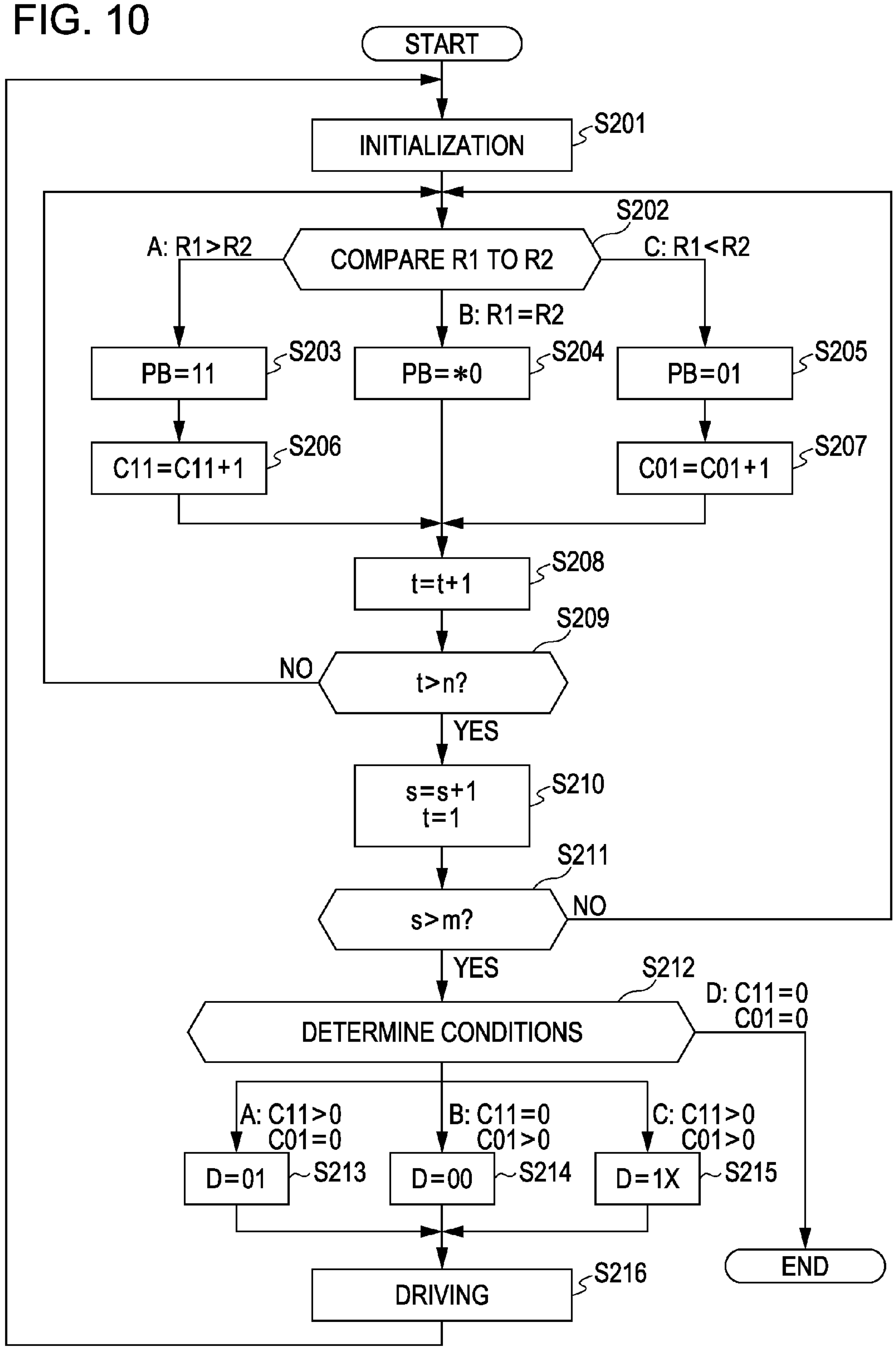
FIG. 10 is a flowchart illustrating a rewriting process of pixels.

FIG. 10 is a flowchart illustrating rewriting on the pixels 13 by the controller 2. The flow shown in FIG. 10 starts, when a rewriting instruction on a screen is input from the CPU 3. In step S201, the control unit 22 initializes variables s and t to "s=t=1." The variables s and t are variables for designating the row and the column of the pixel 13. Further, the control unit 22 initializes the values of the counter C11 and the counter C01 to zero.

In step S202, the control unit 22 compares the target time R1 (s, t) to the accumulation time R2 (s, t). When R1 (s, t)>R2 (s, t) (step S202: A), the control unit 22 allows the process to proceed to step S203. When R1 (s, t)=R2 (s, t) (step S202: B), the control unit 22 allows the process to proceed to step S204. When R1 (s, t)<R2 (s, t) (step S202: C), the control unit 22 allows the process to proceed to step S205.

In step S203, the control unit 22 writes "PB (s, t)=11" as the value of the flag PB in the register PB. In step S206, the control unit 22 adds 1 to the value of the counter C11 by a relation of "C11=C11+1."

In step S204, the control unit 22 writes "PB (s, t)=*0" as the value of the flag PB in the register PB. The sign "*" indicates that the bit value may not be rewritten, that is, is not defined.

In step S205, the control unit 22 writes "PB (s, t)=01" as the value of the flag PB in the register PB. In step S207, the control unit 22 adds 1 to the value of the counter C01 by a relationship of "C01=C01+1."

In step S208, the control unit 22 updates the value of the variable t by a relationship of "t=t+1." In step S209, the control unit 22 determines whether t>n, that is, the process is completed on all the pixels 13 in an s-th row. When the control unit 22 determines that the process is not completed on all the pixels 13 in the s-th row (NO in step S209), the control unit 22 allows the process to step S201. On the other hand, when the control unit 22 determines that the process is completed on all the pixels 13 in the s-th row (YES in step S209), the control unit 22 allows the process to step S210.

In step S210, the control unit 22 updates the value of the variable s by a relationship of "s=s+1." Further, the control unit 22 sets the value of the variable t to "t=1." In step S211, the control unit 22 determines whether s>m, that is, the process is completed on all of the m×n pixels 13. When the control unit 22 determines that the process is not completed on all the m×n pixels 13 (NO in step S211), the control unit 22 allows the process to proceed to step S201. On the other hand, when the control unit 22 determines that the process is completed on all the pixels 13 (YES in step S211), the control unit 22 allows the process to proceed to step S212.

In step S212, the control unit 22 determines which driving condition is satisfied among the plurality of driving conditions. For example, the control unit 22 executes the determination using the values of the counters C11 and C01. When the counters C11 and C01 satisfy a relationship of "C11>0" and a relationship of "C01=0", that is, the m×n pixels 13 include only the black-written pixels and the pixels 13 of which gray scale value is not changed (step S212: A), the control unit 22 allows the process to proceed to step S213. When the counters C11 and C01 satisfy a relationship of "C11=0" and a relationship of "C01>0", that is, the m×n pixels 13 include only the white-written pixels and the pixels 13 of which gray scale value is not changed (step S212: B), the control unit 22 allows the process to proceed to step S214. When the counters C11 and C01 satisfy a relationship of "C11>0" and the relationship of "C01>0", that is, the m×n pixels 13 include both the black-written pixels and the white-written pixels (step S212: C), the control unit 22 allows the process to proceed to step S215. When the counters C11 and C01 satisfy the relationship of "C11=0" and the relationship of "C01=0", that is, the m×n pixels 13 include only the pixels 13 of which gray scale value is not changed (step S212: D), the control unit 22 ends the flow shown in FIG. 10.

In step S213, the control unit 22 rewrites the value of the register D to "D=01." That is, the control unit 22 determines the application of the first driving pattern.

In step S214, the control unit 22 rewrites the value of the register D to "D=00." That is, the control unit 22 determines the application of the second driving pattern.

In step S215, the control unit 22 rewrites the value of the register D to "D=1×." That is, the control unit 22 determines the application of the third pattern. For example, a relationship of "X=1" is satisfied in an odd frame and a relationship of "X=0" is satisfied in an even frame.

In step S216, the control unit 22 outputs a signal for controlling the display unit 1 via the output unit 21 in accordance with the value of the flag D stored in the register D.

When D=01, the output unit 21 outputs a signal for applying the voltage Vb (>0) to the power line 18 to the power line driving circuit 17. Further, the output unit 21 allows the transistors 132 of the black-rewritten pixels to enter the ON state and outputs a signal for allowing the transistors 132 of the pixels 13, of which the gray scale is not changed, to enter the OFF state to the data line driving circuit 16. The control unit 22 adds 1 to the value of the accumulation time R2 corresponding to the black-written pixels and rewrites the register R2.

When D=00, the output unit 21 outputs a signal for applying the voltage Vw (<0) to the power line 18 to the power line driving circuit 17. Further, the output unit 21 allows the transistors 132 of the white-rewritten pixels to enter the ON state and outputs a signal for allowing the transistors 132 of the pixels 13, of which the gray scale is not changed, to enter the OFF state to the data line driving circuit 16. The control unit 22 adds 1 to the value of the accumulation time R2 corresponding to the white-written pixels and rewrites the register R2.

When D=11 (an example of a first period), the output unit 21 outputs a signal for applying the voltage Vb (>0) to the power line 18 to the power line driving circuit 17. Further, the output unit 21 allows the transistors 132 of the black-rewritten pixels to enter the ON state and outputs a signal for allowing the transistors 132 of the white-rewritten pixels and the pixels 13, of which the gray scale is not changed, to enter the OFF state to the data line driving circuit 16. The control unit 22 adds 1 to the value of the accumulation time R2 corresponding to the black-written pixels and rewrites the register R2.

When D=10 (an example of a second period), the output unit 21 outputs a signal for applying the voltage Vw (<0) to the power line 18 to the power line driving circuit 17. Further, the output unit 21 allows the transistors 132 of the white-rewritten pixels to enter the ON state and outputs a signal for allowing the transistors 132 of the black-rewritten pixels and the pixels 13, of which the gray scale is not changed, to enter the OFF state to the data line driving circuit 16. The control unit 22 subtracts 1 from the value of the accumulation time R2 corresponding to the white-written pixels and rewrites the register R2.

When the process of step S216 ends, the control unit 22 allows the process to proceed to step S201.

Figure 11:
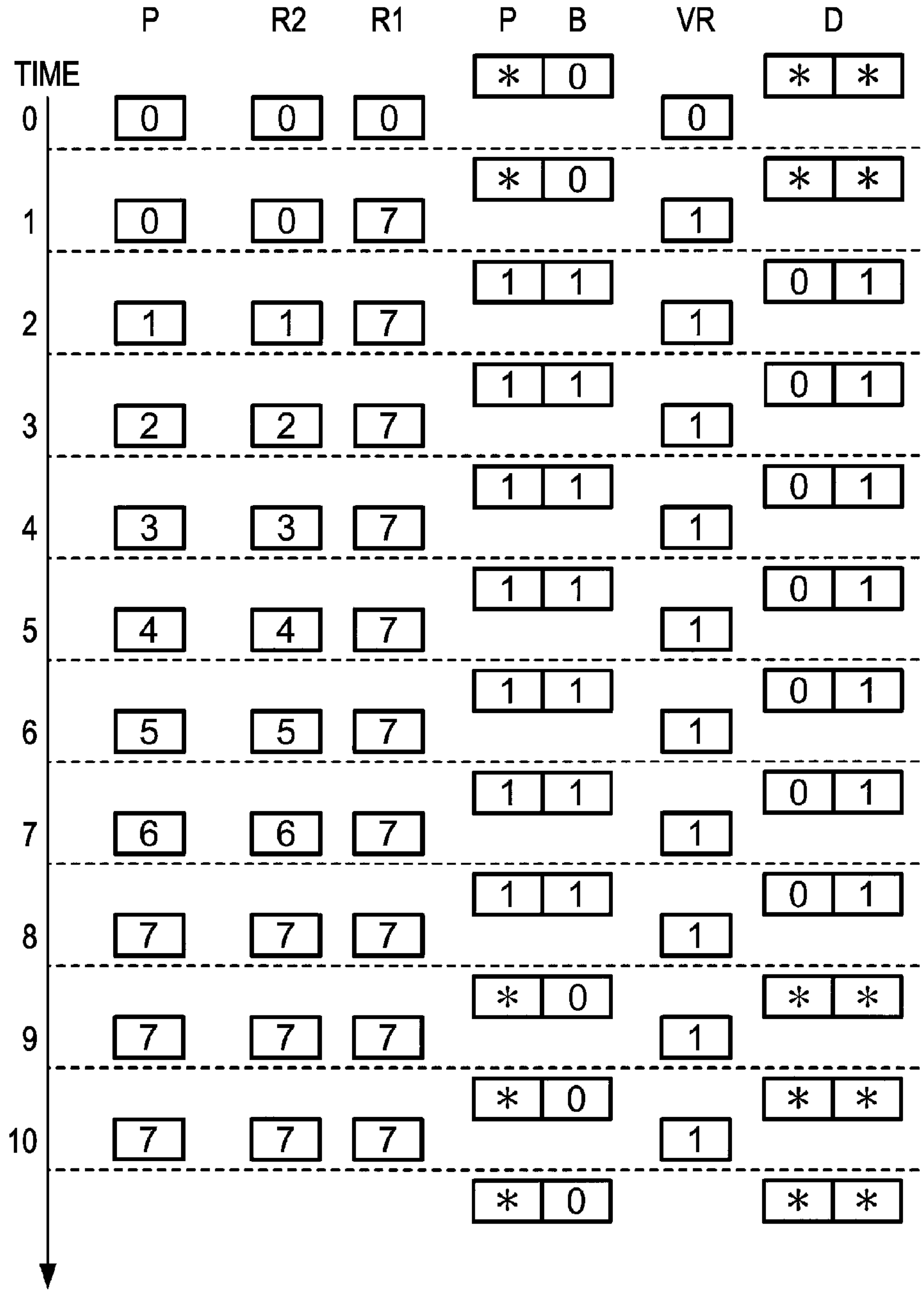
FIG. 11 is a diagram illustrating an example of an operation when a first driving pattern is applied.

FIG. 11 is a diagram illustrating an example of an operation in which the first driving pattern is applied. In FIG. 11, the values of the register R1, the register R2, the register PB, and the register D are shown during periods from period 0 to period 10. In FIG. 11, the optical states P of the pixels 13 are also shown. For example, the optical states P are shown in eight steps from 0 to 7. P=0 and P=7 correspond to white and black, respectively. P=1 to 6 correspond to intermediate states between white and black. Here, the values of the register R1, the register R2, the register PB, and the optical states P are shown only for a single pixel 13 to facilitate the drawing.

Period 0 corresponds to a state before execution of the flow shown in FIG. 10. Here, an example will be described on the assumption that, as the initial state, the gray scales of all the pixels 13 are white and the data stored in the VRAM 4 indicate the white gray scales of all the pixels 13. In this state, since the target time R1 and the data VR correspond to each other, no rewriting of the target time R1 is executed even in the execution of the flow shown in FIG. 9. Further, since there is no pixel in which B=1, the display unit 1 is not driven even when the flow shown in FIG. 10 is executed.

The upper stage of period 1 indicates the flag PB when the processes of step S202 to step S215 are executed in the state of period 0, Since R1=R2 (step S202: B), "PB=*0" is written in the register PB. The lower stage of period 1 indicates the state where the process of step S216 is executed after the rewriting of the VRAM 4 by the CPU 3. Here, an example (example in which "VR=0" is rewritten to "VR=1") is shown in which the gray scale of the pixel 13 shown in the drawing is rewritten from white to black. The data of the pixel 13 which is not shown in the drawing is not rewritten. When the flow shown in FIG. 9 is executed, the value of the target time R1 can be rewritten to the value corresponding to the data VR. For example, the value of the target time R1 can be rewritten to "R1=7." In the following description, the upper stage of time t indicates the states of the flag PB and the flag D when the processes of step S202 to step S215 are executed in the state of period (t-1). The lower stage of time t indicates the state when the process of step S216 is executed.

In the upper stage of period 2, "PB=11" is written in the register PB since R1>R2 (step S202: A). Relationships of "C11=1" and "C01=0" are satisfied in the step of ending the process on all the pixels 13. Accordingly, the first driving pattern is applied (step S212: A). "D=01" is written in the register D (step S213).

In the lower stage of period 2, the display unit 1 is driven in accordance with the first driving pattern. First, the controller 2 outputs a signal for applying the voltage of 0 V to the power line 18 to the power line driving circuit 17. The voltage of the power line 18 is determined with reference to the potential (in this example, the grounding potential) of the common electrode 122. Next, the controller 2 outputs, to the scanning line driving circuit 15, a signal for outputting a scanning signal used to select one scanning line 11 in sequence in the m scanning lines 11. The scanning line driving circuit 15 outputs the scanning signal used to select the scanning lines 11 one by one to the m scanning lines 11. The controller 2 controls the data line driving circuit 16 so that the data line driving circuit 16 outputs the signal with the voltage VH to the data line 12 corresponding to the pixels 13 in which B=1 among the pixels 13 corresponding to the selected scanning line 11 and outputs the signal with the voltage VL to the data line 12 corresponding to the pixels 13 in which B=0. At this time, the controller 2 adds 1 to the value of the accumulation time R2 corresponding to the pixels 13 in which B=1. When 1 is added to the value of the accumulation time R2, R2=1. The capacitive elements 133 of the pixels 13 in which B=1 hold the voltage VH until the corresponding scanning line 11 is selected again in the next frame. The transistors 132 of the pixels 13 in which the B=1 continue in the ON state during the time. On the other hand, the transistors 132 of the pixels 13 in which B=0 continue in the OFF state. After the application of the signal to all the pixels 13 ends, the controller 2 outputs a signal for applying the voltage Vb (>0) to the power line 18 to the power line driving circuit 17. The voltage Vb is applied to the electrophoretic layer 110 of the pixels 13 in which B=1 during a predetermined period. When the voltage Vb is applied during the predetermined period, P=1.

From period 3 to period 7, the same process as that of period 2 is repeated. In regard to the pixels 13 in which B=1, the value is added by 1 to the accumulation time R2, the optical state P also increases by one step.

Figure 12:
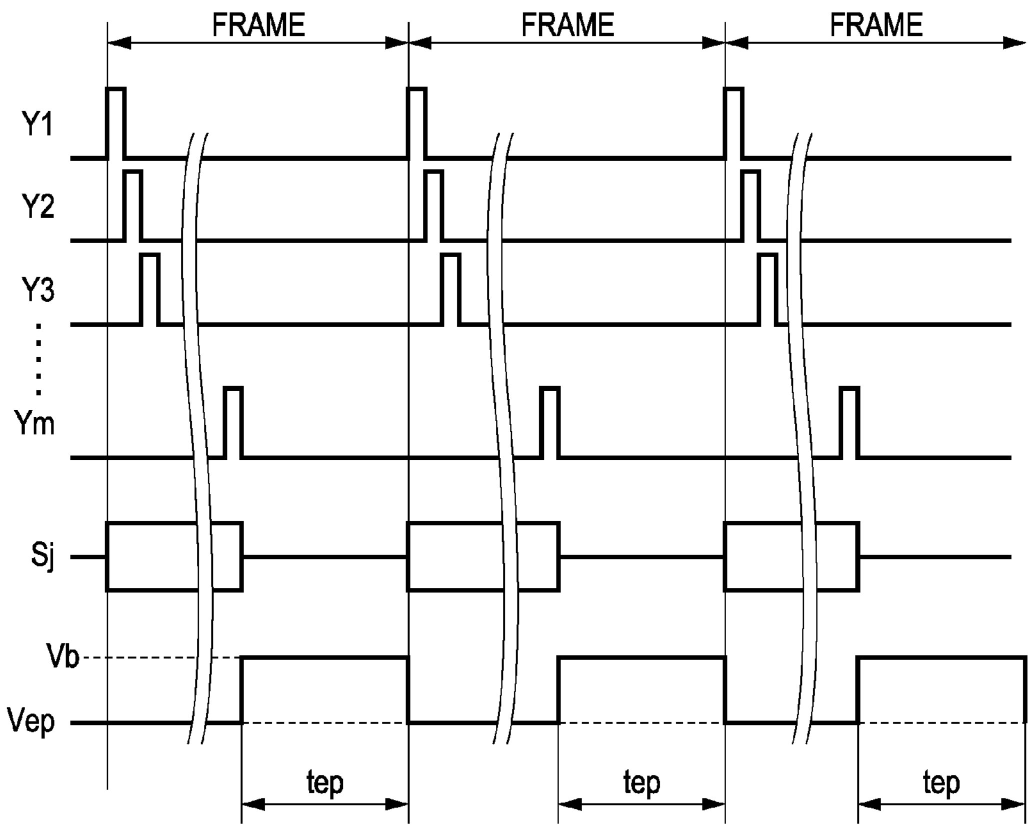
FIG. 12 is a diagram illustrating examples of driving signals in the example of FIG. 11.

FIG. 12 is a diagram illustrating examples of a scanning signal Yi, a sampling signal Sj, and a power voltage Vep in the example of FIG. 11. The scanning lines 11 are sequentially selected one by one from the start time of each frame and the sampling signal Sj is supplies in synchronization with the selection. After the scanning is completed on all the pixels 13, the power voltage Vep is changed from "Vep=0" to "Vep=Vb." The voltage Vb continues to be applied to the electrophoretic layer 110 during a period tep. That is, a waveform of the voltage applied to the electrophoretic layer 110 can be controlled by adjusting a value of the voltage Vb and the period tep.

The description will be made referring back to FIG. 11. In the lower stage of period 8, a relationship of "R2=7" is satisfied. The relationship of "R2=7" indicates that a predetermined voltage is applied during a period corresponding to seven frames (seven times). Since R1=R2 (step S202: B), the value of the register PB can be rewritten to "B=0" in the upper stage of period 9 (step S204). After the lower stage of period 9, the display unit 1 is not driven since there is no pixel 13 in which B=1.

Figure 13:
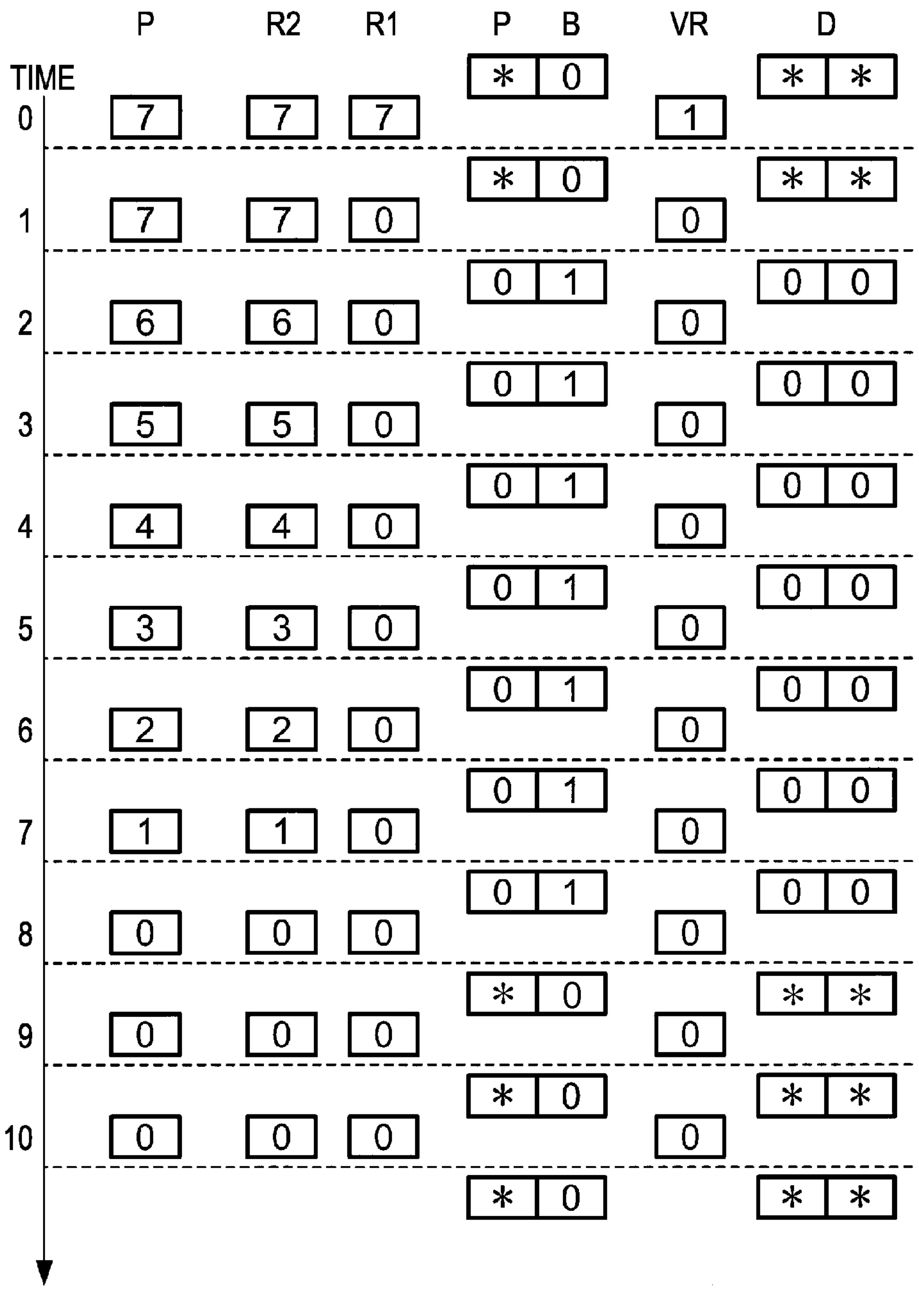
FIG. 13 is a diagram illustrating an example of an operation when a second driving pattern is applied.

FIG. 13 is a diagram illustrating an example of an operation in which the second driving pattern is applied. The items shown in FIG. 13 are the same as those shown in FIG. 11. Period 0 corresponds to a state before execution of the flow shown in FIG. 10. Here, an example will be described on the assumption that, as the initial state, the gray scales of all the pixels 13 are black and the data stored in the VRAM 4 indicate the black gray scales of all the pixels 13. In this state, since the target time R1 and the data VR correspond to each other, no rewriting of the target time R1 is executed even in the execution of the flow shown in FIG. 9. Further, since there is no pixel in which B=1, the display unit 1 is not driven even when the flow shown in FIG. 10 is executed.

Since R1=R2 in the upper stage of period 1 (step S202: B), "PB=*0" is written in the register PB. The lower stage of period 1 indicates the state where the process of step S216 is executed after the rewriting of the VRAM 4 by the CPU 3. Here, an example (example in which "VR=1" is rewritten to "VR=0") is shown in which the gray scale of the pixel 13 shown in the drawing is rewritten from black to white. The data of the pixel 13 which is not shown in the drawing is not rewritten. When the flow shown in FIG. 9 is executed, the value of the target time R1 can be rewritten to the value corresponding to the data VR. For example, the value of the target time R1 can be rewritten to "R1=0."

In the upper stage of period 2, “PB=01” is written in the register PB since R1<R2 (step S202: C). Relationships of “C11=0” and “C01=1” are satisfied in the step of ending the process on all the pixels 13. Accordingly, the second driving pattern is applied (step S212: B). “D=00” is written in the register D (step S214).

In the lower stage of period 2, the display unit 1 is driven in accordance with the second driving pattern. First, the controller 2 outputs the signal for applying the voltage of 0 V to the power line 18 to the power line driving circuit 17. Next, the controller 2 outputs the signal for outputting the scanning signal to the scanning line driving circuit 15. The scanning line driving circuit 15 outputs the scanning signal used to select the scanning lines 11 one by one to the m scanning lines 11. The controller 2 controls the data line driving circuit 16 so that the data line driving circuit 16 outputs the signal with the voltage VH to the data line 12 corresponding to the pixels 13 in which B=1 among the pixels 13 corresponding to the selected scanning line 11 and outputs the signal with the voltage VL to the data line 12 corresponding to the pixels 13 in which B=0. At this time, the controller 2 subtracts 1 from the value of the accumulation time R2 corresponding to the pixels 13 in which B=1. When 1 is subtracted from the value of the accumulation time R2, R2=6. The capacitive elements 133 of the pixels 13 in which B=1 hold the voltage VH until the corresponding scanning line 11 is selected again in the next frame. The transistors 132 of the pixels 13 in which the B=1 continue in the ON state during the time. On the other hand, the transistors 132 of the pixels 13 in which B=0 continue in the OFF state. After the application of the signal to all the pixels 13 ends, the controller 2 outputs a signal for applying the voltage Vw (<0) to the power line 18 to the power line driving circuit 17. The voltage Vw is applied to the electrophoretic layer 110 of the pixels 13 in which B=1 during a predetermined period. When the voltage Vw is applied during the predetermined period, a relationship of “P=6” is satisfied.

From period 3 to period 7, the same process as that of period 2 is repeated. In regard to the pixels 13 in which B=1, the value is subtracted by 1 from the accumulation time R2, the optical state P also decreases by one step.

Figure 14:
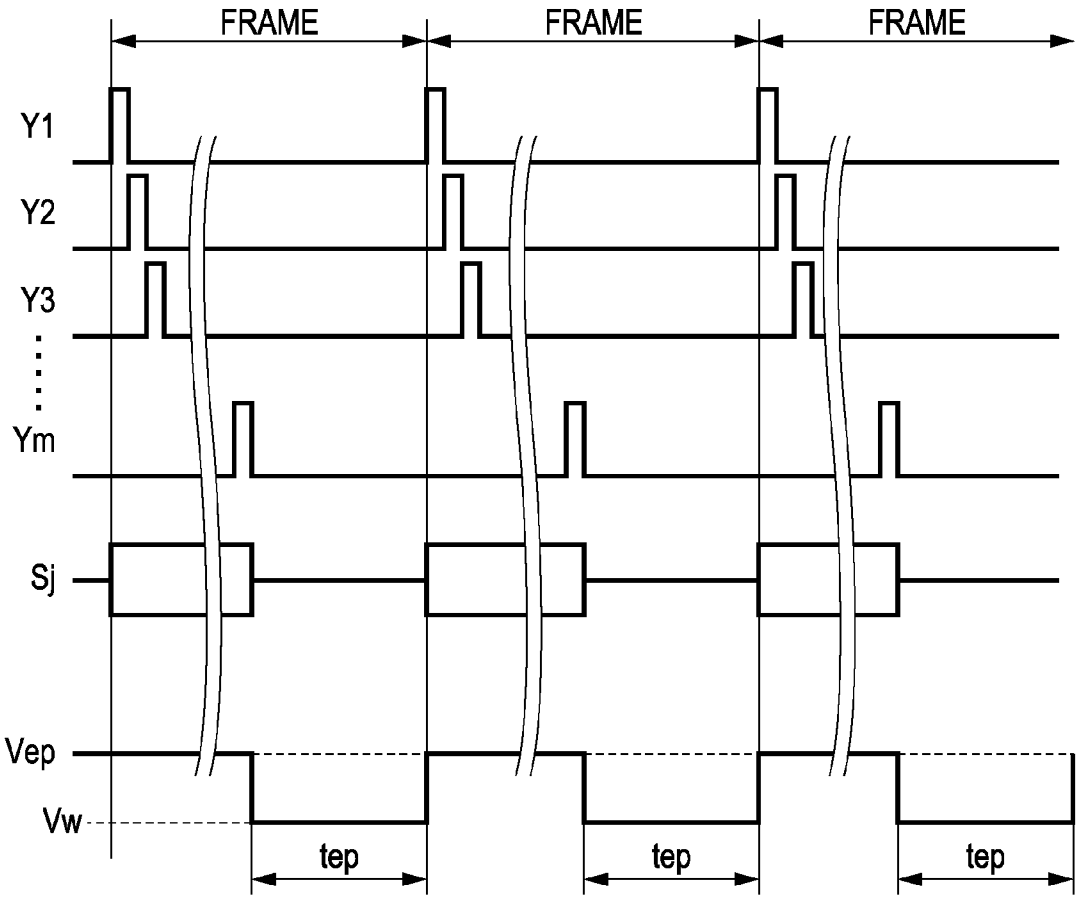
FIG. 14 is a diagram illustrating examples of driving signals in the example of FIG. 13.

FIG. 14 is a diagram illustrating examples of a scanning signal Yi, a sampling signal Sj, and a power voltage Vep in the example of FIG. 13. The scanning lines 11 are sequentially selected one by one from the start time of each frame and the sampling signal Sj is supplies in synchronization with the selection. After the scanning is completed on all the pixels 13, the power voltage Vep is changed from “Vep=0” to “Vep=Vw.” The voltage Vw continues to be applied to the electrophoretic layer 110 during the period tep. That is, a waveform of a voltage applied to the electrophoretic layer 110 can be controlled by adjusting a value of the voltage Vw and the period tep.

The description will be made referring back to FIG. 13. In the lower stage of period 8, a relationship of “R2=0” is satisfied. The relationship of “R2=0” indicates that the voltage Vw is applied during a period corresponding to seven frames (seven times) from period 0, Since R1=R2, the value of the register PB can be rewritten to “B=0” in the upper stage of period 9. After the lower stage of period 9, the display unit 1 is not driven since there is no pixel 13 in which B=1.

FIG. 15 is a diagram illustrating an example of an operation in which the third driving pattern is applied. The items shown in FIG. 15 are the same as those shown in FIGS. 11 and 13. Period 0 corresponds to a state before execution of the flow shown in FIG. 10. Here, an example will be described on the assumption that, as the initial state, the pixels 13 with the black gray scale and the pixels 13 with the white gray scale coexist and the data stored in the VRAM 4 correspond to these pixels 13. In FIG. 15, only the pixels 13 with the black gray scale are shown, but the pixels 13 which are not shown also include the pixels with the white gray scale. In this state, since the target time R1 and the data VR correspond to each other, no rewriting of the target time R1 is executed even in the execution of the flow shown in FIG. 9. Further, since there is no pixel in which B=1, the display unit 1 is not driven even when the flow shown in FIG. 10 is executed.

Since R1=R2 in the upper stage of period 1 (step S202: B), “PB=*0” is written in the register PB (step S204). The lower stage of period 1 indicates the state where the process of step S216 is executed after the rewriting of the VRAM 4 by the CPU 3. Here, an example (example in which “VR=1” is rewritten to “VR=0”) is shown in which the gray scale of the pixel 13 shown in the drawing is rewritten from black to white. In some of the pixels 13 which are not shown in the drawing, the data stored in the VRAM 4 can be rewritten from white to black. When the flow shown in FIG. 9 is executed, the value of the target time R1 can be rewritten to the value corresponding to the data VR. For example, the value of the target time R1 can be rewritten to “R1=0.”

In the upper stage of period 2, “PB=01” is written in the register PB (step S205) since R1<R2 (step S202: C). Relationships of “C11>0” and “C01>0” are satisfied in a step of ending the process on all the pixels 13. Accordingly, the third driving pattern is applied (step S212: C). Currently, because of an odd frame (first frame), “D=11” is written in the register D (step S215).

In the lower stage of period 2, the display unit 1 is driven in accordance with the third driving pattern. In this frame, the value of the lower bit of the flag D is 1. This value indicates that the voltage Vb is applied to the power line 18 in this frame. First, the controller 2 outputs the signal for applying the voltage of 0 V to the power line 18 to the power line driving circuit 17. Next, the controller 2 outputs the signal for outputting the scanning signal to the scanning line driving circuit 15. The scanning line driving circuit 15 outputs the scanning signal used to select the scanning lines 11 one by one to the m scanning lines 11. The controller 2 controls the data line driving circuit 16 so that the data line driving circuit 16 outputs the signal with the voltage VH to the data line 12 corresponding to the pixels 13 in which PB=11 among the pixels 13 corresponding to the selected scanning line 11 and outputs the signal with the voltage VL to the data line 12 corresponding to the pixels 13 in which PB=01 and PB=*0. At this time, the controller 2 adds 1 to the value of the accumulation time R2 corresponding to the pixels 13 in which PB=11. The capacitive elements 133 of the pixels 13 in which PB=11 hold the voltage VH until the corresponding scanning line 11 is selected again in the next frame. The transistors 132 of the pixels 13 in which the PB=11 continue in the ON state during the time. On the other hand, the transistors 132 of the pixels 13 in which PB=01 and PB=*0 continue in the OFF state. After the application of the signal to all the pixels 13 ends, the controller 2 outputs the signal for applying the voltage Vb (>0) to the power line 18 to the power line driving circuit 17. The voltage Vw is applied to the electrophoretic layer 110 of the pixels 13 in which PB=11 during a predetermined period. The pixels 13 shown in the drawing satisfy the relation of “PB=01” and no voltage is applied. When the frames end, relationships of “P=7” and “R2=7” are satisfied without change from period 0.

In the upper stage of period 3, “PB=01” is written in the register PB (step S205) since R1<R2 (step S202: C). the relationship of “C11>0” and “C01>0” are satisfied in a step of ending the process on all the pixels 13. Accordingly, the third driving pattern is applied (step S212: C). At this point, due to an even frame (second frame), "D=10" is written in the register D (step S215).

In the lower stage of period 3, the display unit 1 is driven in accordance with the third driving pattern. In this frame, the value of the lower bit of the flag D is 0. This value indicates that the voltage Vw is applied to the power line 18 in this frame. First, the controller 2 outputs the signal for applying the voltage of 0 V to the power line 18 to the power line driving circuit 17. Next, the controller 2 outputs the signal for outputting the scanning signal to the scanning line driving circuit 15. The scanning line driving circuit 15 outputs the scanning signal used to select the scanning lines 11 one by one to the m scanning lines 11. The controller 2 controls the data line driving circuit 16 so that the data line driving circuit 16 outputs the signal with the voltage VH to the data line 12 corresponding to the pixels 13 in which PB=01 among the pixels 13 corresponding to the selected scanning line 11 and outputs the signal with the voltage VL to the data line 12 corresponding to the pixels 13 in which PB=11 and PB=*0. At this time, the controller 2 subtracts 1 from the value of the accumulation time R2 corresponding to the pixels 13 in which PB=01. When 1 is subtracted from the value of the accumulation time R2, R2=6. The capacitive elements 133 of the pixels 13 in which PB=01 hold the voltage VH until the corresponding scanning line 11 is selected again in the next frame. The transistors 132 of the pixels 13 in which the PB=01 continue in the ON state during the time. On the other hand, the transistors 132 of the pixels 13 in which PB=11 and PB=*0 continue in the OFF state. After the application of the signal to all the pixels 13 ends, the controller 2 outputs the signal for applying the voltage Vw (<0) to the power line 18 to the power line driving circuit 17. The voltage Vw is applied to the electrophoretic layer 110 of the pixels 13 in which PB=01 during a predetermined period. The pixels 13 shown in the drawing satisfy the relation of "PB=01." When the frames end, P=6.

From period 4 to period 15, the same processes as those of period 2 and period 3 are repeated. That is, the frame of "Vep=Vb" and the frame of "Vep=Vw" are alternately repeated. In regard to the pixels 13 in which PB=01, the value is subtracted by 1 from R2 every two frames and the optical state P also decreases by one step.

Figure 16:
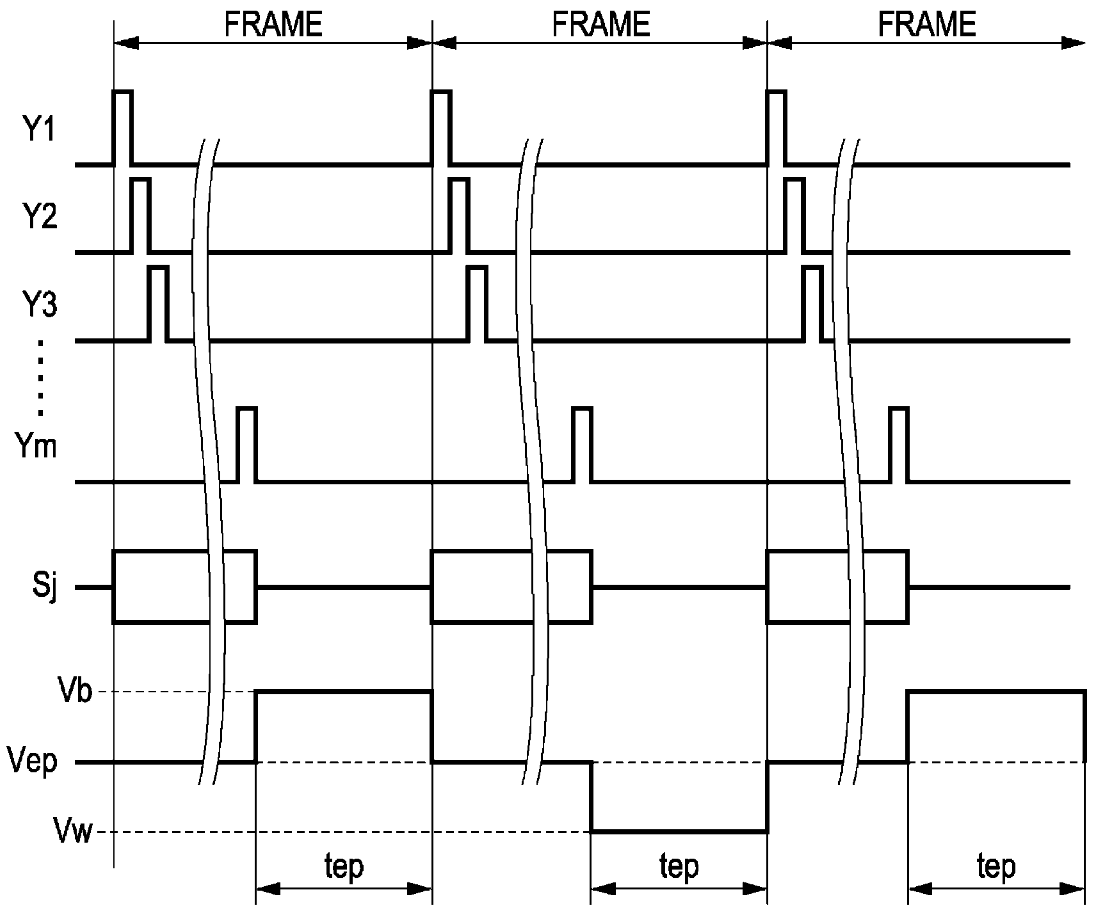
FIG. 16 is a diagram illustrating examples of driving signals in the example of FIG. 15.

FIG. 16 is a diagram illustrating examples of a scanning signal Yi, a sampling signal Sj, and a power voltage Vep in the example of FIG. 15. The scanning lines 11 are sequentially selected one by one from the start time of each frame and the sampling signal Sj is supplies in synchronization with the selection. After the scanning is completed on all the pixels 13, the power voltage Vep is changed from "Vep=0" to "Vep=Vb." The voltage Vb continues to be applied to the electrophoretic layer 110 of the black-written pixels during the period tep. In the subsequent frame, the power voltage Vep is changed from "Vep=0" to "Vep=Vw." The voltage Vw continues to be applied to the electrophoretic layer 110 of the white-written pixels during the period tep.

The description will be made referring back to FIG. 15. In the lower stage of period 15, the relationship of "R2=0" is satisfied. The relationship of "R2=0" indicates that the voltage Vw is applied during a period corresponding to seven frames (seven times) from period 0, Since R1=R2, the value of the register PB can be rewritten to "B=0" in the upper stage of period 16. After the lower stage of period 16, the display unit 1 is not driven since there is no pixel 13 in which B=1.

Figure 17:
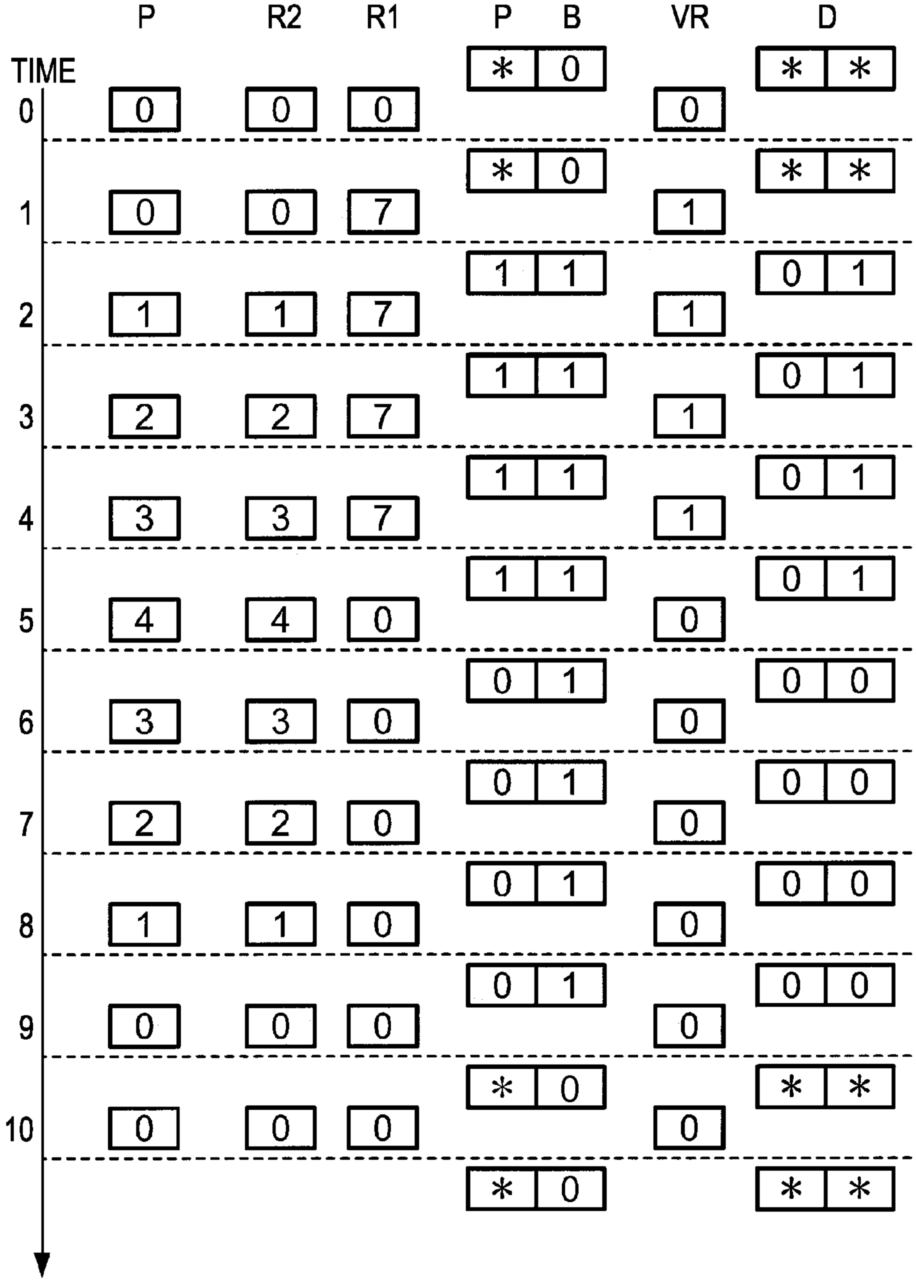
FIG. 17 is a diagram illustrating an example of an operation of rewriting data during application of a voltage.

FIG. 17 is a diagram illustrating an example of an operation when the data stored in the VRAM 4 is rewritten during voltage application of a predetermined number of times. Here, the same initial state as that in FIG. 11 will be described as an example. The processes from period 0 to period 4 are the same as those in FIG. 11. For example, in the lower stage of period 5 (more specifically, after the determination in step S212 to step S215), the CPU 3 rewrites the data stored in the VRAM 4 from "VR=1" to "VR=0." The data of the pixels 13 which are not shown are not rewritten. After the data stored in the VRAM 4 is rewritten, the value of the target value R1 can be rewritten from "R1=7" to "R1=0" through the process in FIG. 9. The lower stage of period 5 indicates a state where the positive voltage is applied like period 2 to period 4 and the value of the target time R1 can be rewritten in the VRAM 4.

In the upper stage of period 6, the flag PB can be rewritten to "PB=01" (step S205) since R1<R2 (step S202: C). Relationships of "C11=0" and "C01>0" are satisfied in a step of ending the processes of step S202 to step S207 on all the pixels 13 (step S212: B). Accordingly, the second driving pattern is applied and the value of the register D can be rewritten to "D=00."

In the lower stage of period 6, the display unit 1 is driven in accordance with the second driving pattern. That is, the voltage Vw is applied to the electrophoretic layer 110 and the optical state P of the pixels 13 decreases by one step. The value is subtracted by 1 from the value of the accumulation time R2. From period 7 to period 9, the display unit 1 is similarly driven in accordance with the second driving pattern. The optical state P of the pixels 13 decreases by one step and value is subtracted by 1 from the value of the accumulation time R2. In the lower stage of period 9, a relationship of "R2=0" is satisfied. The relationship of "R2=0" indicates that the time in which the voltage Vb is applied as a reference during period 0 compensates the time in which the voltage Vw is applied. At this time, the optical state P of the pixels satisfies "P=0."

According to this embodiment, as described above, the driving patterns can be divided and used in accordance with the states of the plurality of pixels 13. The controller 2 can drive the display unit 1 overall at higher speed compared to the case where a constant driving method is applied without depending on the states of the plurality of pixels 13.

3. Other Embodiments

The invention is not limited to the above-described embodiment, but may be modified in various forms. Hereinafter, a plurality of modified examples will be described. Two or more modified examples of the following modified examples may be combined.

3-1. MODIFIED EXAMPLE 1

A restriction may be imposed on the conditions in which the flow shown in FIG. 9 is executed. For example, when the data stored in the register R2 does not correspond to the data stored in the register R1, the control unit 22 may write the data corresponding to the data stored in the VRAM 4 as the target time R1 in the register R1 having waited until the data stored in the register R2 corresponds to the data stored in the register R1 in regard to the pixels 13 for which it is determined that the data stored in the VRAM 4 corresponds to the data stored in the register R1.

In the above-described embodiment, the example has been described in which the data can be rewritten in the register R1 even when the voltage continues to be applied the predetermined number of times, that is, the value of the flag B satisfies the relationship of "B=1." In FIG. 17, the example has been described in which the voltage is applied four times during the seven-time application of the voltage Vb and the data stored in the VRAM 4 can be rewritten, and then the voltage Vw is applied four times. When the relationship between the time integration of the applied voltage and the optical state in the electrophoretic layer 110 is linear, there is no problem in the operation described in the above-described embodiment. However, in some cases, the relationship between the time integration of the applied voltage and the optical state may not be linear in a kind of electro-optic element. When the driving described with reference to FIG. 17 is performed in such an electro-optic element, the optical state P9 of the pixel 13 during period 9 is not the same as the optical state P0 during period 0. For example, P9=0.5 whereas P0=0 in some cases. That is, the white after the voltage application may be different from the white before the voltage application (period 0). Therefore, display unevenness may be caused.

According to Modified Example 1, in order to prevent display unevenness, no rewriting is performed in the register R1 when the voltage continues to be applied a predetermined number of times during a period in which the voltage continues to be applied a predetermined number of times. That is, even when the rewriting is performed in the VRAM 4, the controller 2 does not perform the rewriting in the register R1 even in a case where there is the pixel in which value of the flag B satisfies "B=1." For example, this function is realized as follows.

The controller 2 includes a register H storing a value of a flag H. The flag H indicates whether the process (FIG. 9) of comparing the target time R1 to the data VR is postponed. The process of comparing the target time R1 to the data VR is postponed when H=1, whereas the process of comparing the target time R1 to the data VR is not postponed when H=0.

When the CPU 3 notifies the control unit 22 of the controller 2 of the rewriting in the VRAM 4, the control unit 22 reads the values of the registers C11 and C01. When C11=0 and C01=0, the control unit 22 executes the flow shown in FIG. 9. When C11>0 or C01>0, the control unit 22 rewrites the flag H as "H=1" and does not execute the flow shown in FIG. 9. When C11=0 and C011=0 in the flow shown in FIG. 10 (step S212: D), the control unit 22 reads the flag H from the register H. When H=1, the control unit 22 executes the flow shown in FIG. 9. When H=0, the control unit 22 ends the process.

According to Modified Example 1, it is possible to display an image with lesser display unevenness even in the electro-optic element in which the relationship between the time integration of the applied voltage and the optical state is not linear. Further, until the rewriting process being performed ends and then the subsequent rewriting is performed, the determination is made based on the data stored in the VRAM 4 at the time of ending the initial rewriting process. For example, in a case where the rewriting is being performed from white to black, the optical state of the pixel 13 corresponds to the data stored in the VRAM 4 in the step of ending the initial rewriting of the pixel 13 when the data stored in the VRAM 4 is rewritten twice from black to white and black. Therefore, the subsequent rewriting of the pixel 13 is not performed. That is, flickering of a screen can be reduced. Further, this flickering can be reduced also in an electro-optic element in which the relationship between the time integration of the applied voltage and the optical state is nearly linear.

3-2. MODIFIED EXAMPLE 2

The invention is not limited to the electrophoretic layer 110 which displays two gray scales. The electrophoretic layer 110 may display multi-gray scales of three or more gray scales. In this case, the data stored in the VRAM 4 indicates the gray scale values of three or more gray scales. The target value R1 is set in accordance with each gray scale value. Further, the electro-optic element used in the display unit 1 is not limited to the electrophoretic element. Electro-optic elements such as an electrochromic element or a liquid crystal element may be used.

3-3. MODIFIED EXAMPLE 3

The process of changing the value of the accumulation time R2 is not limited to the process described in the above-described embodiment. In the above-described embodiment, the value added to (subtracted from) the accumulation time R2 is constant. However, the added value (subtracted value) may be a function for the state of the electronic apparatus 1000. In the electrophoretic element, charged particles move in a solvent under an electric field. When a voltage is applied, the charged particles being stopped start to accelerate and move at a constant speed (closing speed) after some time. That is, the speed of the charged particles is not constant with respect to the application time of the voltage. Accordingly, for example, the accumulation time R2 and the target value R1 of each pixel 13 are used as variables indicating the state of the electronic apparatus 1000. In this case, the added value is defined by a function or a reference table using the target value R1 and the accumulation time R2 as the variables. Further, the added value defined in this way may be corrected in consideration of an application value in front and rear frames. For example, the added value may be corrected differently between a case where a voltage with the homopolarity is continuously applied and a case where a voltage with a given polarity is intermittently applied.

The flow of the solvent in the movement of the charged particles or the distributions state of the charged particles has an influence on the speed of the charged particles, that is, the change in the state of the electro-optic element. For example, the viscosity resistance of the solvent is generally changed due to the environment temperature. Accordingly, an added value to may be corrected in accordance with the temperature of the display unit 1. For example, when it is known that it is preferable to set the application time of the voltage to about 1.3 times in a case where the temperature of the display unit 1 is 10° C. on the assumption that the reference temperature of the display unit 1 is 20° C., a time added to the accumulation time R2 is not 1 but ¾. In this case, the register R2 has a storage region of 2 bits after the decimal point. The binary number of 0.11 is added to the accumulation time R2.

As another example, the display rewriting is not performed on all of the pixels 13 of m rows by n columns but the pixels 13 of some rows. In this case, some scanning lines 11 are repeatedly scanned among the m scanning lines 11. At this time, the scanning period becomes shorter compared to a case where all of the m scanning lines 11 are scanned. In this case, the added value may be a function of the scanning period. In this example, even when the driving process of scanning all of the rows and the driving process of scanning some of the rows are performed together, a more accurate optical state can be realized compared to a case where the added value is not used as the function of the scanning period.

3-4. MODIFIED EXAMPLE 4

The period of the black and white frames in the third driving pattern is not limited to the period described in the embodiment. In the above-described embodiment, the black and white frames are alternately repeated every frame. For example, the black and white frames may be alternately repeated every two frames.

As another example, the frequency of the black and white frames may not be even during the period in which the third driving pattern is applied. For example, when the black frame is repeated once, two white frames may be repeated once. In this example, the rewriting performed from black to white is faster than the rewriting performed from white to black. For example, since the sensitivity is higher for black in terms of the human visual characteristics, the sensory display speed can be improved by the driving.

As still another example, the black frame may not have the same length as that of the white frame. For example, the driving may be performed such that the white frame is longer than the black frame (the time in which the negative voltage is applied is longer than the time in which the positive voltage is applied). In this case, the absolute value of the added value may be different depending on the polarity of the applied voltage.

3-5. MODIFIED EXAMPLE 5

In a case where the first driving pattern or the second driving pattern is continuous in a plurality of frames, the scanning line 11 of a given row may not be selected when the pixels 13 being in the ON state and the pixels 13 being in the OFF state in the given row are not changed. In this case, the plurality of driving conditions include a fourth driving condition in which the pixels 13 of m rows by n columns include only the first kind of pixels and the third kind of pixels and the plurality of scanning lines 11 include the scanning line 11 (hereinafter, referred to as a "first scanning line") corresponding to only the pixels for which the application of the voltage Vb newly starts and the pixels for which the application of the voltage Vb ends. When it is determined that the pixels 13 of m rows by n columns satisfy the fourth driving condition, the control unit 22 does not select the first scanning line in the frame and controls the output unit 21 such that the output unit 21 outputs a signal used for applying the voltage Vb to the power line 18. Likewise, the plurality of driving conditions include a fifth driving condition in which the pixels 13 of m rows by n columns include only the second kind of pixels and the third kind of pixels and the plurality of scanning lines 11 include the scanning line 11 (hereinafter, referred to as a "second scanning line") corresponding to only the pixels 13 other than the pixels 13 for which the application of the voltage Vw newly starts and the pixels 13 for which the application of the voltage Vw ends. When it is determined that the pixels 13 of m rows by n columns satisfy the fifth driving condition, the control unit 22 does not select the second scanning line in the frame and controls the output unit 21 such that the output unit 21 outputs a signal used for applying the voltage Vw to the power line 18.

Further, when the pixels 13 in a given row include only the pixels 13 of which the optical state is not changed, the scanning line 11 of the given row may not be selected. In this case, the plurality of driving conditions include a sixth condition in which the pixels 13 of m rows by n columns include only the third kind of pixels and the plurality of scanning lines 11 include the scanning line 11 (hereinafter, referred to as a "third scanning line") corresponding to the only the pixels 13 other than the pixels 13 for which the accumulation time of the application of the voltage Vb or the voltage Vw in the frame is a predetermined time. When it is determined that the pixels 13 of m rows by n columns satisfy the sixth condition, the control unit 22 controls the output unit 21 such that the output unit 21 does not select the third scanning line in the frame and outputs a signal used for applying the voltage Vb or the voltage Vw to the power line 18.

More specifically, the controller 2 includes a register PB corresponding to two frames of the previous and current frames. When the value of the flag B in the previous frame is the same as that in the current frame and the value of the flag P in the previous frame is the same as that in the current frame, the control unit 22 controls the scanning line driving circuit 15 such that the scanning line driving circuit 15 supplies the selection signal to the scanning line 11. For example, when the first driving pattern continues and the transistors 132 enter an ON state in the initial frame, the ON state of the transistors 132 subsequently continues by the voltage held by the capacitive elements 133 in spite of the fact that the scanning line 11 is not selected. The change in the voltage of the scanning line 11 and the data line 12 can be suppressed through this driving compared to a case where the scanning line 11 is selected every time. That is, the power consumption can be reduced.

3-6. MODIFIED EXAMPLE 6

The plurality of driving conditions may include a seventh condition in which the plurality of scanning lines include the scanning line 11 (hereinafter, referred to as a "fourth scanning line") corresponding to only the pixels 13 (hereinafter, referred to as a "fourth kind of pixels") for which the accumulation time of the application of the voltage Vb or the voltage Vw becomes a predetermined time. When it is determined that the pixels 13 of m rows by n columns satisfy the seventh driving condition, the control unit 22 controls the output unit 21 such that the output unit 21 outputs a signal used for applying the voltage VH to the data line 12 corresponding to the fourth kind of pixels and applying a voltage (for example, 0 V) for stopping the change in the optical state of the electrophoretic layer 110 to the lower line 18 in at least a part of a frame when the fourth scanning line is selected in this frame.

More specifically, in regard to the pixels 13 for which the voltage application of the predetermined number of time ends, that is, the pixels 13 for which the change in the optical state stops, the voltage of 0 V is applied to the pixel electrodes 104 before the transistors 132 enter the OFF state. The pixels 13 for which the change in the optical state stops refer to the pixels 13 in which B=1 in the previous frame and B=0 in the current frame. In this embodiment, the pixel electrodes 104 of the pixels 13 for which the change in the optical state stops are disconnected from the power line 18 by allowing the transistors 132 to enter the OFF state when the corresponding scanning line 11 is selected. In the driving, the optical state may be unintentionally changed due to the influence of a parasitic capacitance of the electro-optic element. In Modified Example 6, the voltage of 0 V is applied to the power line 18 before the pixel electrodes 104 are disconnected from the power line 18. In the driving, even after the transistors 132 enter the OFF state, the voltage applied to the electrophoretic layer 110 is 0 V, and thus the optical state is not changed.

3-7. MODIFIED EXAMPLE 7

In Modified Example 6, the voltage of 0 V may also be applied to the electrophoretic layer 110 of the pixels 13 of which the optical state is not changed. That is, when it is determined that the pixels 13 of m rows by n columns satisfy the seventh driving condition, the control unit 22 controls the output unit 21 such that the output unit 21 outputs a signal used for applying the voltage VH to the data line 12 corresponding to the third kind of pixels and the fourth kind of pixels when the fourth scanning line is selected in the frame.

More specifically, the voltage of 0 V is written to the pixel electrodes 104 of the pixels 13 of which the optical state is not changed, when the scanning line 11 corresponding to the pixels 13 is selected. The pixels 13 of which the optical state is not changed refer to the pixels 13 in which B=0. Even when the pixel electrodes 104 of the pixels 13 of which the optical state is not changed are disconnected from the power line 18, the optical state of the electro-optic layer 110 may be changed to an unintentional state due to the energy formed when the parasitic capacitance of the electro-optic layer 110 is charged by the leakage current of the transistors 132. In Modified Example 7, in regard to the pixels 13 of which the optical state is not changed, a signal of the voltage VH is supplied to the data line 12 when the corresponding scanning line 11 is selected. At this time, the voltage of 0 V is applied to the power line 18. When the voltage of 0 V is written to the pixel electrodes 104 and the signal of the voltage VL is supplied to the data line 12, the pixel electrodes 104 are disconnected from the power line 18. In the driving, the energy (charge) accumulated in the parasitic capacitance is periodically discharged. Accordingly, the change in the optical state to the unintentional optical state is suppressed compared to a case where the energy accumulated in the parasitic capacitance is not periodically discharged.

38. MODIFIED EXAMPLE 8

In Modified Example 7, the voltage of 0 V may be applied to the electro-optic layer 110 of all the pixels 13. That is, when the pixels 13 of m rows by n columns satisfy the seventh driving condition, the control unit 22 controls the output unit 21 such that the output unit 21 outputs a signal used for applying the voltage VH to all the data lines 12 when the fourth scanning line is selected in the frame.

Figure 18:
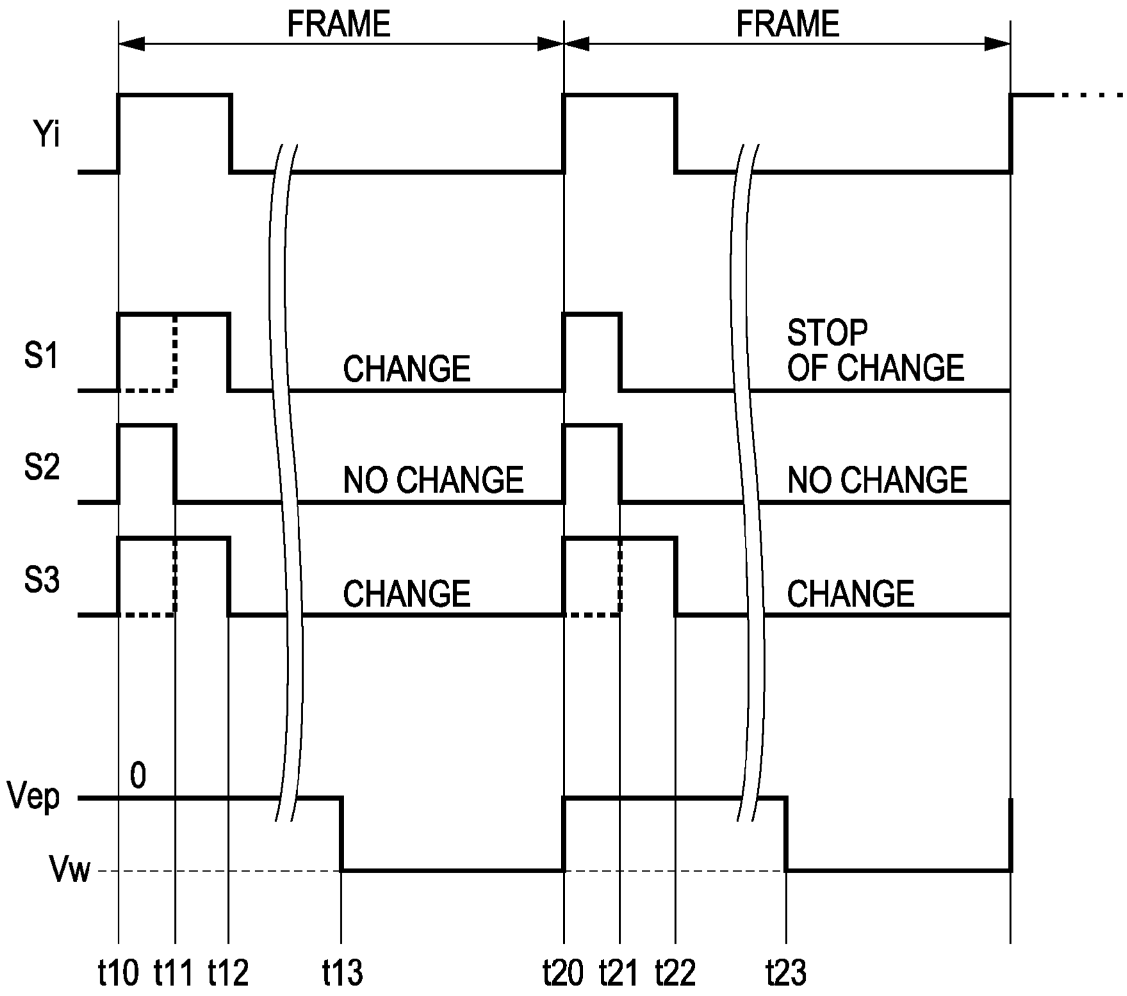
FIG. 18 is a diagram illustrating driving waveforms according to Modified Example 8.

FIG. 18 is a diagram illustrating examples of driving waveforms according to Modified Example 8. As described in Modified Examples 6 and 7, it may be difficult to control the driving in which the pixel electrodes 104 of the specific pixels 13 are connected to the power line 18 of 0 V, and then are disconnected from the power line 18 in some cases. In Modified Example 8, the pixel electrodes 104 of all the pixels 13 are connected to the power line 18 of 0 V, and then the pixel electrodes 104 are disconnected from the power line 18. FIG. 18 shows a signal supplied to the i-th row scanning line 11, the first row to third row data lines 12, and the power line 18. In this example, the pixels in the first to third rows are changed, are not changed, and are changed in the optical state, respectively, in the initial frame. In the subsequent frame, the pixels in the first to third rows are stopped in the change in the optical state, are not changed, and are changed, respectively. In the initial frame, a scanning signal Yi becomes the voltage VH between time t10 and time t12. A sampling signal Sj of the voltage VH is supplied to all the pixels 13 between time t10 and time t11 (where t10<t11<t12). At this time, Vep=0 V. The charge accumulated in the parasitic capacitance of the electrophoretic layer 110 is discharged. Between time t11 and time t12, the sampling signal Sj of the voltage VL is supplied to the pixels 13 of which the optical state is not changed. That is, the pixel electrodes 104 of the pixels 13 of which the optical state is not changed are disconnected from the power line 18. At this time, the sampling signal Sj of the voltage VH is supplied to the pixels 13 of which the optical state is changed. That is, the pixel electrodes 104 of the pixels 13 of which the optical state is changed are connected to the power line 18. Between time t12 and time t20, the disconnection state between the pixel electrodes 104 and the power line 18 continues in the pixels 13 of which the optical state is not changed and the connection state between the pixel electrodes 104 and the power line 18 continues in the pixels 13 of which the optical state is changed. Between time t13 and time t20, a voltage of "Vep=Vw" (<0) is applied to the power line 18. In regard to the pixels 13 of which the optical state is changed, the voltage Vw is applied to the electrophoretic layer 110. The driving of the subsequent frame is the same as that of the initial frame. Further, in Modified Examples 6 and 7, the sampling signal Sj is the voltage VL (indicated by a dashed line in FIG. 18) between time t10 and time t11 (and between time t20 and time t21) in regard to the pixels 13 (the pixels 13 of the third column in the example of FIG. 18) of which the optical state is changed.

3-9. MODIFIED EXAMPLE 9

The driving in which a single pixel 13 of which the optical state is change is not present (step S212: D) is not limited to the driving described in the embodiment. In this case, the pixel electrodes 104 of all the m×n pixels 13 may be connected to the power line 18 of 0 V. Specifically, the controller 2 controls the scanning line driving circuit 15 such that the scanning line driving circuit 15 outputs a scanning signal for selecting one scanning line 11. At this time, the controller 2 controls the data line driving circuit 16 such that the data line driving circuit 16 supplies a sampling signal Sj of the voltage VH to all the pixels 13. Further, the controller 2 controls the power line driving circuit 17 such that the power line driving circuit 17 applies a voltage of 0 V to the power line 18. In this example, energy is suppressed from being supplied to the parasitic capacitance of the electrophoretic layer 110. Accordingly, the change in the optical state to the unintentional optical state can be suppressed. When the voltage of 0 V is written to the pixel electrodes 104, it is not necessary to apply the voltage until the subsequent driving, so that the controller 2 consumes no power.

In summary, the plurality of driving conditions may include an eighth driving condition (corresponding to step S212: D) in which all the pixels 13 of m rows by n columns are the third kind of pixels. When it is determined that all the pixels 13 of m rows by n columns satisfy the eighth driving condition, the control unit 22 controls the output unit 21 such that the output unit 21 outputs one of signals (1) to (5) below:

(1) a signal used for selecting one scanning line 11 in sequence among the plurality of scanning lines 11, applying the voltage VH to all the plurality of data lines 12, and applying the voltage (for example, 0 V) for stopping the change in the optical state of the electrophoretic layer 110 to the power line 18;

(2) a signal used for selecting one scanning line in sequence among the plurality of scanning lines 11, applying the voltage the VH to all the plurality of data lines 12, and stopping the application of the voltage to the power line 18;

(3) a signal used for selecting one scanning line 11 in sequence among the plurality of scanning lines 11, applying the voltage VL to all the plurality of data lines 12, and applying the voltage (for example, 0 V) for stopping the change in the optical state of the electrophoretic layer 110 to the power line 18;

(4) a signal used for selecting one scanning line 11 in sequence among the plurality of scanning lines 11, applying the voltage VL to all the plurality of data lines 12, and stopping the application of the voltage to the power line 18; and (5) a signal used for stopping selecting the scanning line 11.

One scanning line may not necessarily be selected. For example, a plurality of scanning lines (two to all of the scanning lines) may simultaneously be selected.

3-10. MODIFIED EXAMPLE 10

Figure 19:
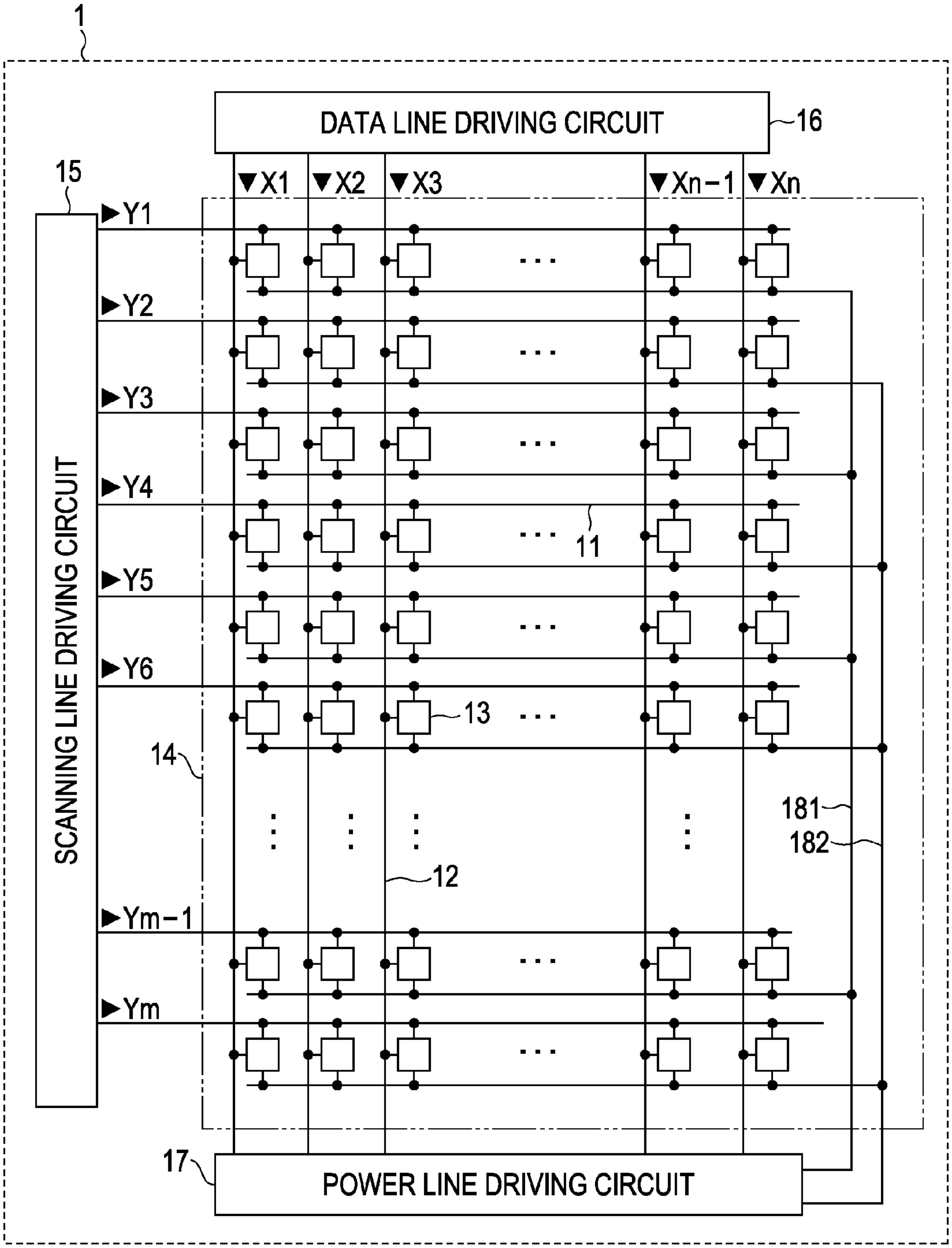
FIG. 19 is a diagram illustrating a circuit configuration of a display unit according to Modified Example 10.

FIG. 19 is a diagram illustrating a circuit configuration of the display unit 1 according to Modified Example 10. In the above-described embodiment, the example has been described in which the power line 18 common to all the pixels 13 is used. In Modified Example 10, the display unit 1 includes two power lines, that is, power lines 181 and 182 instead of the power line 18. The power line 181 is connected to the pixels 13 in odd rows. The power line 182 is connected to the pixels 13 in even rows. The power line driving circuit 17 can apply different voltages to the power lines 181 and 182, respectively.

In the circuit configuration, the display unit 1 is driven as follows. In odd frames, the voltage Vw (<0) is applied to the pixels 13 in the odd rows and the voltage Vb (>0) is applied to the pixels 13 in the even rows. That is, in the odd frames, the voltage Vw is applied to the power line 181 and the voltage Vb is applied to the power line 182. In even frames, the voltage Vb is applied to the pixels 13 in the odd rows and the voltage Vw is applied to the pixels 13 in the even rows. That is, in the even frames, the voltage Vb is applied to the power line 181 and the voltage Vw is applied to the power line 182. In the above-described embodiment, since the rewriting of black and the rewriting of white are alternately repeated every two frames in the entire screen, thereby causing visible flickering. In Modified Example 10, the black-written pixels 13 and the white-written pixels 13 coexist in a single frame. Accordingly, in Modified Example 10, the flickering can be reduced compared to a case where the black-written pixels 13 and the white-written pixels 13 do not coexist in a single frame.

3-11. MODIFIED EXAMPLE 11

Figure 20:
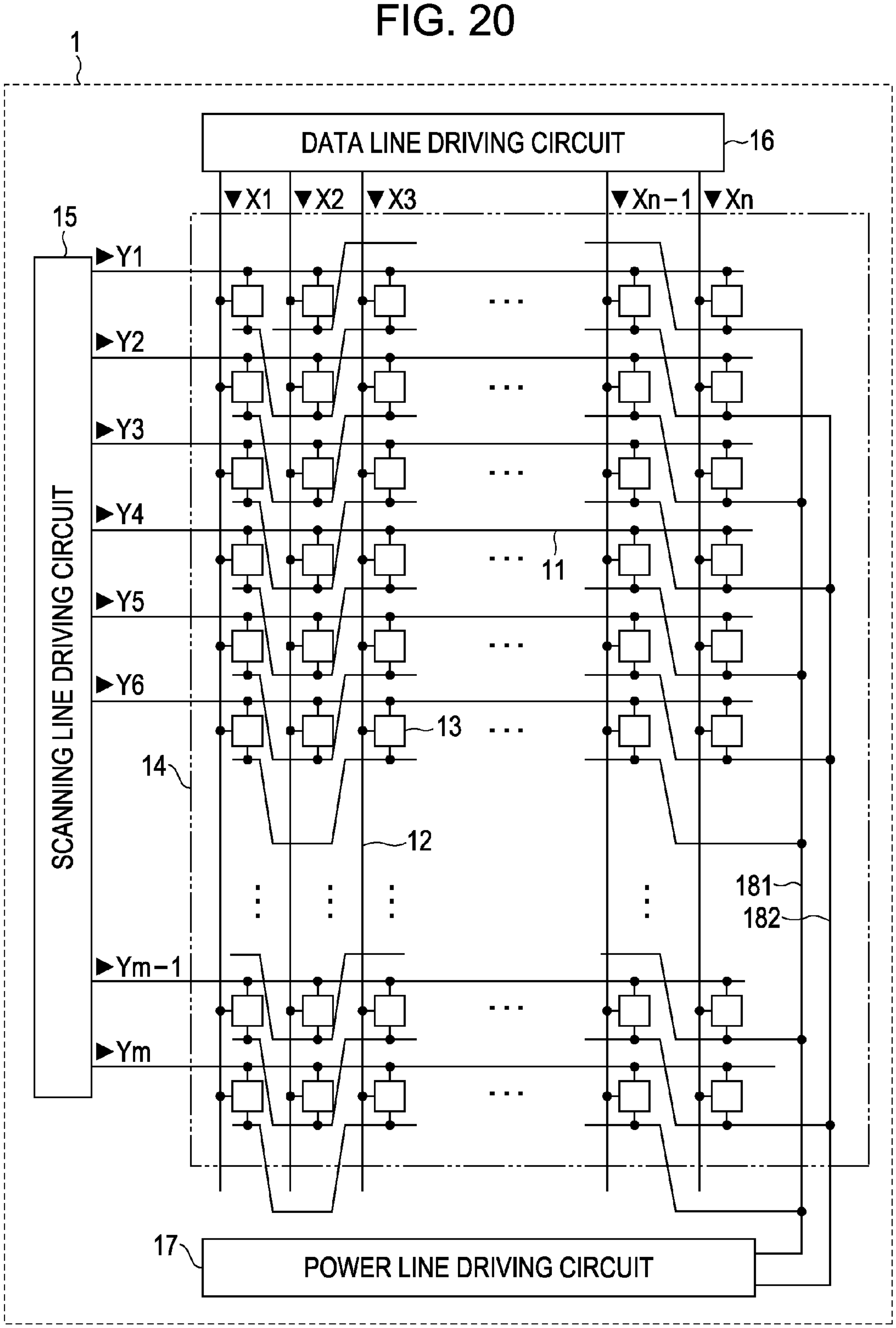
FIG. 20 is a diagram illustrating a circuit configuration of a display unit according to Modified Example 11.

FIG. 20 is a diagram illustrating a circuit configuration of the display unit 1 according to Modified Example 11. Modified Example 11 is a new modification of Modified Example 10. In Modified Example 11, the pixels 13 of m rows by n columns are connected to different power lines of every two rows. Specifically, among the pixels 13 in the odd rows, the pixels 13 in the odd columns are connected to a power line 182 and the pixels 13 in the even columns are connected to a power line 181. Likewise, among the pixels 13 in the even rows, the pixels 13 in the odd columns are connected to the power line 181 and the pixels 13 in the even columns are connected to the power line 182.

In this example, the pixels 13 of m rows by n columns are arranged in a matrix form in a direction (first direction) in which the scanning lines 11 extend and a direction (second direction) in which the data lines 12 extend. The power lines include the power lines 181 and 182. The power line 181 is connected alternately to two pixel groups (the pixels of adjacent two rows) arranged in the first direction. The power line 182 is connected alternately to two pixel groups which are different from the pixels 13 connected to the power line 181 and are arranged in the first direction. Different voltages are applied to the power lines 181 and 182, respectively.

In the circuit configuration, the white-written pixels 13 or the black-written pixels 13 are not adjacent to each other in both the row and column directions, when the display unit 1 is driven by the same signals as those of Modified Examples 10. That is, the black-written pixels 13 and the white-written pixels 13 are each arranged in a check form. On the other hand, in the configuration of Modified Example 10, the white-written pixels 13 or the black-written pixels 13 are adjacent to each other in the same row. Accordingly, in Modified Example 11, the flickering can be reduced compared to the configuration of Modified Example 10.

3-12. MODIFIED EXAMPLE 12

Figure 21:
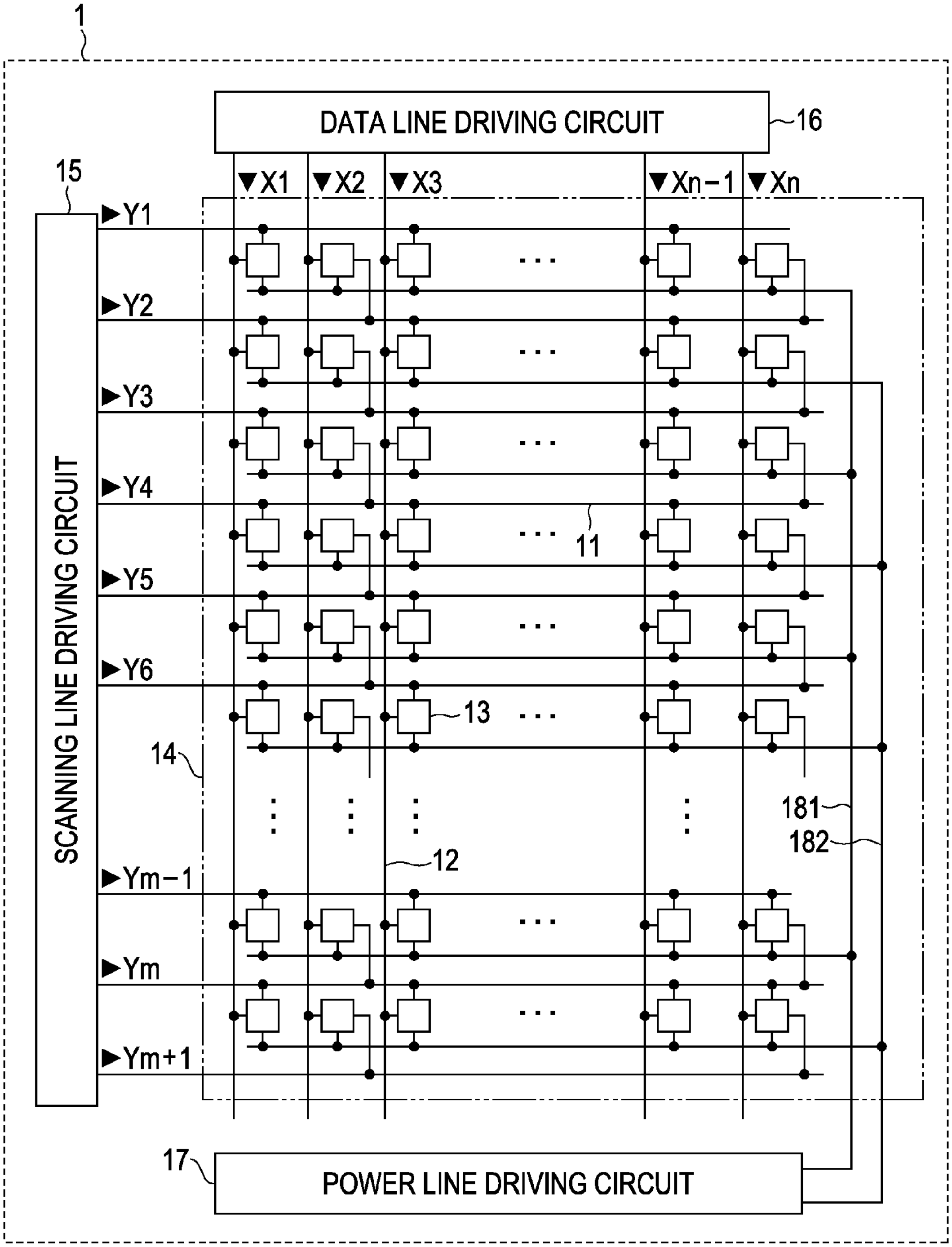
FIG. 21 is a diagram illustrating a circuit configuration of a display unit according to Modified Example

FIG. 21 is a diagram illustrating a circuit configuration of the display unit 1 according to Modified Example 12. Modified Example 12 is a new modification of Modified Example 10. In Modified Example 12, the display unit 1 includes (m+1) scanning lines 11 for the pixels 13 arranged in m rows and n columns. In the pixels 13 in an i-th row, the pixels 13 in the odd columns are connected to the i-th row scanning line 11 and the pixels 13 in the even columns are connected to the (i+1)-th row scanning line 11.

In this example, among the pixels 13 of m rows by n columns, two pixels (a pixel in an odd column and a pixel in an even column) adjacent in the first direction are connected to two different scanning lines, respectively. The power line 181 is connected to a pixel group arranged in the first direction. The second power line is connected to a pixel group which is different from the pixels 13 connected to the power line 181 and are arranged in the first direction. Different voltages are applied to the power lines 181 and 182, respectively.

In the circuit configuration, the white-written pixels 13 or the black-written pixels 13 are not adjacent to each other in both the row and column directions, when the display unit 1 is driven by the same signals as those of Modified Examples 10. That is, the black-written pixels 13 and the white-written pixels 13 are each arranged in a check form. Accordingly, in Modified Example 12, the flickering can be reduced compared to the configuration of Modified Example 10.

3- 13. MODIFIED EXAMPLE 13

Figure 22:
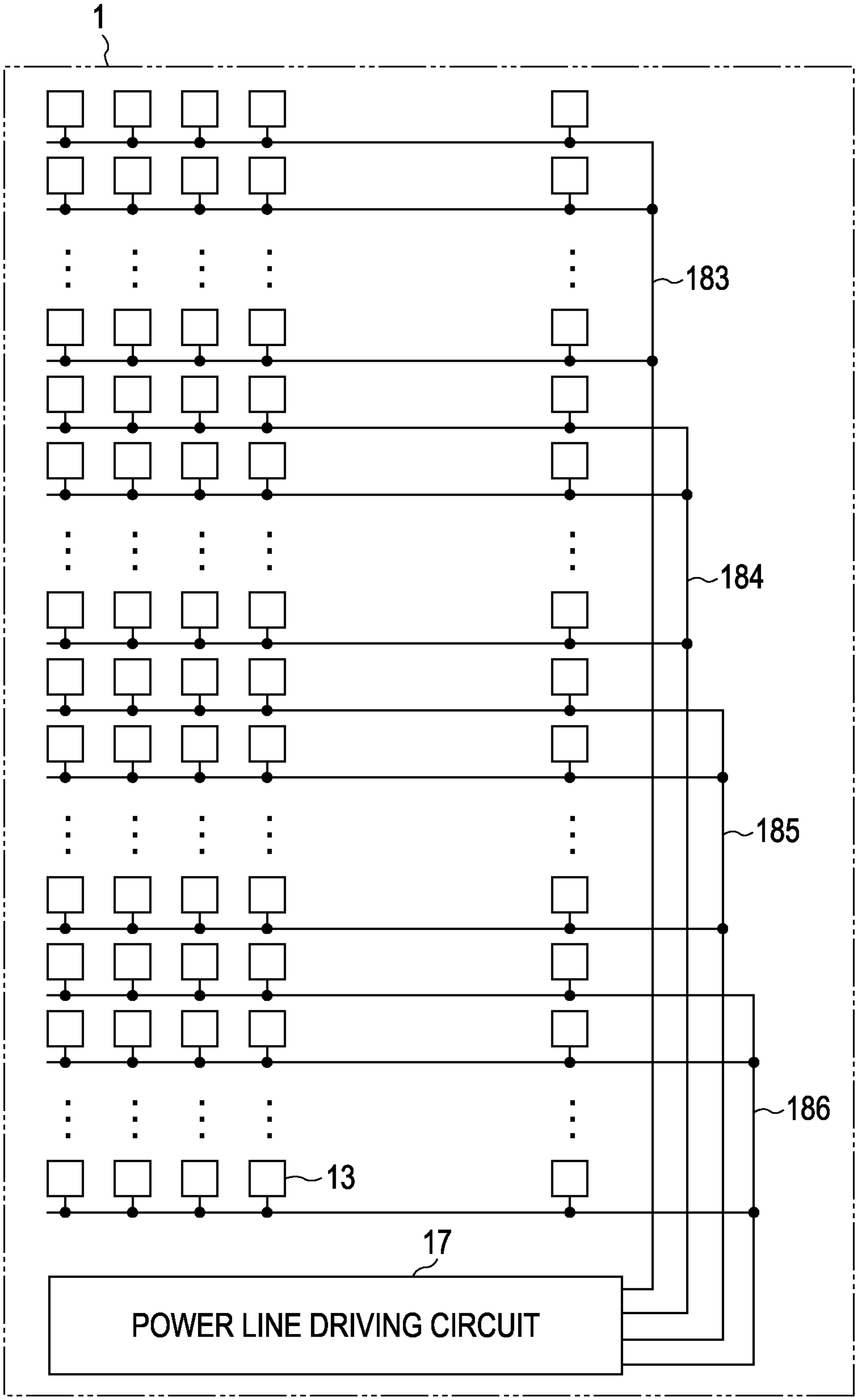
FIG. 22 is a diagram illustrating a circuit configuration of a display unit according to Modified Example 13.

FIG. 22 is a diagram illustrating a circuit configuration of the display unit 1 according to Modified Example 13. In FIG. 22, the scanning lines 11 and the data lines 12 are not illustrated. In Modified Example 13, the display unit 1 includes four power lines 183, 184, 185, and 186 instead of the power line 18. That is, the m row scanning lines 11 are divided into a plurality of blocks. The plurality of power lines are disposed so as to correspond the plurality of blocks one-to-one. The control unit 22 controls the output unit 21 such that the output unit 21 outputs a signal used for changing voltages applied to the plurality of power lines for each block to the power line driving circuit 17.

In Modified Example 13, the m×n pixels 13 are divided into four blocks. The first block is formed by the pixels 13 (i, j) in the range of $1 \leq i \leq (m/4)$. The second block is formed by the pixels 13 (i, j) in the range of $(m/4) < i(m/2)$. The third block is formed by the pixels 13 (i, j) in the range of $(m/2) < i \leq (3\ m/4)$. The fourth block is formed by the pixels 13 (i, j) in the range of $(3\ m/4) < i \leq m$. The pixels 13 belonging to the first, second, third, and fourth blocks are connected to the power lines 183, 184, 185, and 186, respectively.

In the circuit configuration, the driving pattern is determined for each block. In this case, the controller 2 includes the register D for each of the four blocks. The controller 2 performs the process described with reference to FIG. 10 for each block. When the white-rewritten pixels 13 and the black-rewritten pixels 13 simultaneously occur in a single row in the configuration in which the power line 18 common to all the pixels 13 is used, as described in the embodiment, the third driving pattern is applied to all the rows (all the pixels 13). In Modified Example 13, however, when the white-rewritten pixels 13 and the black-rewritten pixels 13 do not coexist in the block, the first or second driving pattern is applied to this block. Accordingly, on the whole, the display unit 1 can be driven at higher speed compared to the case where the single power line 18 is used.

Further, the number of blocks is not limited to four. The block may be formed by the pixels 13 which are not adjacent to each other. For example, a first block may be formed by the pixels 13 in the odd rows and a second block may be formed by the pixels 13 in the even rows. As another example, the display unit 1 may include m power lines. That is, an independent power line may be provided in each row. The driving pattern is optimized with an increase in the number of power lines.

3-14. MODIFIED EXAMPLE 14

Figure 23:
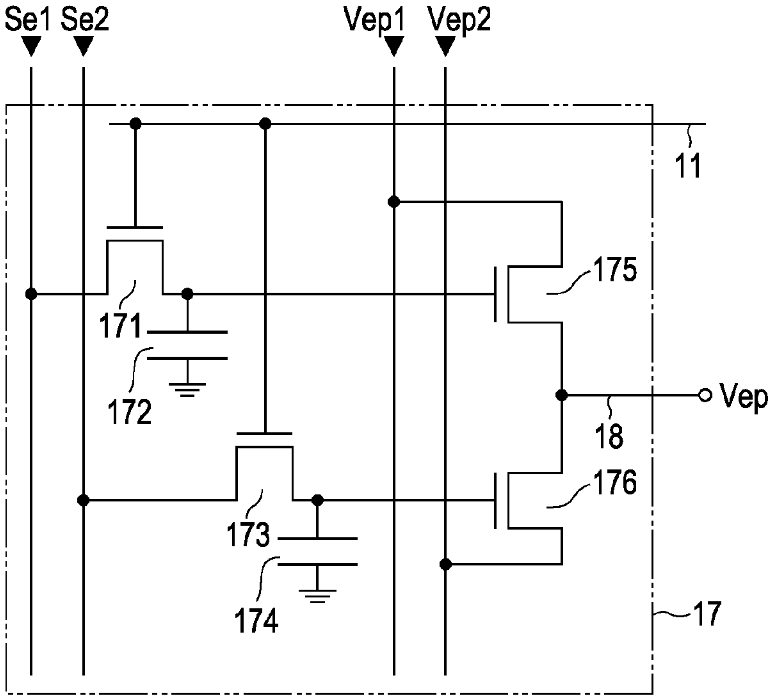
FIG. 23 is a diagram illustrating a circuit configuration of a power line driving circuit according to Modified Example 14.

FIG. 23 is a diagram illustrating a circuit configuration of the power line driving circuit 17 according to Modified Example 14. In Modified example 13, the driving pattern is optimized with an increase in the number of power lines. However, the power control becomes more complicated. FIG. 23 shows the configuration of the power line driving circuit 17 of one row when an independent power line is provided in each row. The power line driving circuit 17 includes transistors 171 and 173, capacitive elements 172 and 174, and transistors 175 and 176. The power line driving circuit 17 further includes selection lines Se1 and Se2 and power lines Vep1 and Vep2. The gates of the transistors 171 and 173 are connected to the i-th row scanning line 11. The sources of the transistors 171 and 173 are connected to the selection lines Se1 and Se2, respectively. The drains of the transistors 171 and 173 are connected to the gates of the transistors 175 and 176, respectively. One end of the capacitive element 172 is connected to the drain of the transistor 171. The other end of the capacitive element 172 is grounded. One end of the capacitive element 174 is connected to the drain of the transistor 173. The other end of the capacitive element 174 is grounded. The sources of the transistors 175 and 176 are connected to the power lines Vep1 and Vep2, respectively. The drains of the transistors 175 and 176 are connected to the i-th row power line 18.

When the i-th row scanning line 11 is selected, the transistors 171 and 173 enter an ON state. At this time, for example, when an H-level signal is supplied to the selection line Se1 and the voltage VL is supplied to the selection line Se2, the voltage VH is held in the capacitive element 172 and the L-level voltage is held in the capacitive element 174. The voltages are held even after the selection of the scanning line 11. That is, the transistor 175 continues to be in the ON state and the transistor 176 continues to be in the OFF state until the subsequent frame. When the voltages Vb and Vw are applied to the power lines Vep1 and Vep2, respectively, the voltage Vb is applied to the i-th row power line 18. This state is maintained until the subsequent frame. Likewise, when the voltage VL is supplied to the selection line Se1 and the H-level signal is supplied to the selection line Se2 in the ON state of the transistors 171 and 173, the L-level voltage is held in the capacitive element 172 and the voltage VH is held in the capacitive element 174. When the voltages Vb and Vw are applied to the power lines Vep1 and Vep2, respectively, the voltage Vw is applied to the i-th row power line 18. In this circuit configuration, the m power lines 18 can be controlled using the four signal lines: the selection lines Se1 and Se2 and the power lines Ve1 and Ve2.

3-15. MODIFIED EXAMPLE 15

Figure 24:
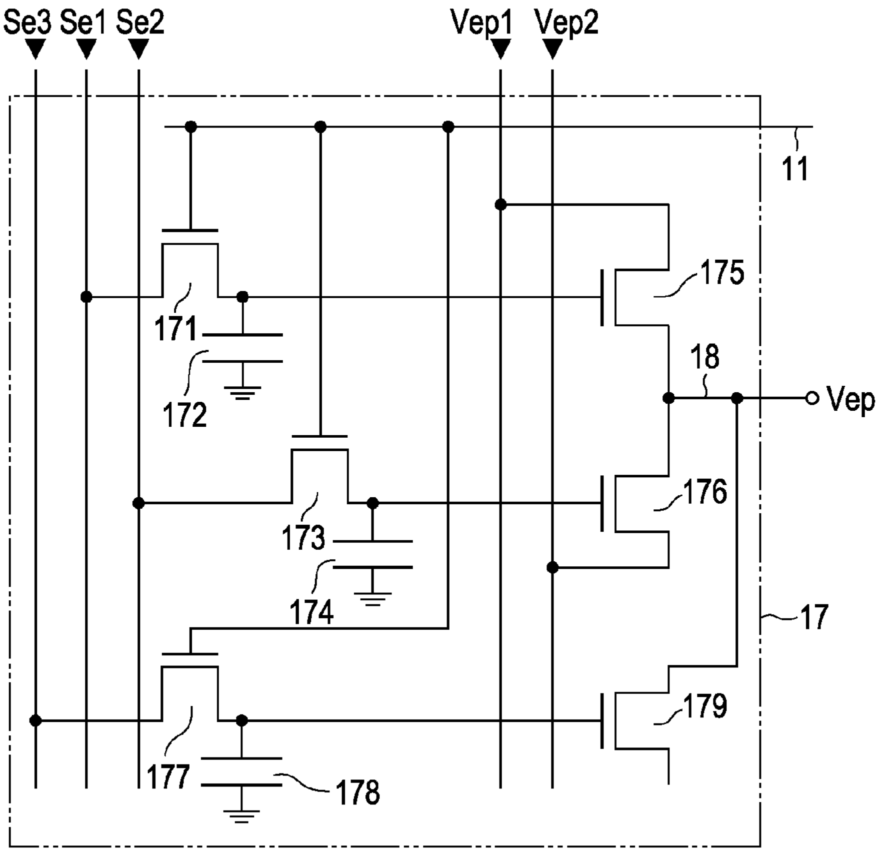
FIG. 24 is a diagram illustrating a circuit configuration of a power line driving circuit according to Modified Example 15.

FIG. 24 is a diagram illustrating the circuit configuration of the power line driving circuit 17 according to Modified Example 15. Modified Example 15 is a new modification of Modified Example 14. In Modified Example 15, the power line driving circuit 17 further includes a transistor 177, a capacitive element 178, a transistor 179, and a selection line Se3 in addition to the configuration shown in FIG. 23. The gate and source of the transistor 177 are connected to the scanning line 11 and the selection line Se3, respectively. The drain of the transistor 177 is connected to the gate of the transistor 179. The drain of the transistor 177 is also connected to one end of the capacitive element 178. The other end of the capacitive element 178 is grounded. The source of the transistor 179 is grounded and the drain of the transistor 179 is connected to the power line 18.

When the i-th row scanning line 11 is selected, the voltage VL is supplied to the selection lines Se1 and Se2 and the H-level signal is supplied to the selection line Se3. Then, the transistors 175 and 176 enter an OFF state and the transistor 179 enters an ON state. When the transistor 179 enters the ON state, the voltage of the power line 18 becomes 0 V.

3-16. MODIFIED EXAMPLE 16

Figure 25:
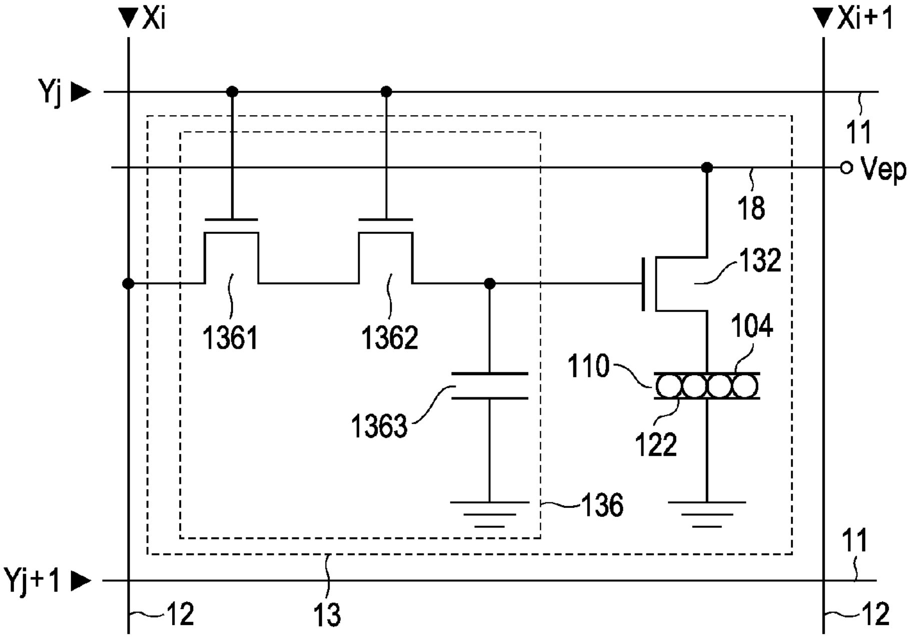
FIG. 25 is a diagram illustrating a memory circuit according to Modified Example 16.

FIG. 25 is a diagram illustrating a memory circuit according to Modified Example 16. The configuration of the memory circuit 136 is not limited to the configuration described in the embodiment shown in FIG. 5. For example, the memory circuit 136 includes transistors 1361 and 1362 and a capacitive element 1363. The gate and source of the transistor 1361 are connected to the scanning line 11 and the data line 12, respectively. The drain of the transistor 1361 is connected to the source of the transistor 1362. One end of the capacitive element 1363 is connected to the drain of the transistor 1362 and the other end of the capacitive element 1363 is grounded. The drain of the transistor 1362 is connected to the gate of the transistor 132. In this configuration, an inter-terminal voltage of the transistors is reduced compared to the configuration shown in FIG. 5. Therefore, there is a lesser possibility that the inter-terminal voltage exceeds a resistive pressure.

3-17. MODIFIED EXAMPLE 17

Figure 26:
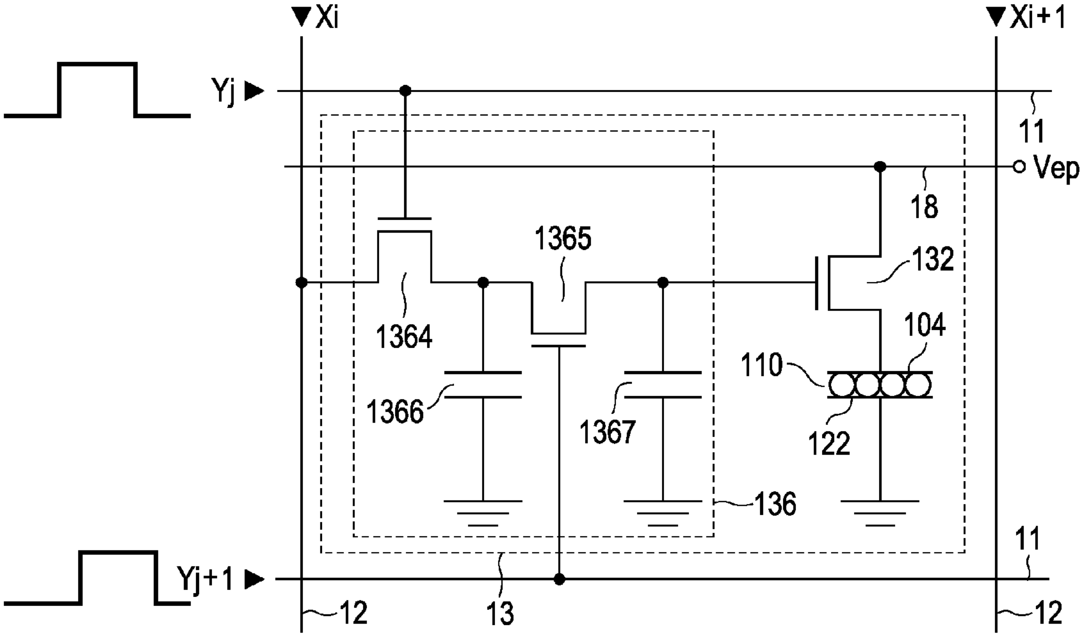
FIG. 26 is a diagram illustrating a memory circuit according to Modified Example 17.

FIG. 26 is a diagram illustrating a memory circuit according to Modified Example 17. For example, the memory circuit 136 includes transistors 1364 and 1365 and capacitive elements 1366 and 1367. The gate and source of the transistor 1364 are connected to the scanning line 11 and the data line 12, respectively. The drain of the transistor 1364 is connected to the source of the transistor 1365. The gate of the transistor 1365 is connected to the subsequent row (j+1)-th row scanning line 11. The drain of the transistor 1365 is connected to the gate of the transistor 132. For example, the memory circuit 136 includes a third input terminal (the gate of the transistor 1365) in addition to the first and second terminals. In an operation signal supplied to the j-th row scanning line 11 and the (j+1)-th row scanning line 11, there is a period in which the signal becomes the selection signal in a duplicate manner.

In this configuration, the time in which the capacitive elements are charged can be made to be longer compared to the configuration shown in FIG. 5.

Other Modified Examples

The controller 2 may not include some or all of the registers R1, R2, PB, D, C11, and C01. In this case, the controller 2 stores the parameters described as the parameters stored in these registers in the embodiment in a memory such as the RAM 5.

The driving condition may be determined without using the counters C11 and C01. For example, in the process of determining the driving condition (step S212), the driving condition may be determined by scanning the register PB every pixel.

In the flow shown in FIG. 10, the process of driving the display unit 1 (step S216) may be performed independently from the other processes (step S201 to step S215). For example, independently from the processes of step S201 to S215, the control unit 22 may perform the process of driving the display unit 1 in accordance with an instruction from the CPU 3 or at a predetermined period.

The specific example of the electronic apparatus 1000 is not limited to an electronic book reader. Examples of the electronic apparatus 1000 include a personal computer, a PDA (Personal Digital Assistant), a mobile phone, a smart phone, a tablet terminal, and a portable game console. In the electronic apparatuses, the functions described with reference to FIG. 8 may be realized by allowing the CPU 3 to execute a program. The program may be provided in a form in which the program is stored in a computer-readable recording medium such as a magnetic recording medium (magnetic tape, a magnetic disk (HDD (Hard Disk Drive), an FD (Flexible Disk)), an optical recording medium (an optical disc (a CD (Compact Disc), a DVD (Digital Versatile Disc)), a magneto-optical recording medium, or a semiconductor memory. As another example, the program may be downloaded to the electronic apparatus 1000 via a communication line. The program acquired in this manner is installed in the electronic apparatus 1000 for use.

The display unit 1 and the controller 2 may be combined and be provided a display device.

The configuration of the display unit 1 is not limited to the configuration described in the embodiment. For example, the display unit 1 may not have the configuration in which the electrophoretic layer 110 is interposed between the pixel electrodes 104 and the common electrode 122. The display unit 1 may have a configuration in which a charged-particle layer is formed on the two electrodes arranged in parallel. In this case, the optical state of the charged-particle layer is changed by moving the charged particles right and left, making the charged particles cohere or diffuse, or moving the charged particles locally.

The display unit 1 may not include the power line driving circuit 17. In this case, the controller 2 directly applies a voltage to the power line 18.

In the above-described embodiment, the example has been described in which the single transistor 132 is included in the switching circuit. The switching circuit is a circuit which is installed in each pixel 13, includes a control input terminal connected to the first output terminal of the memory circuit 136, an input terminal connected to the power line 18, and the output terminal connected to the pixel electrode 104, and controls the conductive state between the input terminal and the output terminal in accordance with the signal supplied to the control input terminal. Any circuit may be used instead of the transistor 132 shown in FIG. 5, as long as the circuit can control the conductive state between the input terminal and the output terminal in accordance with the signal supplied to the control input terminal.

What is claimed is:

1. A control method of an electro-optic device including:

a plurality of pixels, each of the plurality of pixels including a pixel electrode disposed at an intersection between a plurality of scanning lines and a plurality of signal lines, an electro-optic element which enters a first optical state from a second optical state for a first time by accumulatively applying a first voltage via the pixel electrodes during a first plurality of periods and enters the second optical state from the first optical state for a second time by accumulatively applying a second voltage during a second plurality of periods, a memory circuit which is disposed in each of the plurality of pixels includes a first input terminal connected to a first scanning line among the plurality of scanning lines, a second input terminal connected to a first signal line among the plurality of signal lines, and a first output terminal, and holds a third voltage applied to the first signal line after the first scanning line is selected, a switching circuit which is disposed in each of the plurality of pixels includes a control input terminal connected to the first output terminal, a third input terminal connected to a power voltage line, and a second output terminal connected to the pixel electrode, and controls a conduction state between the third input terminal and the second output terminal in accordance with a signal supplied to the control input terminal, and a scanning line driving circuit which supplies a selection signal for selecting one of the plurality of scanning lines, the control method comprising:

determining which condition is satisfied among a plurality of conditions based on first data stored in a memory register storing the first data indicating the optical state of the plurality of pixels, the plurality of conditions including:

a first condition where the plurality of pixels include only first pixels of which the optical state is changed from the second optical state to the first optical state and third pixels of which the optical state is not changed, a second condition where the plurality of pixels include only second pixels of which the optical state is changed from the first optical state to the second optical state and the third pixels, and a third condition where the plurality of pixels include both the first pixels and the second pixels;

applying a fourth voltage for causing the switching circuit to enter an ON state to the first signal line corresponding to the first pixels, applying a fifth voltage for causing the switching circuit to enter an OFF state to a third signal line corresponding to the third pixels, and applying the first voltage to the power voltage line, after determining that the plurality of pixels satisfy the first condition during one of the first and second pluralities of periods;

applying the fourth voltage for causing the switching circuit to enter the ON state to a second signal line corresponding to the second pixels, applying the fifth voltage for causing the switching circuit to enter the OFF state to the third signal line corresponding to the third pixels, and applying the second voltage to the power voltage line, after determining that the plurality of pixels satisfy the second condition during one of the first and second pluralities of periods; and alternately repeating, at a predetermined frequency, a first period for applying the fourth voltage for causing the switching circuit to enter the ON state to the first signal line corresponding to the first pixels, applying the fifth voltage for causing the switching circuit to enter the OFF state to the third signal line corresponding to the third pixels, and applying the first voltage to the power voltage line and a second period for applying the fourth voltage for causing the switching circuit to enter the ON state to the second signal line corresponding to the second pixels, applying the fifth voltage for causing the switching circuit to enter the OFF state to the third signal line corresponding to the third pixels, and applying the second voltage to the power voltage line, after determining that the plurality of pixels satisfy the third condition during one of the first and second pluralities of periods.

2. The driving method according to claim 1, wherein the plurality of conditions further include a fourth condition where the plurality of pixels include only the first pixels and the third pixels during one of the first and second pluralities of periods and the plurality of scanning lines include a second scanning line corresponding to only the pixels for which the application of the first voltage newly starts and the pixels other than the pixels for which the application of the first voltage ends, and wherein the driving method further comprises applying the first voltage to the power voltage line without selecting the second scanning line during one of the first and second pluralities of periods, after determining that the plurality of pixels satisfy the fourth condition.

3. The driving method according to claim 1, wherein the plurality of conditions further include a fifth condition where the plurality of pixels include only the second pixels and the third pixels during one of the first and second pluralities of periods and the plurality of scanning lines include a third scanning line corresponding to only the pixels for which the application of the second voltage newly starts and the pixels other than the pixels for which the application of the second voltage ends, and wherein the driving method further comprises applying the second voltage to the power voltage line without selecting the third scanning line during one of the first and second pluralities of periods, after determining that the plurality of pixels satisfy the fifth condition.

4. The driving method according to claim 1, wherein the plurality of conditions further include a sixth condition where the plurality of pixels include only the third pixels during one of the first and second pluralities of periods and the plurality of scanning lines include a fourth scanning line corresponding to only the pixels other than the pixels for which an accumulation time of the application of one of the first voltage and the second voltage during one of the first and second pluralities of periods becomes one of the first time and the second time, and wherein the driving method further comprises applying one of the first voltage and the second voltage to the power voltage line without selecting the fourth scanning line during one of the first and second pluralities of periods, after determining that the plurality of pixels satisfy the sixth condition.

5. The driving method according to claim 1, wherein the plurality of conditions include a seventh condition where the plurality of scanning lines include a fifth scanning line corresponding to only fourth pixels for which an accumulation time of the application of one of the first voltage and the second voltage during one of the first and second pluralities of periods becomes one of the first time and the second time, and wherein after it is determined that the plurality of pixels satisfy the seventh condition, the driving method further comprises applying the fourth voltage for causing the switching circuits to enter the ON state to a fourth signal line corresponding to the fourth pixels after selecting the fifth scanning line during one of the first and second pluralities of periods and applying a sixth voltage for stopping the change in the optical state of the electro-optic element during at least a part of one of the first and second pluralities of periods to the power voltage line.

6. The driving method according to claim 5, wherein after it is determined that the plurality of pixels satisfy the seventh condition, the fourth voltage for causing the switching circuit to enter the ON state is applied to the third and fourth signal lines after the fifth scanning line is selected during one of the first and second pluralities of periods.

7. The driving method according to claim 6, wherein after it is determined that the plurality of pixels satisfy the seventh condition, the fourth voltage for causing the switching circuit to enter the ON state is applied to all the plurality of signal lines after the fifth scanning line is selected during one of the first and second pluralities of periods.

8. The driving method according to claim 1, wherein the plurality of conditions include an eighth condition where all the plurality of pixels are the third pixels, and wherein after it is determined that the plurality of pixels satisfy the eighth condition, the driving method further comprises any one of:

selecting one to all of the scanning lines in sequence among the plurality of scanning lines, applying the fourth voltage for causing the switching circuit to enter the ON state to all the plurality of signal lines, and applying a sixth voltage for stopping the change in the optical state of the electro-optic element to the power voltage line;

selecting one to all of the scanning lines in sequence among the plurality of scanning lines, applying the fourth voltage for causing the switching circuit to enter the ON state to all the plurality of signal lines, and stopping the application of the first and second voltages to the power voltage line;

selecting one to all of the scanning lines in sequence among the plurality of scanning lines, applying the fifth voltage for causing the switching circuit to enter the OFF state to all the plurality of signal lines, and applying the sixth voltage for stopping the change in the optical state of the electro-optic element to the power voltage line;

selecting one to all of the scanning lines in sequence among the plurality of scanning lines, applying the fifth voltage for causing the switching circuit to enter the OFF state to all the signal lines, and stopping the application of the first and second voltages to the power voltage line; and stopping selecting one to all of the scanning lines.

9. The driving method according to claim 1, further comprising:

measuring an accumulation time in which the switching circuit is in the ON state in regard to the pixels in which the switching circuit is in the ON state among the plurality of pixels, wherein the condition which the plurality of pixels satisfy is determined among the plurality of conditions by the use of the measured accumulation time.

10. The driving method according to claim 9, further comprising:

writing second data indicating a target time of voltage application in a first storage region in regard to each of the plurality of pixels;

writing third data indicating the measured accumulation time in a second storage region in regard to each of the plurality of pixels;

determining whether the first data stored in the memory register corresponds to the second data stored in the first storage region in regard to each of the plurality of pixels; and writing fourth data corresponding to the first data stored in the memory register as the target time in the first storage region in regard to the pixel for which it is determined that the first data stored in the memory register does not correspond to the second data stored in the first storage region, wherein the condition which the plurality of pixels satisfy is determined among the plurality of conditions by the use of a comparison result between the third data stored in the second storage region and the second data stored in the first storage region.

11. The driving method according to claim 10, further comprising:

writing a first flag indicating whether a seventh voltage is applied in a third storage region in regard to each of the plurality of pixels based on the comparison result between the third data stored in the second storage region and the second data stored in the first storage region; and writing a second flag indicating whether the first voltage is applied or the second voltage is applied in a fourth storage region in regard to each of the plurality of pixels based on the comparison result, wherein the condition which the plurality of pixels satisfy is determined among the plurality of conditions by the use of the first and second flags stored in the third and fourth storage regions, respectively.

12. The driving method according to claim 10, wherein if the third data stored in the second storage region does not correspond to the second data stored in the first storage region in regard to the pixel for which it is determined that the first data stored in the memory register does not correspond to the second data stored in the first storage region, fifth data corresponding to the first data stored in the memory register is written as the target time in the first storage region having waited until the third data stored in the second storage region corresponds to the second data stored in the first storage region.

13. The driving method according to claim 1, wherein the plurality of scanning lines are divided into a plurality of blocks, wherein the power voltage line includes a plurality of power voltage lines so as to have one-to-one correspondence to the plurality of blocks, and wherein one of the first and second voltages applied to the plurality of power voltage lines is switched for each block.

14. The driving method according to claim 13, wherein the electro-optic device includes a power line driving circuit switching the one of the first and second voltages applied to the plurality of power voltage lines for each block, and wherein the one of the first and second voltages applied to the plurality of power voltage lines is switched for each block by controlling the power line driving circuit.

15. The driving method according to claim 1, wherein the plurality of pixels are disposed in a matrix form in a first direction in which the plurality of scanning lines extend and in a second direction in which the plurality of signal lines extend, wherein the plurality of power voltage lines include first and second power voltage lines, wherein the first power voltage line is connected alternately to two pixel groups arranged in the first direction, wherein the second power voltage line is connected alternately to two pixel groups which are different from the pixels connected to the first power voltage line and are arranged in the first direction, and wherein different voltages of the first and second voltages are applied to the first and second power voltage lines, respectively.

16. The driving method according to claim 1, wherein the plurality of pixels are disposed in a matrix form in a first direction in which the plurality of scanning lines extend and in a second direction in which the plurality of signal lines extend, wherein among the plurality of pixels, two pixels adjacent to each other in the first direction are connected to two different scanning lines among the plurality of scanning lines, respectively, wherein the power voltage line includes first and second power voltage lines, wherein the first power voltage line is connected to a first pixel group arranged in the first direction, wherein the second power voltage line is connected to a second pixel group which is arranged in the first direction and is different from the first pixel group connected to the first power voltage line, and wherein different voltages of the first and second voltages are applied to the first and second power voltage lines, respectively.

17. A control device comprising:

an output unit outputting a signal to an electro-optic device including a plurality of pixels, each of the plurality of pixels including a pixel electrode disposed at an intersection between a plurality of scanning lines and a plurality of signal lines, an electro-optic element which enters a first optical state from a second optical state for a first time by accumulatively applying a first voltage via the pixel electrodes during a first plurality of periods and enters the second optical state from the first optical state for a second time by accumulatively applying a second voltage during a second plurality of periods, a memory circuit which is disposed in each of the plurality of pixels includes a first input terminal connected to a first scanning line among the plurality of scanning lines, a second input terminal connected to a first signal line among the plurality of signal lines, and a first output terminal, and holds a third voltage applied to the first signal line after the first scanning line is selected, a switching circuit which is disposed in each of the plurality of pixels includes a control input terminal connected to the first output terminal, a third input terminal connected to a power voltage line, and a second output terminal connected to the pixel electrode, and controls a conduction state between the third input terminal and the second output terminal in accordance with a signal supplied to the control input terminal, and a scanning line driving circuit which supplies a selection signal for selecting one of the plurality of scanning lines;

a determination unit determining which condition is satisfied among a plurality of conditions based on first data stored in a memory register storing the first data indicating the optical state of the plurality of pixels, the plurality of conditions including:

a first condition where the plurality of pixels include only first pixels of which the optical state is changed from the second optical state to the first optical state and third pixels of which the optical state is not changed, a second condition where the plurality of pixels include only second pixels of which the optical state is changed from the first optical state to the second optical state and the third pixels, and a third condition where the plurality of pixels include both the first pixels and the second pixels; and a control unit controlling the output unit such that the output unit outputs the signal for controlling the electro-optic device in accordance with a determination result of the determination unit, wherein after it is determined that the plurality of pixels satisfy the first condition during one of the first and second pluralities of periods, the control unit controls the output unit such that the output unit outputs the signal used for applying a fourth voltage for causing the switching circuit to enter an ON state to the first signal line corresponding to the first pixels, applying a fifth voltage for causing the switching circuit to enter an OFF state to a third signal line corresponding to the third pixels, and applying the first voltage to the power voltage line, wherein after it is determined that the plurality of pixels satisfy the second condition during one of the first and second pluralities of periods, the control unit controls the output unit such that the output unit outputs the signal used for applying the fourth voltage for causing the switching circuit to enter the ON state to a second signal line corresponding to the second pixels, applying the fifth voltage for causing the switching circuit to enter the OFF state to the third signal line corresponding to the third pixels, and applying the second voltage to the power voltage line, and wherein after it is determined that the plurality of pixels satisfy the third condition during one of the first and second pluralities of periods, the control unit controls the output unit such that the output unit outputs the signal used to alternately repeat, at a predetermined frequency, a first period for applying the fourth voltage for causing the switching circuit to enter the ON state to the first signal line corresponding to the first pixels, applying the fifth voltage for causing the switching circuit to enter the OFF state to the third signal line corresponding to the third pixels, and applying the first voltage to the power voltage line and a second period for applying the fourth voltage for causing the switching circuit to enter the ON state to the second signal line corresponding to the second pixels, applying the fifth voltage for causing the switching circuit to enter the OFF state to the third signal line corresponding to the third pixels, and applying the second voltage to the power voltage line.

18. The control device according to claim 17, wherein the plurality of conditions further include a fourth condition where the plurality of pixels include only the first pixels and the third pixels during one of the first and second pluralities of periods and the plurality of scanning lines include a second scanning line corresponding to only the pixels for which the application of the first voltage newly starts and the pixels other than the pixels for which the application of the first voltage ends, and wherein after it is determined that the plurality of pixels satisfy the fourth condition, the control unit controls the output unit such that the output units outputs the signal used for applying the first voltage to the power voltage line without selecting the second scanning line during one of the first and second pluralities of periods.

19. The control device according to claim 17, wherein the plurality of conditions further include a fifth condition where the plurality of pixels include only the second pixels and the third pixels during one of the first and second pluralities of periods and the plurality of scanning lines include a third scanning line corresponding to only the pixels for which the application of the second voltage newly starts and the pixels other than the pixels for which the application of the second voltage ends, and wherein after it is determined that the plurality of pixels satisfy the fifth condition, the control unit controls the output unit such that the output units outputs the signal used for applying the second voltage to the power voltage line without selecting the third scanning line during one of the first and second pluralities of periods.

20. The control device according to claim 17, wherein the plurality of conditions further include a sixth condition where the plurality of pixels include only the third pixels during one of the first and second pluralities of periods and the plurality of scanning lines include a fourth scanning line corresponding to only the pixels other than the pixels for which an accumulation time of the application of one of the first voltage and the second voltage during one of the first and second pluralities of periods becomes one of the first time and the second time, and wherein after it is determined that the plurality of pixels satisfy the sixth condition, the control unit controls the output unit such that the output units outputs the signal used for applying one of the first voltage and the second voltage to the power voltage line without selecting the fourth scanning line during one of the first and second pluralities of periods.

21. The control device according to claim 17, wherein the plurality of conditions include a seventh condition where the plurality of scanning lines include a fifth scanning line corresponding to only fourth pixels for which an accumulation time of the application of one of the first voltage and the second voltage during one of the first and second pluralities of periods becomes one of the first time and the second time, and wherein after it is determined that the plurality of pixels satisfy the seventh condition, the control unit controls the output unit such that the output units outputs the signal used for applying the fourth voltage for causing the switching circuit to enter the ON state to a fourth signal line corresponding to the fourth pixels after the fifth scanning line is selected during one of the first and second pluralities of periods and applying a sixth voltage for stopping the change in the optical state of the electro-optic element during at least a part of one of the first and second pluralities of periods to the power voltage line.

22. The control device according to claim 21, wherein after it is determined that the plurality of pixels satisfy the seventh condition, the control unit controls the output unit such that the output units outputs the signal used for applying the fourth voltage for causing the switching circuit to enter the ON state to the third and fourth signal lines after the fifth scanning line is selected during one of the first and second pluralities of periods.

23. The control device according to claim 22, wherein after it is determined that the plurality of pixels satisfy the seventh condition, the control unit controls the output unit such that the output units outputs the signal used for applying the fourth voltage for causing the switching circuit to enter the ON state to all the plurality of signal lines after the fifth scanning line is selected during one of the first and second pluralities of periods.

24. The control device according to claim 17, wherein the plurality of conditions include an eighth condition where all the plurality of pixels are the third pixels, and wherein after it is determined that the plurality of pixels satisfy the eighth condition, the control unit controls the output unit such that the output unit outputs the signal used for one of the followings:

selecting one to all of the scanning lines in sequence among the plurality of scanning lines, applying the fourth voltage for causing the switching circuit to enter the ON state to all the plurality of signal lines, and applying a sixth voltage for stopping the change in the optical state of the electro-optic element to the power voltage line;

selecting one to all of the scanning lines in sequence among the plurality of scanning lines, applying the fourth voltage for causing the switching circuit to enter the ON state to all the plurality of signal lines, and stopping the application of the first and second voltages to the power voltage line;

selecting one to all of the scanning lines in sequence among the plurality of scanning lines, applying the fifth voltage for causing the switching circuit to enter the OFF state to all the plurality of signal lines, and applying the sixth voltage for stopping the change in the optical state of the electro-optic element to the power voltage line;

selecting one to all of the scanning lines in sequence among the plurality of scanning lines, applying the fifth voltage for causing the switching circuit to enter the OFF state to all the signal lines, and stopping the application of the first and second voltages to the power voltage line; and stopping selecting one to all of the scanning lines.

25. The control device according to claim 17, wherein the control unit measures an accumulation time in which the switching circuit is in the ON state in regard to the pixels in which the switching circuit is in the ON state among the plurality of pixels, and wherein the determination unit determines the condition which the plurality of pixels satisfy among the plurality of conditions by the use of the measured accumulation time.

26. The control device according to claim 25, further comprising:

a first storage region storing second data indicating a target time of voltage application in regard to each of the plurality of pixels; and a second storage region storing third data indicating the measured accumulation time in regard to each of the plurality of pixels, wherein the control unit determines whether the first data stored in the memory register corresponds to the second data stored in the first storage region in regard to each of the plurality of pixels, wherein the control unit writes fourth data corresponding to the first data stored in the memory register as the target time in the first storage region in regard to the pixel for which it is determined that the first data stored in the memory register does not correspond to the second data stored in the first storage region, and wherein the determination unit determines the condition which the plurality of pixels satisfy among the plurality of conditions by the use of a comparison result between the third data stored in the second storage region and the second data stored in the first storage region.

27. The control device according to claim 26, further comprising:

a third storage region storing a first flag indicating whether a seventh voltage is applied to each of the plurality of pixels; and a fourth storage region storing a second flag indicating whether the first voltage is applied or the second voltage is applied to each of the plurality of pixels, wherein the control unit writes the first flag indicating whether the seventh voltage is applied in the third storage region in regard to each of the plurality of pixels based on the comparison result between the third data stored in the second storage region and the second data stored in the first storage region, wherein the control unit writes the second flag indicating whether the first voltage is applied or the second voltage is applied in the fourth storage region in regard to each of the plurality of pixels based on the comparison result, and wherein the determination unit determines the condition which the plurality of pixels satisfy among the plurality of conditions by the use of the first and second flags stored in the third and fourth storage regions, respectively.

28. The control device according to claim 26, wherein after the third data stored in the second storage region does not correspond to the second data stored in the first storage region in regard to the pixel for which it is determined that the first data stored in the memory register does not correspond to the second data stored in the first storage region, the control unit writes, as the target time, fifth data corresponding to the first data stored in the memory register in the first storage region having waited until the third data stored in the second storage region corresponds to the second data stored in the first storage region.

29. The control device according to claim 17, wherein the plurality of scanning lines are divided into a plurality of blocks, wherein the power voltage line includes a plurality of power voltage lines so as to have one-to-one correspondence to the plurality of blocks, and wherein the control unit controls the output unit such that the output unit outputs the signal used for switching one of the first and second voltages applied to the plurality of power voltage lines for each block.

30. The control device according to claim 29, wherein the electro-optic device includes a power line driving circuit switching the one of the first and second voltages applied to the plurality of power voltage lines for each block, and wherein the control unit controls the output unit such that the output unit outputs the signal used for controlling the power line driving circuit.

31. A display device comprising:

the control device according to claim 17; and an electro-optic device driven in accordance with the signal output from the control device.

32. An electronic apparatus comprising:

the display device according to claim 31.

* * * * *